United States Patent
Ge et al.

(10) Patent No.: US 11,778,044 B2
(45) Date of Patent: Oct. 3, 2023

(54) SESSION ESTABLISHMENT METHOD AND DEVICE

(71) Applicant: HUAWEI TECHNOLOGIES CO., LTD., Guangdong (CN)

(72) Inventors: Cuili Ge, Beijing (CN); Yanmei Yang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/673,285

(22) Filed: Feb. 16, 2022

(65) Prior Publication Data
US 2022/0174119 A1 Jun. 2, 2022

Related U.S. Application Data

(63) Continuation of application No. 16/992,333, filed on Aug. 13, 2020, now abandoned, which is a
(Continued)

(30) Foreign Application Priority Data

Feb. 14, 2018 (CN) .......................... 201810152310.3

(51) Int. Cl.
*H04L 67/146* (2022.01)
*H04L 12/18* (2006.01)
(Continued)

(52) U.S. Cl.
CPC ............ *H04L 67/146* (2013.01); *H04L 12/18* (2013.01); *H04L 65/80* (2013.01); *H04L 67/141* (2013.01)

(58) Field of Classification Search
None
See application file for complete search history.

(56) References Cited

U.S. PATENT DOCUMENTS 9,030,988 B2 5/2015 Sayeed
2006/0034195 A1* 2/2006 Blaiotta .............. H04L 65/4061
370/261
(Continued)

FOREIGN PATENT DOCUMENTS

CN 107018542 A 8/2017
CN 107690161 A 2/2018
(Continued)

OTHER PUBLICATIONS

Nokia et al., "OI #18 23.502: (NAS SM: split)+ Correcting information flows in 4.3 (PDU session related)",SA WG2 Meeting #124,S2-178255,Nov. 27-Dec. 1, 2017, Reno, NV, USA, total 35 pages.
(Continued)

*Primary Examiner* — Scott B Christensen

(57) ABSTRACT

The technology provides a session establishment method and device. The method includes sending, by an SMF entity, a PDU session establishment request message to a terminal, where the PDU session establishment request message is used to request to establish a PDU session; and receiving, by the SMF entity, a PDU session establishment response message from the terminal. A method for actively initiating a PDU session establishment procedure on a network side is provided.

14 Claims, 25 Drawing Sheets

Related U.S. Application Data continuation of application No. PCT/CN2019/071303, filed on Jan. 11, 2019.

(51) Int. Cl.
*H04L 65/80* (2022.01)
*H04L 67/141* (2022.01)

(56) References Cited

U.S. PATENT DOCUMENTS

| | | | | |
|---|---|---|---|---|
| 2008/0109853 A1* | 5/2008 | Einarsson | ............ | H04N 21/643 348/E7.071 |
| 2010/0223357 A1* | 9/2010 | Einarsson | .......... | H04N 21/6587 709/219 |
| 2013/0055301 A1* | 2/2013 | Hao | ................... | H04N 21/2385 725/14 |
| 2013/0301509 A1* | 11/2013 | Purnadi | ............ | H04W 36/0007 370/312 |
| 2014/0177504 A1* | 6/2014 | Sayeed | ................ | H04W 76/40 370/312 |
| 2014/0286223 A1* | 9/2014 | Yu | ........................... | H04W 4/06 370/312 |
| 2014/0313974 A1* | 10/2014 | Chandramouli | ........ | H04W 4/06 370/328 |
| 2015/0078245 A1* | 3/2015 | Anchan | ................ | H04W 36/32 370/312 |
| 2016/0119395 A1* | 4/2016 | Li | ........................... | H04L 65/80 709/219 |
| 2016/0323719 A1* | 11/2016 | Wang | ................... | H04W 72/14 |
| 2017/0303259 A1 | 10/2017 | Lee et al. | | |
| 2017/0339609 A1 | 11/2017 | Youn et al. | | |
| 2018/0192455 A1* | 7/2018 | Wu | ................... | H04W 36/0022 |
| 2018/0324631 A1* | 11/2018 | Jheng | ................ | H04W 28/0268 |
| 2019/0116518 A1* | 4/2019 | Stojanovski | ............ | H04L 67/14 |

FOREIGN PATENT DOCUMENTS

| | | |
|---|---|---|
| WO | 2013182247 A1 | 12/2013 |
| WO | 2018006017 A1 | 1/2018 |

OTHER PUBLICATIONS

3GPP TS 23.502 V0.2.0 (Feb. 2017);3rd Generation Partnership Project;Technical Specification Group Services and System Aspects;Procedures for the 5G System;Stage 2(Release 15);Total 71 Pages.

3GPP TS 23.501 V15.0.0 (Dec. 2017);3rd Generation Partnership Project; Technical Specification Group Services and System Aspects-;System Architecture for the 5G System;Stage 2(Release 15);total 181 pages.

3GPP TS 23.502 V15.0.0 (Dec. 2017);3rd Generation Partnership Project;Technical Specification Group Services and System Aspects;Procedures for the 5G System; Stage 2(Release 15);total 258 pages.

Office Action in Chinese Application No. 201810152310.3 dated May 27, 2020.

International Search Report for PCT Application No. PCT/CN2019/071303 dated Feb. 14, 2018.

* cited by examiner

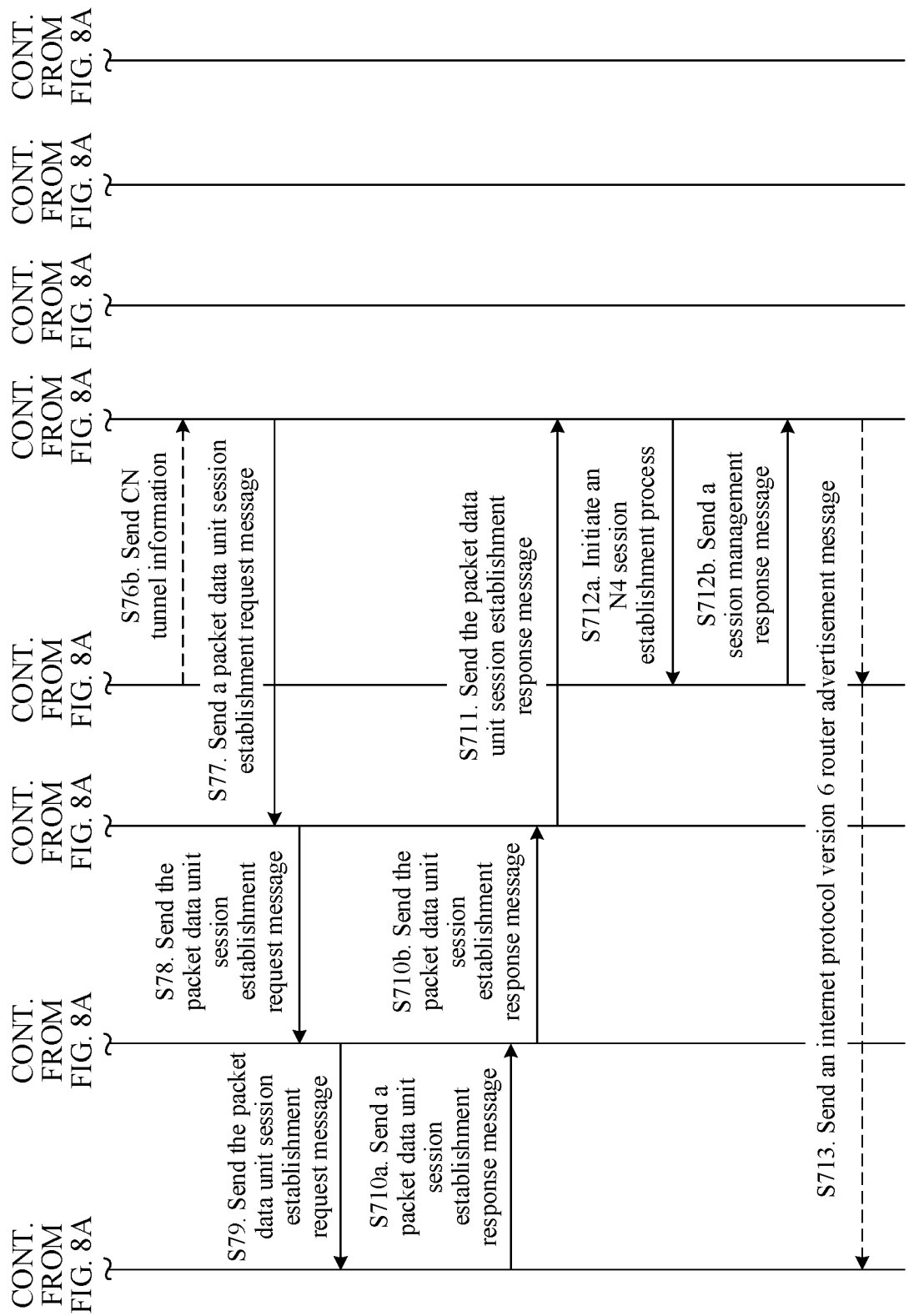

SESSION ESTABLISHMENT METHOD AND DEVICE

CROSS-REFERENCE TO RELATED APPLICATIONS

This application is a continuation of U.S. patent application Ser. No. 16/992,333, filed on Aug. 13, 2020, which is a continuation of International Application No. PCT/CN2019/071303, filed on Jan. 11, 2019, which claims priority to Chinese Patent Application No. 201810152310.3, filed on Feb. 14, 2018. All of the afore-mentioned applications are hereby incorporated by reference in their entireties.

TECHNICAL FIELD

This application relates to communications technologies, and in particular, to a session establishment method and device.

BACKGROUND

With continuous development of communications technologies, research and standardization for a fifth generation (5G) mobile communications technology have been launched. There are logical function entities of different network units in a 5G network, and the entities may perform different network functions. In the 5G network, a broadcast path and a unicast path may be established between a terminal and the network by establishing a broadcast session or a unicast session between the entities and the terminal, so that the broadcast path or the unicast path is used for data exchange between the terminal and a data network.

In the related art, when a terminal receives data through a broadcast path, when signal quality of data received through the broadcast path is relatively poor, a downlink data receive mode of the terminal needs to be switched from broadcast path transmission to unicast path transmission. Alternatively, when signal quality of data received through the broadcast path by most terminals on a network side is relatively poor, the network side needs to switch, from broadcast path transmission to unicast path transmission, for all terminals that receive data through the broadcast path on the network side.

However, in the 5G network, how to quickly initiate a unicast session and establish a unicast transmission path in a timely manner, and to quickly switch downlink data for the terminal from a broadcast path to a unicast path are problems that needs to be resolved.

SUMMARY

This application provides a session establishment method and device, to resolve a problem of how to trigger a unicast session establishment procedure, to switch a terminal from a broadcast path to a unicast path for receiving data.

According to a first aspect, this application provides a session establishment method, including:

sending, by a session management function (SMF) entity, a packet data unit (PDU) session establishment request message to a terminal, where the PDU session establishment request message is used to request to establish a PDU session; and receiving, by the SMF entity, a PDU session establishment response message from the terminal.

In one aspect of this application, a method for actively initiating a PDU session establishment procedure on a network side is provided. When the terminal needs to be switched from a broadcast path to a unicast path, the PDU session may be established for the terminal on the network side, to establish the unicast path. In addition, because it can be ensured that a same user plane function (UPF) entity is selected by a broadcast session for the broadcast path and is selected by a unicast session for the unicast path on the network side, it can be ensured that user plane data is consistent and synchronized on the broadcast path and the unicast path when the user plane data is switched from the broadcast path to the unicast path. Negotiation performed when user plane downlink data is switched from the broadcast path to the unicast path is avoided, so that a delay of switching from the broadcast path to the unicast path can be reduced, to ensure fast and continuous switching of data, and ensure fast switching that meets service continuity requirements of a broadcast mode and a unicast mode. In addition, the network side triggers the terminal to establish the PDU session, and this can reduce signaling interaction in a process in which the terminal establishes the PDU session with the network side, and further reduce a delay.

With reference to the first aspect, in a first implementation of the first aspect, the PDU session establishment response message includes a session identifier of the PDU session; or the method further includes: receiving, by the SMF entity, a session identifier of the PDU session from the terminal.

With reference to the first aspect or the first implementation of the first aspect, in a second implementation of the first aspect, the PDU session establishment request message includes session establishment assistance information of the PDU session; or the method further includes: sending, by the SMF entity, session establishment assistance information of the PDU session to the terminal, where the session establishment assistance information of the PDU session includes one or more of a broadcast session identifier and a group identifier, the broadcast session identifier is used to represent a broadcast session in which the terminal participates, and the group identifier is used to represent a group including the terminal.

With reference to the second implementation of the first aspect, in a third implementation of the first aspect, the method further includes: selecting, by the SMF entity based on the broadcast session identifier, a UPF entity corresponding to the broadcast session, and sending a user plane session request to the UPF entity corresponding to the broadcast session; or selecting, by the SMF entity based on the group identifier, a UPF entity corresponding to the group identifier, and sending a user plane session request to the UPF entity corresponding to the group identifier, where the user plane session request includes user plane forwarding rule information of the PDU session.

With reference to any one of the first aspect or the implementations of the first aspect, in a fourth implementation of the first aspect, the PDU session establishment request message includes the session identifier of the PDU session, and the method further includes: allocating, by the SMF entity, a session identifier to the PDU session.

According to a second aspect, this application provides a session establishment method, including:

receiving, by an SMF entity, a broadcast quality report message from a terminal, where the broadcast quality report message is used to request to establish a PDU session; and performing, by the SMF entity, a PDU session establishment procedure based on the broadcast quality report message.

In one aspect of this application, the broadcast quality report message reported by the terminal is used to request to establish the PDU session, and then the SMF entity may directly perform the PDU session establishment procedure. In this way, a process in which the terminal reports the broadcast quality report message to the SMF entity, the SMF entity sends a PDU session establishment request message to the terminal, and then the terminal performs a PDU session establishment procedure is not required, or a process in which an application server sends a device trigger message to the terminal, and then the terminal actively initiates a PDU session establishment procedure is not required. These complex signaling interaction procedures may not be required. Therefore, signaling interaction between the terminal and a network side can be reduced, a delay of switching from the broadcast path to the unicast path can be reduced, and the PDU session can be quickly established.

With reference to the second aspect, in a first implementation of the second aspect, the broadcast quality report message includes one or more of the following information: an identifier of the broadcast quality report message, a PDU session establishment request message, indication information, and a session identifier; and the indication information is used to request to establish the PDU session, the session identifier is used to identify the PDU session, and the PDU session establishment request message is used to request to establish the PDU session.

With reference to the second aspect or the first implementation of the second aspect, in a second implementation of the second aspect, the broadcast quality report message includes the PDU session establishment request message, and the method further includes:

sending, by the SMF entity, a PDU session establishment response message to the terminal.

With reference to the second implementation of the second aspect, in a third implementation of the second aspect, the PDU session establishment response message includes information about a quality of service flow (QoS) flow corresponding to the PDU session.

With reference to any one of the second aspect or the implementations of the second aspect, in a fourth implementation of the second aspect, the method further includes:

sending, by the SMF entity to the terminal based on the broadcast quality report message, the information about the QoS flow corresponding to the PDU session.

With reference to any one of the second aspect or the implementations of the second aspect, in a fifth implementation of the second aspect, the performing, by the SMF entity, a PDU session establishment procedure based on the broadcast quality report message includes:

performing, by the SMF entity, the PDU session establishment procedure when the SMF entity determines, based on broadcast received quality information in the broadcast quality report message, that the terminal fails to receive data.

According to a third aspect, this application provides a session establishment method, including:

receiving, by a terminal, a PDU session establishment request message from an SMF entity, where the PDU session establishment request message is used to request to establish a PDU session; and sending, by the terminal, a PDU session establishment response message to the SMF entity based on the PDU session establishment request message.

In one aspect of this application, a method for actively initiating a PDU session establishment procedure on a network side is provided. When the terminal needs to be switched from a broadcast path to a unicast path, the PDU session may be established for the terminal on the network side, to establish the unicast path. In addition, because it can be ensured that a same UPF entity is selected by a broadcast session for the broadcast path and is selected by a unicast session for the unicast path on the network side, it can be ensured that user plane data is consistent and synchronized on the broadcast path and the unicast path when the user plane data is switched from the broadcast path to the unicast path. Negotiation performed when user plane downlink data is switched from the broadcast path to the unicast path is avoided, so that a delay of switching from the broadcast path to the unicast path can be reduced, to ensure fast and continuous switching of data, and ensure fast switching that meets service continuity requirements of a broadcast mode and a unicast mode. In addition, the network side triggers the terminal to establish the PDU session, and this can reduce signaling interaction in a process in which the terminal establishes the PDU session with the network side, and further reduce a delay.

With reference to the third aspect, in a first implementation of the third aspect, the PDU session establishment response message includes a session identifier of the PDU session; or the method further includes: sending, by the terminal, a session identifier of the PDU session to the SMF entity.

With reference to the third aspect or the first implementation of the third aspect, in a second implementation of the third aspect, the PDU session establishment request message includes session establishment assistance information of the PDU session, and the method further includes: obtaining, by the terminal based on the session establishment assistance information of the PDU session, information about a QoS flow corresponding to the PDU session; or the method further includes: receiving, by the terminal, session establishment assistance information of the PDU session from the SMF entity, and obtaining, based on the session establishment assistance information of the PDU session, information about a QoS flow corresponding to the PDU session, where the session establishment assistance information of the PDU session includes one or more of a broadcast session identifier and a group identifier, the broadcast session identifier is used to represent a broadcast session in which the terminal participates, and the group identifier is used to represent a group including the terminal.

With reference to the third aspect or any implementation of the third aspect, in a third implementation of the third aspect, the PDU session establishment request message includes the session identifier of the PDU session.

With reference to any one of the third aspect or the implementations of the third aspect, in a fourth implementation of the third aspect, the method further includes:

allocating, by the terminal, the session identifier to the PDU session based on the PDU session establishment request message.

According to a fourth aspect, this application provides a session establishment method, including:

sending, by a terminal, a broadcast quality report message to an SMF entity, where the broadcast quality report message is used to request to establish a PDU session.

In one aspect of this application, the broadcast quality report message reported by the terminal is used to request to establish the PDU session, and then the SMF entity may directly perform the PDU session establishment procedure. In this way, a process in which the terminal reports the broadcast quality report message to the SMF entity, the SMF entity sends a PDU session establishment request message to the terminal, and then the terminal performs a PDU session establishment procedure is not required, or a process in which an application server sends a device trigger message to the terminal, and then the terminal actively initiates the PDU session establishment procedure is not required. These complex signaling interaction procedures may not be required. Therefore, signaling interaction between the terminal and a network side can be reduced, a delay of switching from the broadcast path to the unicast path can be reduced, and the PDU session can be quickly established.

With reference to the fourth aspect, in a first implementation of the fourth aspect, the broadcast quality report message includes one or more of the following information: an identifier of the broadcast quality report message, a PDU session establishment request message, indication information, and a PDU session identifier; and the indication information is used to request to establish the PDU session, the session identifier is used to identify the PDU session, and the PDU session establishment request message is used to request to establish the PDU session.

With reference to the fourth aspect or the first implementation of the fourth aspect, in a second implementation of the fourth aspect, the method further includes:

receiving, by the terminal from the SMF entity, information about a QoS flow corresponding to the PDU session.

With reference to the fourth aspect or the first implementation of the fourth aspect, in a third implementation of the fourth aspect, the broadcast quality report message includes the PDU session establishment request message, and the method further includes:

receiving, by the terminal, a PDU session establishment response message from the SMF entity.

With reference to the third implementation of the fourth aspect, in a fourth implementation of the fourth aspect, the PDU session establishment response message includes information about a QoS flow corresponding to the PDU session.

With reference to any one of the fourth aspect or the implementations of the fourth aspect, in a fifth implementation of the fourth aspect, the sending, by a terminal, a broadcast quality report message to an SMF entity includes:

sending the broadcast quality report message to the SMF entity when the terminal fails to receive data.

According to a fifth aspect, this application provides a session establishment method, including:

receiving, by an access and mobility management function (AMF) entity, a PDU session request message from an SMF entity, where the PDU session establishment request message is used to request to establish a PDU session;

sending, by the AMF entity, the PDU session request message to a terminal; and receiving, by the AMF entity, a PDU session establishment response message from the terminal, and sending the PDU session establishment response message to the SMF entity.

In one aspect of this application, a method for actively initiating a PDU session establishment procedure on a network side is provided. When the terminal needs to be switched from a broadcast path to a unicast path, the PDU session may be established for the terminal on the network side, to establish the unicast path. In addition, because it can be ensured that a same UPF entity is selected by a broadcast session for the broadcast path and is selected by a unicast session for the unicast path on the network side, it can be ensured that user plane data is consistent and synchronized on the broadcast path and the unicast path when the user plane data is switched from the broadcast path to the unicast path. Negotiation performed when user plane downlink data is switched from the broadcast path to the unicast path is avoided, so that a delay of switching from the broadcast path to the unicast path can be reduced, to ensure fast and continuous switching of data, and ensure fast switching that meets service continuity requirements of a broadcast mode and a unicast mode. In addition, the network side triggers the terminal to establish the PDU session, and this can reduce signaling interaction in a process in which the terminal establishes the PDU session with the network side, and further reduce a delay.

With reference to the fifth aspect, in a first implementation of the fifth aspect, the PDU session establishment request message includes session establishment assistance information of the PDU session; or the method further includes: receiving, by the AMF entity, session establishment assistance information of the PDU session from the SMF entity, where the session establishment assistance information of the PDU session includes one or more of a broadcast session identifier and a group identifier, the broadcast session identifier is used to represent a broadcast session in which the terminal participates, and the group identifier is used to represent a group including the terminal.

With reference to the first implementation of the fifth aspect, in a second implementation of the fifth aspect, the sending, by the AMF entity, the PDU session request message to a terminal includes:

selecting, by the AMF entity, a radio access network function (RAN) entity based on the session establishment assistance information of the PDU session; and sending, by the AMF entity, the PDU session request message to the terminal through the RAN entity.

With reference to the fifth aspect, in a third implementation of the fifth aspect, the PDU session request message includes an identifier of the terminal; or the method further includes: receiving, by the AMF entity, an identifier of the terminal from the SMF entity.

With reference to the third implementation of the fifth aspect, in a fourth implementation of the fifth aspect, the sending, by the AMF entity, the PDU session request message to a terminal includes:

selecting, by the AMF entity, a RAN entity based on the identifier of the terminal; and sending, by the AMF entity, the PDU session request message to the terminal through the RAN entity.

According to a sixth aspect, this application provides a session establishment device, including:

a first sending module, configured to send a packet data unit PDU session establishment request message to a terminal, where the PDU session establishment request message is used to request to establish a PDU session; and a first receiving module, configured to receive a PDU session establishment response message from the terminal.

With reference to the sixth aspect, in a first implementation of the sixth aspect, the PDU session establishment response message includes a session identifier of the PDU session; or the device further includes a second receiving module, configured to receive a session identifier of the PDU session from the terminal.

With reference to the sixth aspect or the first implementation of the sixth aspect, in a second implementation of the sixth aspect, the PDU session establishment request message includes session establishment assistance information of the PDU session; or the device further includes a second sending module, configured to send session establishment assistance information of the PDU session to the terminal, where the session establishment assistance information of the PDU session includes one or more of a broadcast session identifier and a group identifier, the broadcast session identifier is used to represent a broadcast session in which the terminal participates, and the group identifier is used to represent a group including the terminal.

With reference to the second implementation of the sixth aspect, in a third implementation of the sixth aspect, the device further includes:

a first selection module, configured to: select, based on the broadcast session identifier, a UPF entity corresponding to the broadcast session, and send a user plane session request to the UPF entity corresponding to the broadcast session; or a second selection module, configured to: select, based on the group identifier, a UPF entity corresponding to the group identifier, and send a user plane session request to the UPF entity corresponding to the group identifier, where the user plane session request includes user plane forwarding rule information of the PDU session.

With reference to the sixth aspect or any implementation of the sixth aspect, in a fourth implementation of the sixth aspect, the PDU session establishment request message includes the session identifier of the PDU session; and the device further includes an allocation module, configured to allocate the session identifier to the PDU session.

According to a seventh aspect, this application provides a session establishment device, including:

a receiving module, configured to receive a broadcast quality report message from a terminal, where the broadcast quality report message is used to request to establish a PDU session; and an execution module, configured to perform a PDU session establishment procedure based on the broadcast quality report message.

With reference to the seventh aspect, in a first implementation of the seventh aspect, the broadcast quality report message includes one or more of the following information: an identifier of the broadcast quality report message, a PDU session establishment request message, indication information, and a session identifier; and the indication information is used to request to establish the PDU session, the session identifier is used to identify the PDU session, and the PDU session establishment request message is used to request to establish the PDU session.

With reference to the seventh aspect or the first implementation of the seventh aspect, in a second implementation of the seventh aspect, the broadcast quality report message includes the PDU session establishment request message, and the device further includes:

a first sending module, configured to send a PDU session establishment response message to the terminal.

With reference to the second implementation of the seventh aspect, in a third implementation of the seventh aspect, the PDU session establishment response message includes information about a QoS flow corresponding to the PDU session.

With reference to any one of the seventh aspect or the implementations of the seventh aspect, in a fourth implementation of the seventh aspect, the device further includes:

a second sending module, configured to send, to the terminal based on the broadcast quality report message, the information about the QoS flow corresponding to the PDU session.

With reference to any one of the seventh aspect or the implementations of the seventh aspect, in a fifth implementation of the seventh aspect, the execution module is specifically configured to:

perform the PDU session establishment procedure when it is determined, based on broadcast received quality information in the broadcast quality report message, that the terminal fails to receive data.

According to an eighth aspect, this application provides a session establishment device, including:

a receiving module, configured to receive a PDU session establishment request message from an SMF entity, where the PDU session establishment request message is used to request to establish a PDU session; and a first sending module, configured to send a PDU session establishment response message to the SMF entity based on the PDU session establishment request message.

With reference to the eighth aspect, in a first implementation of the eighth aspect, the PDU session establishment response message includes a session identifier of the PDU session; or the device further includes a second sending module, configured to send a session identifier of the PDU session to the SMF entity.

With reference to the eighth aspect or the first implementation of the eighth aspect, in a second implementation of the eighth aspect, the PDU session establishment request message includes session establishment assistance information of the PDU session, and the device further includes: a first obtaining module, configured to obtain, based on the session establishment assistance information of the PDU session, information about a quality of service flow QoS flow corresponding to the PDU session; or the device further includes a second obtaining module, configured to receive session establishment assistance information of the PDU session from the SMF entity, and obtain, based on the session establishment assistance information of the PDU session, information about a QoS flow corresponding to the PDU session, where the session establishment assistance information of the PDU session includes one or more of a broadcast session identifier and a group identifier, the broadcast session identifier is used to represent a broadcast session in which the terminal participates, and the group identifier is used to represent a group including the terminal.

With reference to the eighth aspect or any implementation of the eighth aspect, in a third implementation of the eighth aspect, the PDU session establishment request message includes the session identifier of the PDU session.

With reference to any one of the eighth aspect or the implementations of the eighth aspect, in a fourth implementation of the eighth aspect, the device further includes:

an allocation module, configured to allocate the session identifier to the PDU session based on the PDU session establishment request message.

According to a ninth aspect, this application provides a session establishment device, including:

a sending module, configured to send a broadcast quality report message to an SMF entity, where the broadcast quality report message is used to request to establish a PDU session.

With reference to the ninth aspect, in a first implementation of the ninth aspect, the broadcast quality report message includes one or more of the following information: an identifier of the broadcast quality report message, a PDU session establishment request message, indication information, and a PDU session identifier; and the indication information is used to request to establish the PDU session, the session identifier is used to identify the PDU session, and the PDU session establishment request message is used to request to establish the PDU session.

With reference to any one of the ninth aspect or the implementations of the ninth aspect, in a second implementation of the ninth aspect, the device further includes:

a first receiving module, configured to receive, from the SMF entity, information about a QoS flow corresponding to the PDU session.

With reference to the ninth aspect or the first implementation of the ninth aspect, in a third implementation of the ninth aspect, the broadcast quality report message includes the PDU session establishment request message, and the device further includes:

a second receiving module, configured to receive a PDU session establishment response message from the SMF entity.

With reference to the third implementation of the ninth aspect, in a fourth implementation of the ninth aspect, the PDU session establishment response message includes information about a QoS flow corresponding to the PDU session.

With reference to any one of the ninth aspect or the implementations of the ninth aspect, in a fifth implementation of the ninth aspect, the sending module is specifically configured to:

send the broadcast quality report message to the SMF entity when it is determined that data fails to be received.

According to a tenth aspect, this application provides a session establishment device, including:

a first receiving module, configured to receive a PDU session request message from an SMF entity, where the PDU session establishment request message is used to request to establish a PDU session;

a first sending module, configured to send the PDU session request message to a terminal;

a second receiving module, configured to receive a PDU session establishment response message from the terminal; and a second sending module, configured to send the PDU session establishment response message to the SMF entity.

With reference to the fifth aspect, in a first implementation of the fifth aspect, the PDU session establishment request message includes session establishment assistance information of the PDU session; or the device further includes: a third receiving module, configured to receive session establishment assistance information of the PDU session from the SMF entity, where the session establishment assistance information of the PDU session includes one or more of a broadcast session identifier and a group identifier, the broadcast session identifier is used to represent a broadcast session in which the terminal participates, and the group identifier is used to represent a group including the terminal.

With reference to the first implementation of the fifth aspect, in a second implementation of the fifth aspect, the first sending module includes:

a first selection submodule, configured to select a RAN entity based on the session establishment assistance information of the PDU session; and a first sending submodule, configured to send the PDU session request message to the terminal through the RAN entity.

With reference to the fifth aspect, in a third implementation of the fifth aspect, the PDU session request message includes an identifier of the terminal; or the device further includes a fourth receiving module, configured to receive an identifier of the terminal from the SMF entity.

With reference to the third implementation of the fifth aspect, in a fourth implementation of the fifth aspect, the first sending module includes:

a second selection submodule, configured to select a RAN entity based on the identifier of the terminal; and a second sending submodule, configured to send the PDU session request message to the terminal through the RAN entity.

According to an eleventh aspect, a communications system is provided, including the session establishment device according to any implementation in the sixth aspect, the session establishment device according to any implementation in the eighth aspect, and the session establishment device according to any implementation in the tenth aspect.

According to a twelfth aspect, a communications system is provided, including the session establishment device according to any implementation in the seventh aspect and the session establishment device according to any implementation in the ninth aspect.

According to a thirteenth aspect, an SMF entity is provided. The SMF entity includes a unit or means configured to perform steps of any method according to the first aspect.

According to a fourteenth aspect, an SMF entity is provided. The SMF entity includes a processor and a memory. The memory is configured to store a computer program, and the processor invokes the computer program stored in the memory to perform any method according to the first aspect.

According to a fifteenth aspect, an SMF entity is provided. The SMF entity includes at least one processor element or chip configured to perform any method according to the first aspect.

According to a sixteenth aspect, a program is provided. A processor executes the program to perform any method according to the first aspect.

According to a seventeenth aspect, a computer readable storage medium is provided, including the program according to the sixteenth aspect.

According to an eighteenth aspect, an SMF entity is provided. The SMF entity includes a unit or means configured to perform steps of any method according to the second aspect.

According to a nineteenth aspect, an SMF entity is provided. The SMF entity includes a processor and a memory. The memory is configured to store a computer program, and the processor invokes the computer program stored in the memory to perform any method according to the second aspect.

According to a twentieth aspect, an SMF entity is provided. The SMF entity includes at least one processor element or chip configured to perform any method according to the second aspect.

According to a twenty-first aspect, a program is provided. A processor executes the program to perform any method according to the second aspect.

According to a twenty-second aspect, a computer readable storage medium is provided, including the program according to the twenty-first aspect.

According to a twenty-third aspect, a terminal device is provided. The terminal device includes a unit or means configured to perform steps of any method according to the third aspect.

According to a twenty-fourth aspect, a terminal device is provided. The terminal device includes a processor and a memory. The memory is configured to store a computer program, and the processor invokes the computer program stored in the memory to perform any method according to the third aspect.

According to a twenty-fifth aspect, a terminal device is provided. The terminal device includes at least one processor element or chip configured to perform any method according to the third aspect.

According to a twenty-sixth aspect, a program is provided. A processor executes the program to perform any method according to the third aspect.

According to a twenty-seventh aspect, a computer readable storage medium is provided, including the program according to the twenty-sixth aspect.

According to a twenty-eighth aspect, a terminal device is provided. The terminal device includes a unit or means configured to perform steps of any method according to the fourth aspect.

According to a twenty-ninth aspect, a terminal device is provided. The terminal device includes a processor and a memory. The memory is configured to store a computer program, and the processor invokes the computer program stored in the memory to perform any method according to the fourth aspect.

According to a thirtieth aspect, a terminal device is provided. The terminal device includes at least one processor element or chip configured to perform any method according to the fourth aspect.

According to a thirty-first aspect, a program is provided. A processor executes the program to perform any method according to the fourth aspect.

According to a thirty-second aspect, a computer readable storage medium is provided, including the program according to the thirty-first aspect.

According to a thirty-third aspect, an AMF entity is provided. The AMF entity includes a unit or means configured to perform steps of any method according to the fifth aspect.

According to a thirty-fourth aspect, an AMF entity is provided. The AMF entity includes a processor and a memory. The memory is configured to store a computer program, and the processor invokes the computer program stored in the memory to perform any method according to the fifth aspect.

According to a thirty-fifth aspect, an AMF entity is provided. The AMF entity includes at least one processor element or chip configured to perform any method according to the fifth aspect.

According to a thirty-sixth aspect, a program is provided. A processor executes the program to perform any method according to the fifth aspect.

According to a thirty-seventh aspect, a computer readable storage medium is provided, including the program according to the thirty-sixth aspect.

BRIEF DESCRIPTION OF DRAWINGS

FIG. 8A and FIG. 8B are a signaling diagram of yet another session establishment method according to an embodiment of this application;

DESCRIPTION OF EMBODIMENTS

The embodiments of this application are applied to a 5G communications system or another system that may emerge in the future. The following describes some terms used in this application, to facilitate understanding of a person skilled in the art. It should be noted that, when solutions in the embodiments of this application are applied to the 5G communications system or the another system that may emerge in the future, names of a network device and a terminal may change, but this does not affect implementation of the solutions in the embodiments of this application.

The following describes the technical solutions of the embodiments in this application with reference to accompanying drawings.

Figure 1:
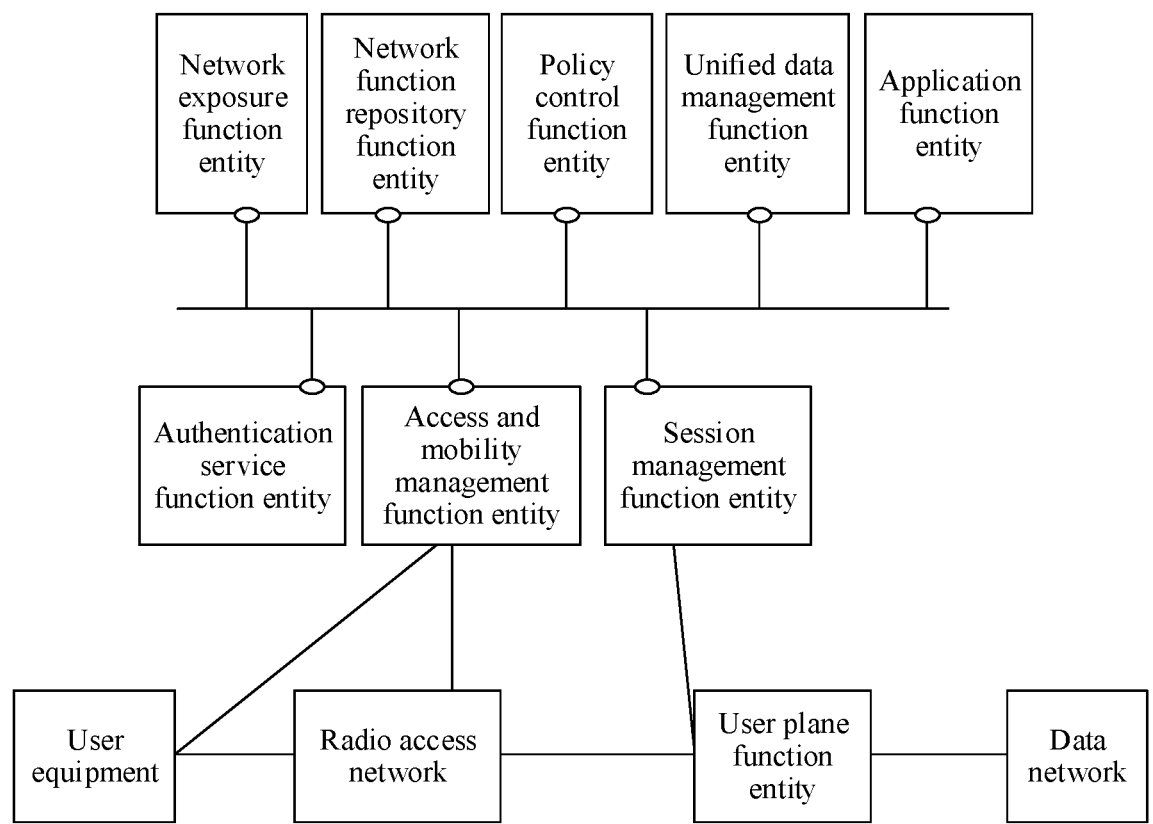
FIG. 1 provides an architectural diagram of a network structure.
Figure 2:
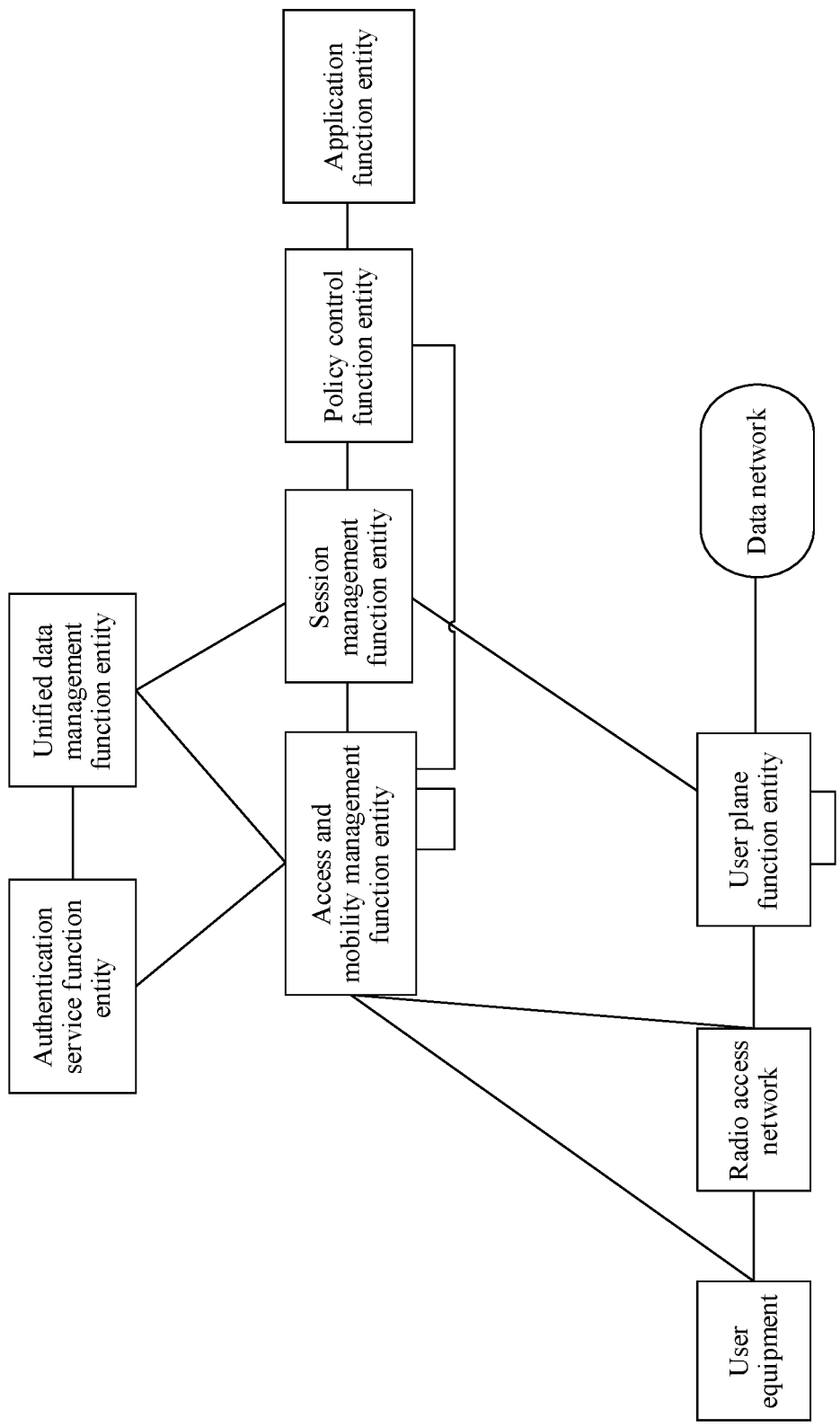
FIG. 2 provides an architectural diagram of a network structure.

FIG. 1 provides an architectural diagram of a network structure, and FIG. 2 provides an architectural diagram of a network structure. The network structures may be applied to a next-generation communications system. FIG. 1 is an architectural diagram of a service-based 5G network architecture. Nnrf in FIG. 1 is a name of a service-based interface (e.g., for an NF repository function). A circle on each network entity in FIG. 1 indicates that the network entity exposes an Nnrf interface to another network entity. In addition, the network entity provides a service for another network entity through the Nnrf interface, and the another network entity may obtain, through the Nnrf interface, the service provided by the network entity. FIG. 2 is an architectural diagram of an interface-based 5G network architecture. As shown in FIG. 2, network entities communicate with each other through interfaces in a next-generation network architecture, and a terminal also communicates with a network entity through an interface. N1, N2, N3, N4, N5, N6, N7, N8, N9, N10, N11, N12, N13, N14, N15, and the like in FIG. 1 and FIG. 2 are interfaces. A network entity may alternatively be referred to as a network element, a network node, or a communications node. The following briefly describes components in the network structures shown in FIG. 1 and FIG. 2.

Mobile communications technologies are updated and upgraded, and research and standardization for 5G technology have been launched. The 5G technology may be applied to fields such as mobile broadband, multimedia, machine type communication (MTC), industrial control, and an intelligent transportation system (ITS). To meet greatly changing service requirements, a 5G network needs to be flexibly constructed. A flexible 5G construction manner is to separate network functions. To be specific, a control plane (CP) function and a user plane (UP) function are separated, and a mobility management (MM) function and a session management (SM) function at a CP are separated. A network slicingtechnology may be used to separate the network functions.

The network slicing technology may be used to divide a physical network into a plurality of virtual end-to-end virtual networks. Each divided virtual network, including a device, an access technology, a transmission path, a core network, and the like that are in the virtual network, is logically independent. Each network slice includes one instance of an independent network function or one instance of a function combination. Each network slice has a different function feature, and faces a different requirement and service. The network slices are separated from each other, so that different users or user groups can flexibly and dynamically customize a network capability based on different application scenarios and requirements. A network slice is a logical network, and the logical network may provide a specific network function and a specific network feature for each network entity in the network.

A network slice includes a control plane function (CPF) entity and a user plane function (UPF) entity. The CPF entity includes an access and mobility management function (AMF) entity and a session management function (SMF) entity. The CPF entity mainly completes functions such as access authentication, security encryption, and location registration that are of a terminal, and completes functions such as establishment, release, and modification of a user plane transmission path. The UPF entity mainly completes functions such as routing and forwarding of user plane data.

A terminal may include various handheld devices, vehicle-mounted devices, wearable devices, or computing devices that have a communication function, or another processing device connected to a wireless modem, and terminals in various forms such as a mobile station (MS), a terminal, user equipment (UE), and a software terminal, for example, a water meter, an electricity meter, and a sensor.

A radio access network (RAN) is a network including a plurality of 5G-RAN nodes, and implements a radio physical layer function, resource scheduling and radio resource management, radio access control, and a mobility management function. For example, a 5G-RAN is connected to a UPF entity through a user plane interface N3, to transmit data of a terminal. The 5G-RAN establishes a control plane signaling connection to an AMF entity through a control plane interface N2, to implement functions such as radio access bearer control. The RAN may alternatively be represented as an (R)AN.

An authentication credential repository and processing function (ARPF) entity is configured to generate a security vector used for authentication between UE and a network, and may be used as a part of a UDM entity.

An authentication server function (AUSF) entity is a full-function node, and is configured to: receive an authentication vector request from an AMF entity, and return, to the AMF entity, a 5G authentication vector obtained from an ARPF entity or a UDM entity; or further process a 5G authentication vector obtained from an ARPF entity or a UDM entity, and then return a processed 5G authentication vector to an AMF entity, so that the 5G authentication vector is used for security authentication between a terminal and a network side.

An AMF entity is responsible for authentication of a terminal, mobility management of a terminal, network slice selection, selection of an SMF entity, access authorization and access authentication, a security-related function, and the like. In addition, the AMF entity may serve as an anchor for connection between an N1 interface and an N2 interface, and provide routing of N1/N2 SM information for an SMF entity. In addition, the AMF entity may maintain and manage status information of a terminal, and participate in a broadcast session.

An SMF entity is responsible for a terminal session, allocating and controlling a UPF entity, allocating and managing an internet protocol (IP) address of a terminal, managing quality of service (QoS) of a session, obtaining a policy control and charging (PCC) policy from a policy control function (PCF) entity, a termination of an SM part of a non-access stratum (NAS) message, notifying downlink data, determining a session and service continuity (SSC) mode of a session, a roaming function, and the like. In this application, the SMF entity may be responsible for broadcast session management, including establishment, update, and release of a broadcast session, allocation of a broadcast session identifier, and the like. In this application, the SMF entity may further receive broadcast received quality information reported by a terminal, to complete switching from broadcast transmission to unicast transmission.

A data network (DN) provides an external data network service.

A network exposure function (NEF) entity is responsible for connecting an SMF entity and an external DN network, and is configured to provide a secure method for exposing a service and a capability of a $3^{rd}$ generation partnership project (3GPP) network, translate information exchanged between an application function (AF) entity and an internal network, receive information from another network entity, and expose the information to an internal network element or an application service function network element.

A UPF entity serves as an anchor point for connecting to a packet data unit (PDU) session, and is responsible for filtering a data packet of a terminal, data transmission and forwarding, rate control, charging information generation, packet detection and policy application, transmission usage reporting, user-plane QoS processing, uplink transmission authentication, transmission grade verification, downlink data packet buffering, downlink data notification triggering, a branch point supporting a multi-homed PDU session, and the like.

A unified data management function (UDM) entity allocates reference information to a network entity, for example, allocates reference information to an SMF entity or an NEF entity.

A PCF entity allocates reference information to a network entity, for example, allocates reference information to an SMF entity or an NEF entity. In addition, the PCF supports a unified policy architecture to control network behavior. The PCF may provide, for a control plane function, a policy rule used by an entity on the control plane function to execute, so that a front end accesses subscription information related to policy decision in a unified data repository (UDR).

A network slice selection function (NSSF) entity is configured to select an appropriate network slice for UE.

An AF entity is an application function, configured to provide interaction between an external application and a PCF entity of a core network, and is mainly configured to perform policy and charging control on an IP-connectivity access network (IP-CAN) corresponding to the application, and may be further configured to access an NEF and affect communication routing.

A network function repository function (NF repository function, NRF) entity is further provided, and an NF is a network function.

Identity (ID): A VPLMN entity, an HPLMN entity, an SMF entity, a terminal, and the like may have their own IDs.

A PDU session is a unicast session.

Path: A path designed in the embodiments of this application is a transmission path, that meets a specific QoS requirement, of user plane data from a network side to a user terminal, and corresponds to a concept of a bearer in a long-term evolution (LTE) system. A broadcast path is a path on which user plane data is sent from a network side to UE through broadcast transmission, and a unicast path is a path on which user plane data is sent to the UE through unicast transmission.

Broadcast means that a data source sends data to a plurality of receivers, may alternatively be referred to as multicast, and includes data distribution modes of 1:all and 1:n. The data distribution mode 1:all indicates that a data source sends data to all receivers, and the data distribution mode 1:n indicates that a data source sends data to n receivers. Received downlink data is sent through a broadcast channel between a base station and an air interface.

It should be noted that the terms used in the embodiments of this application may be mutually referenced.

The communications network entities may establish a broadcast path in a specific network area or geographic area, to broadcast service data to a terminal located in the network area or geographic area, thereby improving utilization efficiency of network transmission resources. As 3GPP technologies expand to vertical fields, increasing service scenarios suitable for broadcast/multicast are generated. For example, the service scenarios suitable for broadcast/multicast include a group call service, remote upgrade of an internet of things (JOT), and internet of vehicles broadcasting. Followed by that is more diversified business models. In a multimedia broadcast/multicast service (MBMS), a terminal may perform a broadcast session. In this case, the terminal may be in receive only mode, or the terminal may be in receive only mode and have a separate unicast connection. In a public land mobile network (PLMN), a terminal may perform a unicast session. In this case, the terminal may be in receive only mode and have a separate unicast connection. The terminal may scan a pre-broadcast resource and read a system message. It can be known that, the terminal may be configured to receive only a broadcast radio resource, and does not need to subscribe to a PLMN operator server. In this case, the terminal is applicable to receiving a television service. Alternatively, the terminal may subscribe to a PLMN operator server, so that the terminal simultaneously receives unicast data and broadcast data through a PLMN operator network. The terminal may be configured to receive a specific service or specific content.

In another scenario, a 5G network entity may support a group mode, and the 5G network entity may learn of which terminals belong to a same group. Usually, these groups may be groups created based on a service type, or a geographic area, or a network area. Further, terminals belonging to a same group generally have a same physical location or a same service behavior. Each terminal in a group may perform a broadcast session or a unicast session. The group may be an internal group defined by a mobile communications network, or may be an external group defined by a third-party application. There may be a specific mapping relationship, for example, a one-to-one mapping relationship, between an internal group and an external group. The mapping relationship may be stored in a UDM entity.

Figure 3A:
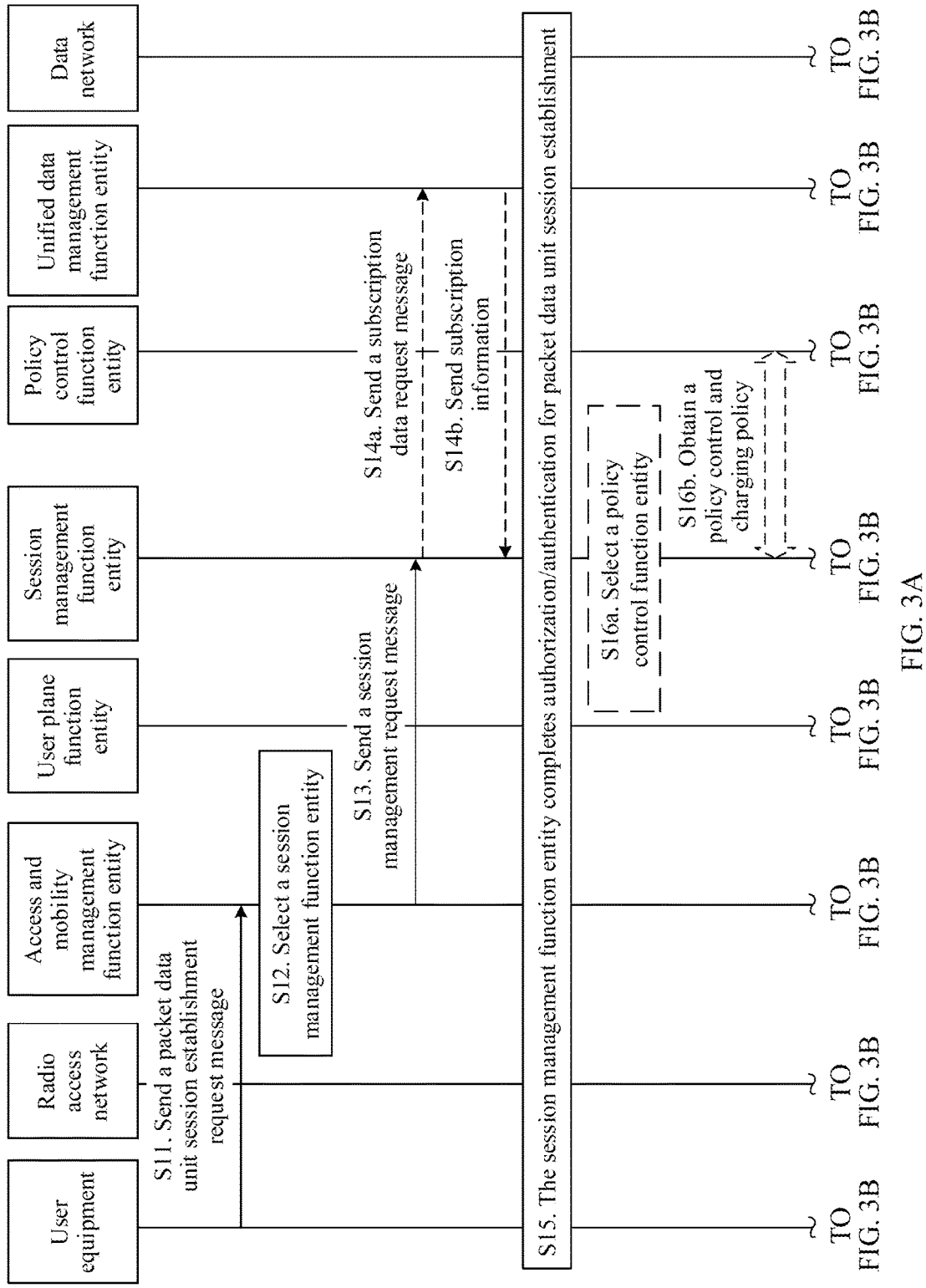
FIG. 3A to FIG. 3C are a signaling diagram of a PDU session establishment method according to the related art.
Figure 3B:
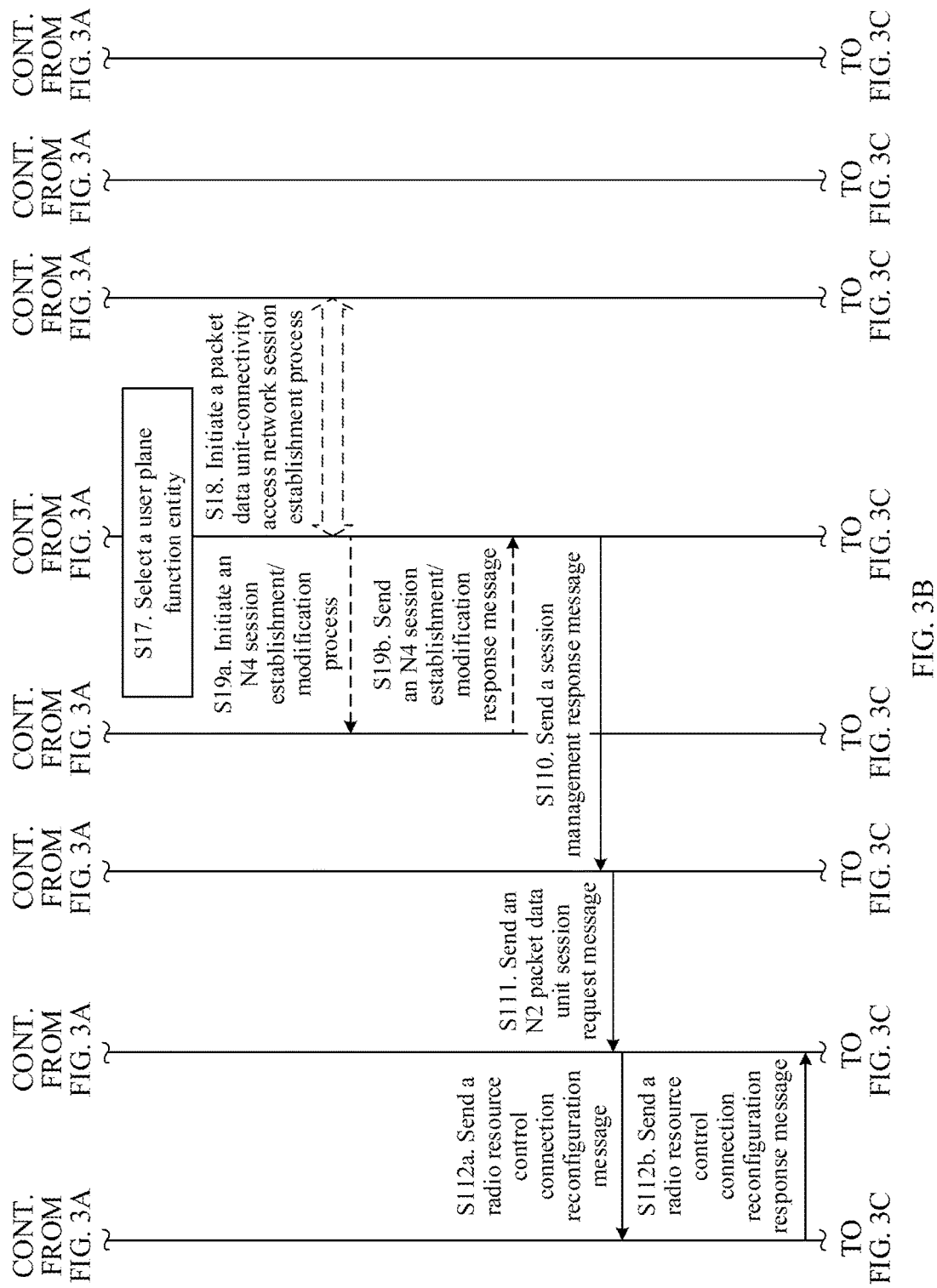
Figure 3C:
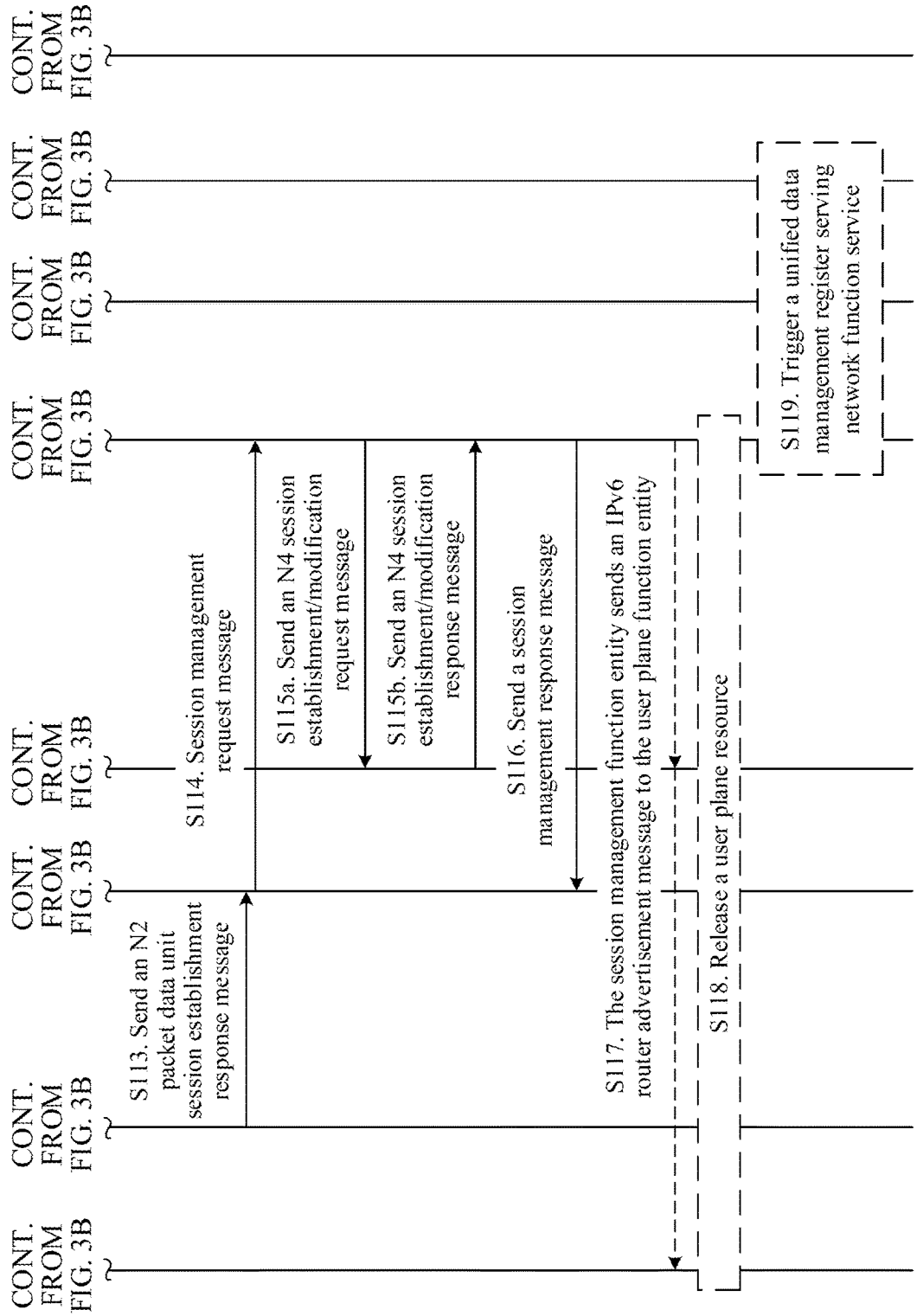

FIG. 3A to FIG. 3C are a signaling diagram of a PDU session establishment method according to the related art. As shown in FIG. 3A to FIG. 3C, the PDU session establishment method in the related art is described as follows:

S11. A terminal sends a PDU session establishment request message to an AMF entity.

Specifically, first, the terminal has registered with the AMF entity, and the AMF entity has obtained subscription information of a user from a UDM entity.

Then, the terminal generates a new PDU session identifier. Then, the terminal sends the PDU session establishment request message to the AMF entity. The PDU session establishment request message is a NAS message. Then, the terminal initiates a PDU session establishment procedure. The PDU session establishment request message includes session management-network slice selection assistance information (S-NSSAI) corresponding to a PDU session, a data network name (DNN) corresponding to the PDU session, a PDU session identifier, a request type, and N1 SM information (N1 session management information). For example, a format of the PDU session establishment request message is (S-NSSAI, DNN, PDU session ID, request type, N1 SM information). The S-NSSAI is the session management-network slice selection assistance information corresponding to the PDU session, the DNN is the data network name corresponding to the PDU session, the PDU session ID is the PDU session identifier, the request type is the request type, and the N1 SM information is the N1 SM information. The request type in the PDU session establishment request message may be an initial request type, an emergency request type, an existing session request type, an existing emergency session request type, or the like. The N1 SM information is session management information of an N1 reference point. The reference point herein is a reference point between the AMF entity and the terminal. The N1 SM information may include a parameter of a session management PDU data network request container (SM PDU DN request container), and the parameter includes information used by an external DN to authorize a PDU session.

In addition, the PDU session establishment request message may further include a PDU type and an SSC mode. The PDU type is a type of a packet data unit, for example, an internet protocol version 4 (IPv4), an internet protocol version 6 (IPv6), an Ethernet, and unstructured. The SSC mode represents session and service continuity. The SSC mode includes three modes: a mode 1, a mode 2, and a mode 3. The mode 1 means that a connection for the terminal is maintained on a network side, and may be referred to as a persistent connection. The mode 2 is a manner in which an original connection is disconnected and then a new connection is established. The mode 3 is a manner in which a new connection is established and then the original connection is disconnected.

S12. The AMF entity selects an SMF entity.

Specifically, the AMF entity determines, based on the request type and the PDU session ID in the PDU session establishment request message, that the received PDU session establishment request message indicates that the terminal is to request a PDU session. Further, the AMF entity selects an SMF entity according to a preset rule, and the AMF entity stores the PDU session ID and an identifier of the selected SMF entity. The identifier of the selected SMF entity may be represented as an SMF ID. For a rule for selecting an SMF entity, refer to a rule in the related art.

S13. The AMF entity sends an SM request message to the SMF entity.

Specifically, the AMF entity sends the SM request message to the SMF entity. The SM request message includes a subscriber permanent identifier (subscriber permanent ID), the DNN, the S-NSSAI, the PDU session identifier, the N1 SM information, user location information, and an access technology type. The access technology type includes a 3GPP type and a non-3GPP type. For example, a format of the SM request message is (subscriber permanent ID, DNN, S-NSSAI, PDU session ID, AMF ID, N1 SM information (PDU session ID, PDU session establishment request), user location information, access technology type). The AMF ID represents an identifier of the AMF entity.

S14a. The SMF entity sends a subscription data request message to the UDM entity.

Specifically, if the SMF entity has not obtained SM-related subscription information of the terminal from a DNN entity, the SMF entity needs to send the subscription data request message to the UDM entity to obtain the SM-related subscription information. The subscription data request message includes the subscriber permanent ID and the DNN. For example, a format of the subscription data request message is (subscriber permanent ID, DNN).

S14b. The UDM entity sends subscription information to the SMF entity.

Specifically, the UDM entity sends a subscription data response message to the SMF entity. The subscription data response message includes the subscription information, and the subscription information includes, for example, an authorized PDU type, an authorized SSC mode, and a default QoS profile. Then, the SMF entity performs an authorization check on the subscription information. If the SMF entity determines that the authorization check fails, the SMF entity sends NAS signaling to the terminal. The NAS signaling indicates that a session establishment request of the terminal is rejected.

S15. The SMF entity completes authorization/authentication for PDU session establishment.

Specifically, if the SMF entity needs to authorize/authenticate the PDU session establishment, the SMF entity needs to first select a UPF entity according to a rule, and then the SMF entity triggers the authorization/authentication for the PDU session establishment, to complete the authorization/authentication for the PDU session establishment. For a rule for selecting an UPF entity, refer to a rule in the related art.

S16a. The SMF entity selects a PCF entity according to a rule.

Specifically, if a dynamic PCC needs to be deployed, the SMF entity needs to select a PCF entity according to the rule. For a rule for selecting a PCF entity, refer to a rule in the related art.

S16b. The SMF entity obtains a PCC rule.

Specifically, the SMF entity sends a PDU-controller area network (CAN) session establishment request (PDU-CAN Session Establishment) to the selected PCF entity, to obtain a PCC rule corresponding to the PDU session.

S17. The SMF entity selects a UPF entity.

Specifically, if step S15 is not performed, in this step, the SMF entity selects a UPF entity, and the SMF entity selects an SSC mode.

S18. The SMF entity initiates a PDU-CAN session establishment procedure.

Specifically, if a dynamic PCC is deployed, and a PDU-CAN session is not established, the SMF entity initiates the PDU-CAN session establishment procedure to the PCF entity, and then the SMF entity obtains a default PCC rule from the PCF entity. If the request type sent by the terminal indicates that a PDU session exists, the SMF entity initiates PDU-CAN session modification, and the SMF entity sends an allocated IP address of the terminal to the PCF entity.

S19a. The SMF entity initiates an N4 session establishment/modification procedure to the UPF entity.

Specifically, if the request type is the initial request type, the SMF entity sends an N4 session establishment message to the UPF entity; otherwise, the SMF entity sends an N4 session modification message to the UPF entity. The SMF entity provides packet detection, a report rule, and CN tunnel information for the UPF entity.

S19b. The UPF entity sends an N4 session establishment/modification response message to the SMF entity, where the N4 session establishment/modification response message may include the CN tunnel information.

S110. The SMF entity sends an SM response message to the AMF entity.

Specifically, the SM response message includes a cause value, N2 reference point session management information (N2 SM information), and N1 SM information. The IPv4 address herein is an IPv4 address allocated by the SMF entity. A reference point in the N2 reference point session management information is a reference point between the AMF entity and the SMF entity. The N2 reference point session management information includes the PDU session identifier, the QoS profile(s), and the CN tunnel information. The N1 SM information includes a PDU session establishment accept message, and the PDU session establishment accept message includes an authorized quality of service rule (authorized QoS rule), the SSC mode, the S-NSSAI, and the IPv4 address (allocated IPv4 address). For example, a format of the SM response message is (cause, N2 SM information (PDU session ID, QoS profile(s), CN tunnel info), N1 SM information (PDU session establishment accept (authorized QoS rule, SSC mode, S-NSSAI, allocated IPv4 address))). The CN tunnel information in the N2 SM information is specifically a core network address of an N3 tunnel. The authorized QoS rule includes a QoS rule identifier, an identifier of an associated QoS flow, a packet filter set, a priority value, and terminal-related QoS parameters. The QoS rule identifier is unique in a PDU session. For example, the terminal-related QoS parameters include a 5G QoS indicator (5QI), a guaranteed bit rate (GBR), a maximum bit rate (MBR), and the like.

S111. The AMF entity sends an N2 PDU session request message to a RAN entity.

Specifically, the AMF entity sends the N2 PDU session request message to the RAN entity, and the N2 PDU session request includes the N2 SM information and a NAS message. The NAS message includes the PDU session identifier and the PDU session establishment accept message. For example, a format of the N2 PDU session request is (N2 SM information, NAS message (PDU session ID, PDU session establishment accept)).

S112a. The RAN entity sends a radio resource control (RRC) connection reconfiguration message to the terminal.

Specifically, the RAN entity sends the RRC connection reconfiguration message to the terminal, and the RAN entity allocates a necessary RAN resource based on a QoS rule. For example, the RAN entity allocates N3 tunnel information. In addition, the RAN forwards a NAS message (PDU session ID, N1 SM information (PDU session establishment accept)) to the terminal.

S112b. The terminal may send an RRC connection reconfiguration response message to the RAN entity.

S113. The RAN entity sends an N2 PDU session establishment response message to the AMF entity.

Specifically, the N2 PDU session response message includes the PDU session identifier, a cause value, and N2 SM information. The N2 SM information herein includes the PDU session identifier, access network tunnel information ((R)AN tunnel info), and a list of accepted/rejected QoS profile(s) (list of accepted/rejected QoS profile(s)). For example, a format of the N2 PDU session establishment response message is (PDU session ID, cause, N2 SM information (PDU session ID, (R)AN tunnel info, list of accepted/rejected QoS profile(s))).

S114. The AMF entity sends an SM request message to the SMF entity.

Specifically, the SM request message includes the N2 SM information in step S113. Then, the AMF entity forwards, to the SMF entity, the N2 SM information from the RAN entity.

S115a. The SMF entity sends an N4 session establishment/modification request message to the UPF entity.

Specifically, if an N4 session is not established, the SMF entity initiates an N4 session establishment procedure. If an N4 session has been established, the SMF entity initiates an N4 session modification procedure, to update access network (AN) tunnel information and core network (CN) tunnel information.

S115b. The UPF entity sends an N4 session establishment/modification response message to the SMF entity.

S116. The SMF entity sends an SM response message to the AMF entity.

Specifically, the SM response message includes a cause value cause.

S117. The SMF entity sends an IPv6 router advertisement message to the UPF entity.

Specifically, the IPv6 router advertisement message (IPv6 router advertisement) carries an IPv6 address prefix allocated by the SMF entity.

S118. The SMF entity releases a user plane resource.

Specifically, if the PDU session is triggered by switching between 3GPP and non-3GPP, the SMF entity needs to release an original user plane resource on an access side.

S119. The SMF entity triggers a unified data management register service network function (UDM-Unified data management, UDM Register UE serving NF) service.

Specifically, if the identifier of the SMF entity is not included in step 14b, the SMF entity triggers the UDM Register UE serving NF service, so that the SMF entity exchanges a service request with the PCF entity and the UDM entity. The service request includes an address of the SMF entity and a DNN, the UDM entity needs to store the identifier of the SMF entity, the address of the SMF entity, and an associated DNN.

It can be learned in FIG. 3A to FIG. 3C, the terminal actively initiates a PDU session establishment procedure.

When the terminal receives downlink data through a broadcast path, the terminal needs to be switched from the broadcast path to a unicast path. In a first case, when the terminal enters a broadcast receive mode, for example, when the terminal enters the broadcast receive mode starting from pre-configuration startup, the terminal may start to receive broadcast data. When broadcast received quality is poor, a network entity on a network side needs to switch a receive transmission mode of the terminal to a unicast transmission mode. In other words, the terminal is switched from the broadcast path to the unicast path. In this case, a unicast session establishment procedure needs to be triggered to establish the unicast path. In a second case, when the terminal already performs a unicast session, but the unicast session cannot meet a requirement of a current service, a procedure of establishing a new unicast session needs to be triggered to establish a new unicast path. In a third case, when broadcast received quality reported by most terminals received on a network side is poor, a network entity on the network side may switch downlink data of a service transmitted on the broadcast path to a unicast transmission mode, and further, the network entity on the network side needs to switch all terminals connected to the network side to the unicast transmission mode. Therefore, the network entity on the network side needs to switch, to the unicast transmission mode, another terminal that does not report poor broadcast received quality, and a unicast session establishment procedure needs to be triggered. In a fourth case, a network side needs to switch a terminal in a specific group from a broadcast transmission mode to a unicast transmission mode, so that a unicast session establishment procedure needs to be triggered. In the foregoing several cases, in the related art, a terminal can only actively initiate a PDU session establishment procedure, or a terminal can only actively initiate a PDU session establishment procedure after an application server sends a notification to the terminal. In both manners, the terminal actively initiates the PDU session establishment procedure, and a process shown in FIG. 3A to FIG. 3C may be used.

Figure 4:
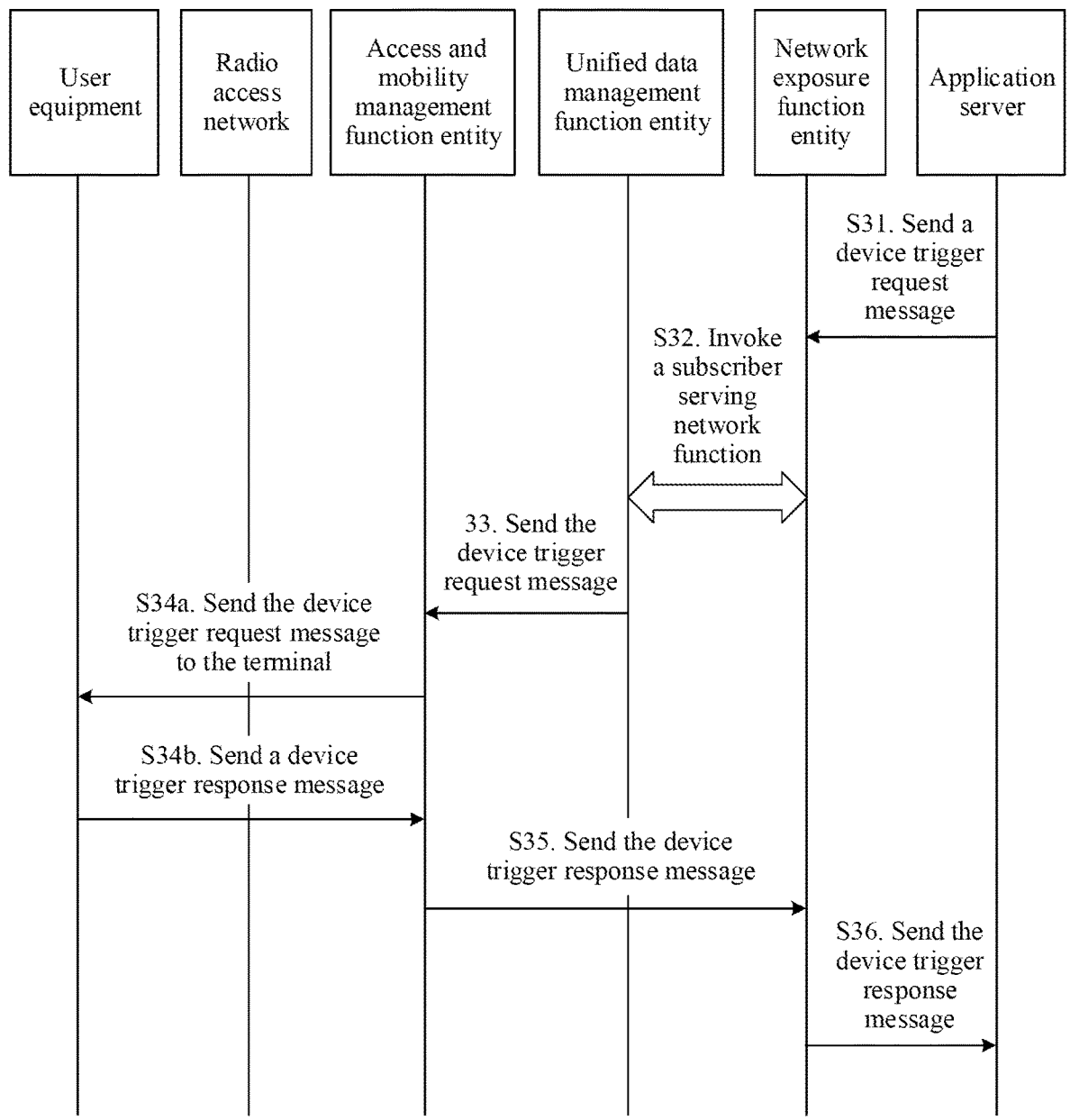
FIG. 4 is a signaling diagram of a method for triggering PDU session establishment according to the related art.

In the related art, FIG. 4 is a signaling diagram of a method for triggering PDU session establishment according to the related art. As shown in FIG. 4, the method for triggering PDU session establishment in the related art is described as follows:

S31. An application server sends a device trigger request message to an NEF entity.

Specifically, the NEF receives the device trigger request message sent by the application server. The device trigger request message includes an external identifier or a mobile station international ISDN number (MSISDN). The device trigger request message further includes a requester identifier, a validity period, an application port ID, and a trigger payload. The application port ID is used to trigger an addressing function on a terminal, and the trigger payload includes information about a target application server on the terminal or includes information that is used by the terminal to find the target application server.

In addition, after S31, the NEF entity may complete authentication and authorization.

S32. The NEF entity invokes a subscriber serving network function.

Specifically, the NEF entity may obtain a subscription permanent identifier (SUPI) of the terminal by using a get subscriber serving NF (external identifier or MSISDN, NF type) message. The NF type represents a network function type, for example, indicates an AMF entity or an SMF entity.

S33. The NEF entity sends a device trigger request message to the AMF entity.

Specifically, the device trigger request message includes a UE permanent ID and a non-access stratum signaling container (NAS Container, NAS). The NAS container includes the application port ID and the trigger payload. For example, the device triggering request message is a device trigger request (UE permanent ID, NAS container).

S34*a*. The AMF entity sends a device trigger request message to the terminal.

Specifically, the AMF entity sends the device trigger request message to the terminal, and in this case, the device trigger request message may include only a NAS container. In this case, if the terminal is not in connected mode, the AMF entity pages the terminal.

S34*b*. The terminal sends a device trigger response message to the AMF entity.

S35. The AMF entity sends a device trigger response message to the NEF entity.

Specifically, after the terminal receives the NAS container, because the trigger payload identifies an application server that needs to be notified and information of which the application server needs to be notified. For example, the trigger payload indicates to request to establish a PDU session, and the terminal may further determine the application server that needs to be notified and the information of which the application server needs to be notified. Then, the AMF entity sends the device trigger response message to the NEF entity.

S36. The NEF entity sends the device trigger response message to the application server.

After step S36, the steps shown in FIG. 3A to FIG. 3C are performed.

This application first provides a method and a device for actively initiating a PDU session establishment procedure on a network side.

Figure 5:
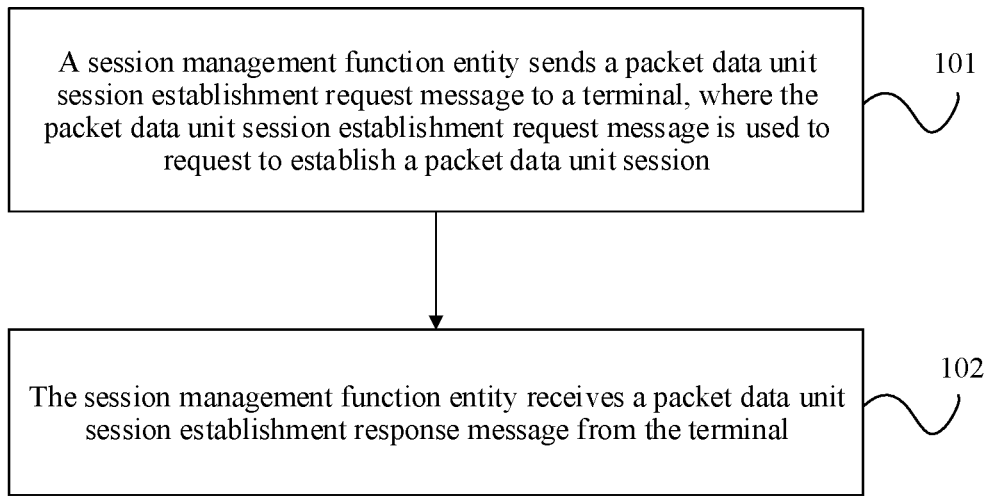
FIG. 5 is a flowchart of a session establishment method according to an embodiment of this application.

FIG. 5 is a flowchart of a session establishment method according to an embodiment of this application. As shown in FIG. 5, this embodiment of this application provides a session establishment method. The method is performed by an SMF entity. The method is described as follows:

101. The SMF entity sends a PDU session establishment request message to a terminal, where the PDU session establishment request message is used to request to establish a PDU session.

In an optional implementation, the PDU session establishment request message includes session establishment assistance information of the PDU session. Alternatively, the method provided in this embodiment further includes: sending, by the SMF entity, session establishment assistance information of the PDU session to the terminal.

The session establishment assistance information of the PDU session includes one or more of a broadcast session identifier and a group identifier, the broadcast session identifier is used to represent a broadcast session in which the terminal participates, and the group identifier is used to represent a group including the terminal.

In an optional implementation, the method provided in this embodiment further includes: selecting, by the SMF entity based on the broadcast session identifier, a UPF entity corresponding to the broadcast session, and sending a user plane session request to the UPF entity corresponding to the broadcast session; or selecting, by the SMF entity based on the group identifier, a UPF entity corresponding to the group identifier, and sending a user plane session request to the UPF entity corresponding to the group identifier. The user plane session request includes user plane forwarding rule information of the PDU session.

In an optional implementation, the PDU session establishment request message includes a session identifier of the PDU session. The method provided in this embodiment further includes: allocating, by the SMF entity, a session identifier to the PDU session.

In an optional implementation, the PDU session establishment request message includes information about QoS flow corresponding to the PDU session. The QoS flow is a finest granularity for data forwarding and processing in 5G. All data mapped to a same QoS flow uses a same forwarding and processing policy. The forwarding and processing policy includes, for example, a schedule policy, a queue management policy, a data shaping policy, and a radio link control protocol (RLC) configuration policy. Different QoS flows such as, a QoS profile, a QoS rule, and a service data flow template (SDF template) use different QoS forwarding rules, and different QoS flows may be identified by using QoS flow identifiers. The QoS profile includes but is not limited to the following QoS parameters: a 5QI, an allocation and retention priority (ARP), a reflective QoS attribute (RQA), a guaranteed flow bit rate-uplink and downlink (GFBR-UL and DL), a maximum flow bit rate (MFBR), and the like. The QoS rule is used to classify and mark user plane data, and includes a QoS rule identifier, a QFI (an identifier of an associated QoS flow), a packet filter set, and a priority value. The QoS rule identifier is unique in a PDU session. A dynamically allocated QoS rule also includes UE-related QoS parameters, such as a 5QI, a GBR, and an MBR. The SDF template is used to classify downlink data, and is used to determine a QoS flow on which a downlink data packet is transmitted.

In an optional implementation, the PDU session request message includes an identifier of the terminal. Alternatively, the method provided in this embodiment further includes: sending, by the SMF entity, an identifier of the terminal to an AMF entity.

The identifier of the terminal may be an SUPI, a subscription concealed identifier (SUCI), a permanent equipment identifier (PEI), or a protocol address of a user. The protocol address of the user is, for example, an IPv4 address, an IPv6 address, or a media access control (MAC) address. Description of the identifier of the terminal in another embodiment of this application is the same as the foregoing description.

For example, when the SMF entity determines that a PDU session needs to be established for the terminal, or when the SMF entity determines that the terminal needs to be switched from a broadcast path to a unicast path, the SMF entity sends a PDU session establishment request message to the AMF entity. The PDU session establishment request message is used to request to establish a PDU session. Then, the AMF entity sends the PDU session establishment request message to a RAN entity. Then, the RAN entity sends the PDU session establishment request message to the terminal. Optionally, the PDU session establishment request message includes the information about the QoS flow corresponding to the PDU session. Description of the information about the QoS flow is the same as that in the foregoing, and details are not described herein again.

Specifically, step 101 includes the following steps.

S21. When the SMF entity determines that the PDU session needs to be established for the terminal, or when the SMF entity determines that downlink data for the terminal needs to be switched from the broadcast path to the unicast path, the SMF entity determines to establish the PDU session for the terminal. Optionally, in this case, the SMF entity may allocate a session identifier to the PDU session.

S22a. Optionally, the SMF entity sends a subscription data request message to a UDM entity. Specifically, if the SMF entity has not obtained SM-related subscription information of the terminal from a DNN entity, the SMF entity needs to send the subscription data request message to the UDM entity to obtain the SM-related subscription information. The subscription data request message includes a subscription identifier and a DNN. For example, a format of the subscription data request message is (subscriber permanent ID, DNN), and the subscriber permanent ID is the subscription identifier.

S22b. Optionally, the UDM entity sends the subscription information to the SMF entity. Specifically, the UDM entity sends a subscription data response message to the SMF entity. The subscription data response message includes the subscription information, and the subscription information includes, for example, an authorized PDU type, an authorized SSC mode, and a default QoS profile. Then, the SMF entity performs an authorization check on the subscription information. If the SMF entity determines that the authorization check fails, the SMF entity sends NAS signaling to the terminal. The NAS signaling indicates that a session establishment request of the terminal is rejected.

S23. Optionally, the SMF entity completes authorization/authentication for PDU session establishment. A process in which the SMF entity completes the authorization/authentication for the PDU session establishment may be performed before or after any step in this embodiment.

S24. The SMF entity selects the UPF entity, and the SMF entity selects an SSC mode. Specifically, the SMF entity selects the UPF entity in the following several manners. Manner 1: When the SMF entity determines that a unicast session needs to be established for the terminal, the terminal selects a UPF entity according to a prior-art rule. Manner 2: When the SMF entity switches the terminal from the broadcast path to the unicast path, the SMF entity has learned of the broadcast session identifier, the SMF entity may select, based on the broadcast session identifier, the UPF entity corresponding to the broadcast session. It can be learned that the broadcast session identifier is used to represent the broadcast session in which the terminal participates. Manner 3: When the SMF entity determines to establish a unicast session for the terminal in the group or determines to switch the terminal in the group from the broadcast path to the unicast path, the SMF entity has learned of the group identifier, and the SMF entity may select, based on the group identifier, the UPF entity corresponding to the group identifier. It can be learned that the group identifier is used to represent the group including the terminal. Because the SMF entity selects, for the PDU session, the UPF entity corresponding to the broadcast session, the SMF entity may use a media forwarding policy the same as that used for the broadcast session. Alternatively, because the SMF entity selects the UPF entity corresponding to the group, the SMF entity may use a forwarding policy the same as that of the group or a media forwarding policy the same as that of another terminal in the group. In addition, the SMF entity may determine, based on the broadcast session identifier or the group identifier, an AMF entity to which the terminal is connected. In other words, the SMF entity may determine an AMF entity through which the terminal accesses a network. The group identifier may be a PLMN internal group identifier, or may be a PLMN external group identifier, for example, a group identifier established and maintained by a third-party application. PLMN internal group identifiers may alternatively one-to-one correspond to PLMN external groups.

S25. Optionally, the SMF entity initiates a PDU-CAN session establishment procedure. Specifically, if a dynamic PCC is deployed, and a PDU-CAN session is not established, the SMF entity initiates the PDU-CAN session establishment procedure to a PCF entity, and then the SMF entity obtains a default PCC rule from the PCF entity. If the SMF entity modifies an established PDU session, the SMF entity initiates PDU-CAN session modification, and the SMF entity sends an allocated IP address of the terminal to the PCF entity.

S26a. The SMF entity sends the user plane session request to the selected UPF entity. The SMF entity sends the user plane session request to the selected UPF entity in the following several manners. Manner 1: After the SMF entity selects the UPF entity corresponding to the broadcast session, the SMF entity sends the user plane session request to the UPF entity corresponding to the broadcast session. Manner 2: After the SMF entity selects the UPF entity corresponding to the group identifier, the SMF entity sends the user plane session request to the UPF entity corresponding to the group identifier. The user plane session request sent by the SMF entity includes the user plane forwarding rule information of the PDU session. The user plane session request is used to establish a user plane connection of the PDU session. The user plane session request may be referred to as an N4 session. Therefore, this step may alternatively be referred to as: The SMF entity initiates an N4 session establishment/modification procedure to the selected UPF entity. The user plane forwarding rule information of the PDU session may include one or more of the following information: packet detection information, enforcement and reporting rule information, CN tunnel information, and the like. The packet detection information and the execution and reporting rule information need to be applied to the PUD session. In this step, the SMF entity interacts with the UPF entity, to establish a user plane connection of a session and create a unicast path.

In an example, the UPF entity may set a user plane data transmission path of a multicast service based on the user plane forwarding rule information, for example, set a correspondence between a session identifier, a user plane multicast address of the multicast service, and an access network node. If the UPF entity further receives a downlink receiver address of the access network node and/or a tunnel identifier from a multicast session management network element, the UPF entity may further set a correspondence between the broadcast path and the downlink receiver address of the access network node. Alternatively, the UPF entity may set a correspondence between the broadcast path and the tunnel identifier, or set a correspondence between the broadcast path, the downlink receive address of the access network node, and the tunnel identifier. The broadcast path may use a broadcast path identifier, and may correspond to a temporary group identity (TMGI) in an LTE system, or correspond to a combination of a TMGI and an MBMS flow ID.

In another example, the UPF entity may map a received data packet to a broadcast data flow based on the user plane forwarding rule information, and then the UPF entity sends the data packet according to a QoS forwarding policy of the broadcast data flow.

S26b. The UPF entity sends an N4 session establishment/modification response message to the SMF entity, where the N4 session establishment/modification response message may include the CN tunnel information.

S27. The SMF entity sends the PDU session establishment request message to the AMF entity. Optionally, the PDU session establishment request message carries the session identifier allocated by the SMF entity to the PDU session. Specifically, the SMF entity sends the PDU session establishment request message to the AMF entity in the following several manners. Manner 1: The SMF entity sends the PDU session establishment request message to the AMF entity. Manner 2: The SMF entity allocates the session identifier to the PDU session, and then the SMF entity sends the PDU session establishment request message to the AMF entity. The PDU session establishment request message carries the session identifier allocated by the SMF entity to the PDU session. Manner 3: The SMF entity allocates the session identifier to the PDU session, and then the SMF entity sends an SMF request message to the AMF entity. The SMF request message includes the PDU session establishment request message and the session identifier allocated by the SMF entity to the PDU session.

Optionally, the SMF entity may send the session establishment assistance information of the PDU session to the AMF entity. The SMF entity sends the session establishment assistance information of the PDU session to the AMF entity in the following several manners. Manner 1: The SMF entity sends the PDU session establishment request message including the session establishment assistance information of the PDU session to the AMF entity. Manner 2: The SMF entity sends an SMF request message including the session establishment assistance information of the PDU session and the PDU session establishment request message to the AMF entity. The session establishment assistance information of the PDU session includes the broadcast session identifier and/or the group identifier.

For example, the SMF entity sends an SM request message to the AMF entity. The message is an N11 message, the SM request message is represented by using an SM request, and a format of the SM request is an SM request (PDU session establishment request, UE ID), session establishment assistance information ([broadcast session ID (or group identifier)]), [PDU session ID]). The PDU session establishment request is the PDU session establishment request message, the PDU session establishment request is NAS signaling, and the PDU session establishment request is used to request the terminal to establish a PDU session. The UE ID is a subscription identifier of the terminal. The broadcast session ID is an identifier of the broadcast session established for the terminal, and the group identifier is the identifier of the group including the terminal. The PDU session ID is the session identifier allocated by the SMF entity to the to-be-established PDU session. The session establishment assistance information may assist the AMF entity in determining a RAN entity through which the terminal accesses a network, and the session establishment assistance information is used by the AMF entity to send a paging message.

Optionally, after the AMF entity receives the session establishment assistance information, of the PDU session, that is sent by the SMF entity, because the session establishment assistance information of the PDU session includes one or more of the broadcast session identifier and the group identifier, the AMF entity select a RAN entity based on the session establishment assistance information of the PDU session. For example, the AMF entity selects a RAN entity corresponding to the broadcast session identifier, or the AMF entity selects a RAN entity corresponding to the group identifier.

Optionally, because the PDU session request message includes the identifier of the terminal, or the SMF entity sends the identifier of the terminal to the AMF entity, the AMF entity may select, based on the identifier of the terminal, a RAN entity corresponding to the identifier of the terminal, namely, a RAN entity through which the terminal accesses the network.

S28. The AMF entity sends the PDU session establishment request message to the selected RAN entity. Optionally, the PDU session establishment request message carries the session identifier allocated by the SMF entity to the PDU session, or the AMF entity sends, to the RAN entity, the session identifier allocated by the SMF entity to the PDU session. Optionally, the PDU session establishment request message carries the session establishment assistance information of the PDU session, or the AMF entity sends the session establishment assistance information of the PDU session to the RAN entity. For example, the AMF entity sends an N2 PDU session request message to the RAN entity. The N2 PDU session request message includes N2 SM information and a NAS message. The N2 SM information includes the session identifier and the session establishment assistance information of the PDU session, and the NAS message includes the session identifier and the session establishment assistance information of the PDU session, and the PDU session establishment request message. The N2 PDU session request message may be represented by using an N2 PDU session request: N2 PDU session request (N2 SM information ([PDU session ID], session establishment assistance information ([broadcast session ID (or group identifier)])), NAS message ([PDU session ID], session establishment assistance information ([broadcast session ID (or group identifier)]), PDU session establishment request)). The N2 SM information is the N2 SM information, and the NAS message is the NAS message.

S29. The RAN entity sends the PDU session establishment request message to the terminal. Optionally, the PDU session establishment request message carries the session identifier allocated by the SMF entity to the PDU session, or the AMF entity sends, to the RAN entity, the session identifier allocated by the SMF entity to the PDU session. Optionally, the PDU session establishment request message carries the session establishment assistance information of the PDU session, or the AMF entity sends the session establishment assistance information of the PDU session to the RAN entity.

For example, after the RAN entity receives the N2 PDU session request message sent by the AMF entity, the RAN entity adds the NAS message in the N2 PDU session request message into an RRC message, and sends the RRC message to the terminal. For another example, the RAN entity sends a PDU session establishment request (session establishment assistance information ([broadcast session ID]), [PDU session ID]) to the terminal.

102. The SMF entity receives a PDU session establishment response message from the terminal.

In an optional implementation, the PDU session establishment response message includes a session identifier of the PDU session. Alternatively, the method provided in this embodiment further includes: receiving, by the SMF entity, a session identifier of the PDU session from the terminal.

For example, after the terminal receives the PDU session establishment request message, the terminal generates the PDU session establishment response message, and the terminal sends the PDU session establishment response message to the RAN entity. Then, the RAN entity sends the PDU session establishment response message to the AMF entity. Then, the AMF entity sends the PDU session establishment response message to the SMF entity.

Specifically, step 102 includes the following steps.

S210*a*. After step S29, the terminal sends the PDU session establishment response message to the RAN entity. Optionally, the terminal also sends the session identifier of the PDU session to the RAN entity. Specifically, the terminal sends the session identifier of the PDU session to the RAN entity in the following several manners. Manner 1: The terminal sends the PDU session establishment response message to the RAN entity, and the PDU session establishment response message carries the session identifier of the PDU session. Manner 2: The terminal sends the PDU session establishment response message and the session identifier of the PDU session to the RAN entity.

In addition, the terminal sends the session identifier of the PDU session to the RAN entity in the following several cases: In a first case, the terminal does not receive a session identifier, of the PDU session, that is sent by the SMF entity, and the terminal allocates a session identifier of the PDU session. Then the terminal sends, to the RAN entity, the PDU session establishment response message including the session identifier, of the PDU session, that is allocated by the terminal; or the terminal directly sends, to the RAN entity, the session identifier, of the PDU session, that is allocated by the terminal. In a second case, the terminal receives the session identifier, of the PDU session, that is sent by the SMF entity, the session identifier, of the PDU session, that is sent by the SMF entity is a session identifier allocated by the SMF entity, and the terminal refuses to use the session identifier, of the PDU session, that is allocated by the SMF entity. Then, the terminal reallocates a session identifier of the PDU session, and the terminal sends, to the RAN entity, the PDU session establishment response message including the session identifier, of the PDU session, that is allocated by the terminal, or the terminal directly sends, to the RAN entity, the session identifier, of the PDU session, that is allocated by the terminal. In a third case, the terminal receives the session identifier, of the PDU session, that is sent by the SMF entity, the session identifier, of the PDU session, that is sent by the SMF entity is a session identifier allocated by the SMF entity, and the terminal determines to use the session identifier, of the PDU session, that is allocated by the SMF entity. Then, the terminal sends, to the RAN entity, the PDU session establishment response message including the received session identifier of the PDU session, or the terminal directly sends the received session identifier of the PDU session to the RAN entity.

S210*b*. The RAN entity sends the PDU session establishment response message to the AMF entity, where the PDU session establishment response message may be an N2 PDU session establishment response message. Optionally, the PDU session establishment response message includes the session identifier of the PDU session, or the RAN entity sends the session identifier of the PDU session to the AMF entity.

Then, if the AMF entity determines that the received session identifier of the PDU session is the session identifier allocated by the terminal, the AMF entity replaces a previously stored session identifier allocated by the SMF entity with the received session identifier of the PDU session, or the AMF entity directly stores the session identifier of the PDU session.

S211. The AMF entity sends the PDU session establishment response message to the SMF entity. Optionally, the PDU session establishment response message includes the session identifier of the PDU session, or the AMF entity sends the session identifier of the PDU session to the SMF entity. For example, the AMF entity sends an SM request with N2 information message to the SMF entity. The SM request with N2 information message includes the PDU session establishment response message and the session identifier of the PDU session. Then, if the SMF entity determines that the received session identifier of the PDU session is the session identifier allocated by the terminal, the SMF entity replaces a previously stored session identifier allocated by the current SMF entity with the received session identifier of the PDU session, or the SMF entity directly stores the session identifier of the PDU session. For example, the SMF entity replaces a previously stored session identifier PDU session ID allocated by the current SMF entity with the received session identifier PDU session ID' of the PDU session.

S212*a*. The SMF entity initiates an N4 session establishment procedure. Specifically, if an N4 session is not established, the SMF entity initiates the N4 session establishment procedure. If an N4 session has been established, the SMF entity initiates an N4 session modification procedure, to update AN tunnel information and CN tunnel information.

S212*b*. The SMF entity sends an SM response message to the AMF entity. Optionally, the SM response message includes a cause value cause.

S213. Optionally, the SMF entity sends an IPv6 router advertisement message to the UPF entity. Optionally, the IPv6 router advertisement message carries an IPv6 address prefix allocated by the SMF entity.

After the SMF entity sends the IPv6 router advertisement message to the UPF entity, the UPF entity may send the IPv6 router advertisement message to the terminal.

By now, the PDU session establishment procedure is completed, and then the UPF entity can send downlink data to the terminal through the unicast path by using the newly established PDU session.

According to the method provided in the foregoing embodiment, the SMF entity sends the PDU session establishment request message to the terminal, where the PDU session establishment request message is used to request to establish the PDU session. The SMF entity receives the PDU session establishment response message from the terminal. Optionally, the PDU session establishment response message includes the session identifier of the PDU session, or the SMF entity receives the session identifier of the PDU session from the terminal. Optionally, the SMF entity allocates the session identifier to the PDU session, and the PDU session establishment request message includes the session identifier of the PDU session. Therefore, a method for actively initiating the PDU session establishment procedure on a network side is provided. When the terminal needs to be switched from a broadcast path to the unicast path, the PDU session may be established for the terminal on the network side, to establish the unicast path. In addition, because it can be ensured that a same UPF entity is selected for the broadcast session on the broadcast path and for the unicast session on the unicast path on the network side, it can be ensured that user plane data is consistent and synchronized on the broadcast path and the unicast path when the user plane data is switched from the broadcast path to the unicast path. Negotiation performed when user plane downlink data is switched from the broadcast path to the unicast path is avoided, so that a delay of switching from the broadcast path to the unicast path can be reduced, to ensure fast and continuous switching of data, and ensure fast switching that meets service continuity requirements of a broadcast mode and a unicast mode. In addition, the network side triggers the terminal to establish the PDU session, and this can reduce signaling interaction in a process in which the terminal establishes the PDU session with the network side, and further reduce a delay.

Figure 6:
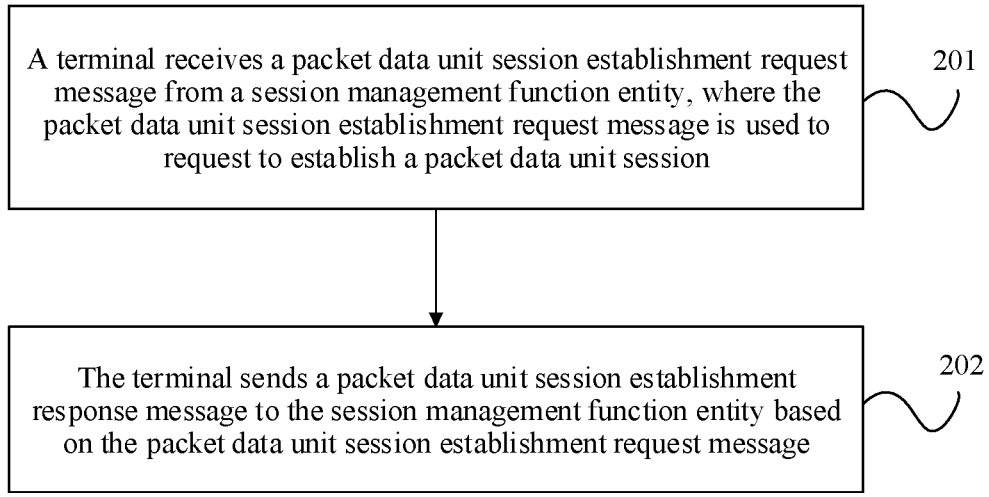
FIG. 6 is a flowchart of another session establishment method according to an embodiment of this application.

FIG. 6 is a flowchart of another session establishment method according to an embodiment of this application. As shown in FIG. 6, this embodiment of this application provides another session establishment method. The method is performed by a terminal. The method is described as follows:

201. The terminal receives a PDU session establishment request message from an SMF entity, where the PDU session establishment request message is used to request to establish a PDU session.

In an optional implementation, the PDU session establishment request message includes session establishment assistance information of the PDU session, and the method provided in this embodiment further includes: obtaining, by the terminal based on the session establishment assistance information of the PDU session, information about a QoS flow corresponding to the PDU session. Alternatively, the method provided in this embodiment further includes: receiving, by terminal, session establishment assistance information of the PDU session from the SMF entity, and obtaining, based on the session establishment assistance information of the PDU session, information about a QoS flow corresponding to the PDU session. Description of the QoS flow is the same as that in the foregoing embodiment, and details are not described herein again.

The session establishment assistance information of the PDU session includes one or more of a broadcast session identifier and a group identifier, the broadcast session identifier is used to represent a broadcast session in which the terminal participates, and the group identifier is used to represent a group including the terminal.

In an optional implementation, the PDU session establishment request message includes a session identifier of the PDU session.

202. The terminal sends a PDU session establishment response message to the SMF entity based on the PDU session establishment request message.

In an optional implementation, the PDU session establishment response message includes a session identifier of the PDU session. Alternatively, the method provided in this embodiment further includes: sending, by the terminal, a session identifier of the PDU session to the SMF entity.

In an optional implementation, the method provided in this embodiment may further include step 203:

203. The terminal allocates a session identifier to the PDU session based on the PDU session establishment request message.

For steps in this embodiment, refer to descriptions of the steps in FIG. 5.

According to the method provided in the foregoing embodiment, the terminal receives the PDU session establishment request message from the SMF entity, where the PDU session establishment request message is used to request to establish the PDU session. The terminal sends the PDU session establishment response message to the SMF entity. Optionally, the PDU session establishment response message includes the session identifier of the PDU session, or the SMF entity receives the session identifier of the PDU session from the terminal. Optionally, the SMF entity allocates the session identifier to the PDU session, and the PDU session establishment request message includes the session identifier of the PDU session. Therefore, a method for actively initiating the PDU session establishment procedure on a network side is provided. When the terminal needs to be switched from a broadcast path to a unicast path, the PDU session may be established for the terminal on the network side, to establish the unicast path. In addition, because it can be ensured that a same UPF entity is selected by a broadcast session for the broadcast path and is selected by a unicast session for the unicast path on the network side, it can be ensured that user plane data is consistent and synchronized on the broadcast path and the unicast path when the user plane data is switched from the broadcast path to the unicast path. Negotiation performed when user plane downlink data is switched from the broadcast path to the unicast path is avoided, so that a delay of switching from the broadcast path to the unicast path can be reduced, to ensure fast and continuous switching of data, and ensure fast switching that meets service continuity requirements of a broadcast mode and a unicast mode. In addition, the network side triggers the terminal to establish the PDU session, and this can reduce signaling interaction in a process in which the terminal establishes the PDU session with the network side, and further reduce a delay.

Figure 7:
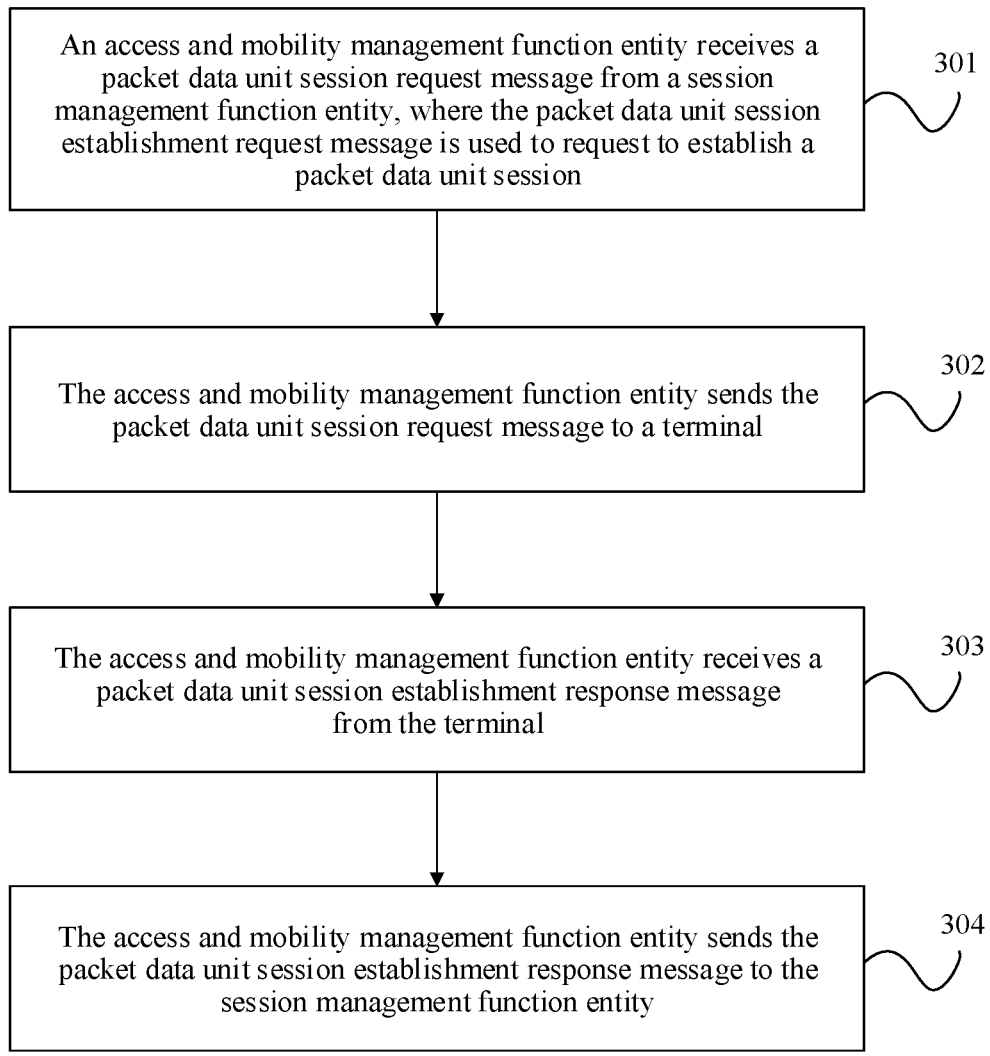
FIG. 7 is a flowchart of still another session establishment method according to an embodiment of this application.

FIG. 7 is a flowchart of still another session establishment method according to an embodiment of this application. As shown in FIG. 7, this embodiment of this application provides still another session establishment method. The method is performed by an AMF entity. The method is described as follows:

301. The AMF entity receives a PDU session request message from an SMF entity, where the PDU session establishment request message is used to request to establish a PDU session.

In an optional implementation, the PDU session establishment request message includes session establishment assistance information of the PDU session. Alternatively, the method provided in this embodiment further includes: receiving, by the AMF entity, session establishment assistance information of the PDU session from the SMF entity.

The session establishment assistance information of the PDU session includes one or more of a broadcast session identifier and a group identifier, the broadcast session identifier is used to represent a broadcast session in which a terminal participates, and the group identifier is used to represent a group including the terminal.

In an optional implementation, the PDU session request message includes an identifier of the terminal. Alternatively, the method provided in this embodiment further includes: receiving, by the AMF entity, an identifier of the terminal from the SMF entity.

302. The AMF entity sends the PDU session request message to the terminal.

In an optional implementation, step 302 includes the following two implementations:

In a first implementation of step 302, the AMF entity selects a radio access network function RAN entity based on the session establishment assistance information of the PDU session, and the AMF entity sends the PDU session request message to the terminal through the RAN entity.

In a second implementation of step 302, the AMF entity selects a RAN entity based on the identifier of the terminal, and the AMF entity sends the PDU session request message to the terminal through the RAN entity.

In an example, optionally, after the AMF entity receives the session establishment assistance information, of the PDU session, that is sent by the SMF entity, because the session establishment assistance information of the PDU session includes one or more of the broadcast session identifier and the group identifier, the AMF entity select a RAN entity based on the session establishment assistance information of the PDU session. For example, the AMF entity selects a RAN entity corresponding to the broadcast session identifier, or the AMF entity selects a RAN entity corresponding to the group identifier.

Optionally, because the PDU session request message includes the identifier of the terminal, or the SMF entity sends the identifier of the terminal to the AMF entity, the AMF entity may select, based on the identifier of the terminal, a RAN entity corresponding to the identifier of the terminal, namely, a RAN entity through which the terminal accesses a network.

303. The AMF entity receives a PDU session establishment response message from the terminal.

304. The AMF entity sends the PDU session establishment response message to the SMF entity.

For steps in this embodiment, refer to descriptions of the steps in FIG. 5.

According to the method provided in the foregoing embodiment, the AMF entity receives the PDU session request message from the SMF entity, where the PDU session establishment request message is used to request to establish the PDU session. The AMF entity sends the PDU session request message to the terminal. The AMF entity receives the PDU session establishment response message from the terminal, and sends the PDU session establishment response message to the SMF entity. Optionally, the PDU session establishment response message includes a session identifier of the PDU session, or the SMF entity receives a session identifier of the PDU session from the terminal. Optionally, the SMF entity allocates a session identifier to the PDU session, and the PDU session establishment request message includes the session identifier of the PDU session. Therefore, a method for actively initiating the PDU session establishment procedure on a network side is provided. When the terminal needs to be switched from a broadcast path to a unicast path, the PDU session may be established for the terminal on the network side, to establish the unicast path. In addition, because it can be ensured that a same UPF entity is selected by the broadcast session for the broadcast path and is selected by a unicast session for the unicast path on the network side, it can be ensured that user plane data is consistent and synchronized on the broadcast path and the unicast path when the user plane data is switched from the broadcast path to the unicast path. Negotiation performed when user plane downlink data is switched from the broadcast path to the unicast path is avoided, so that a delay of switching from the broadcast path to the unicast path can be reduced, to ensure fast and continuous switching of data, and ensure fast switching that meets service continuity requirements of a broadcast mode and a unicast mode. In addition, the network side triggers the terminal to establish the PDU session, and this can reduce signaling interaction in a process in which the terminal establishes the PDU session with the network side, and further reduce a delay.

Figure 8A:
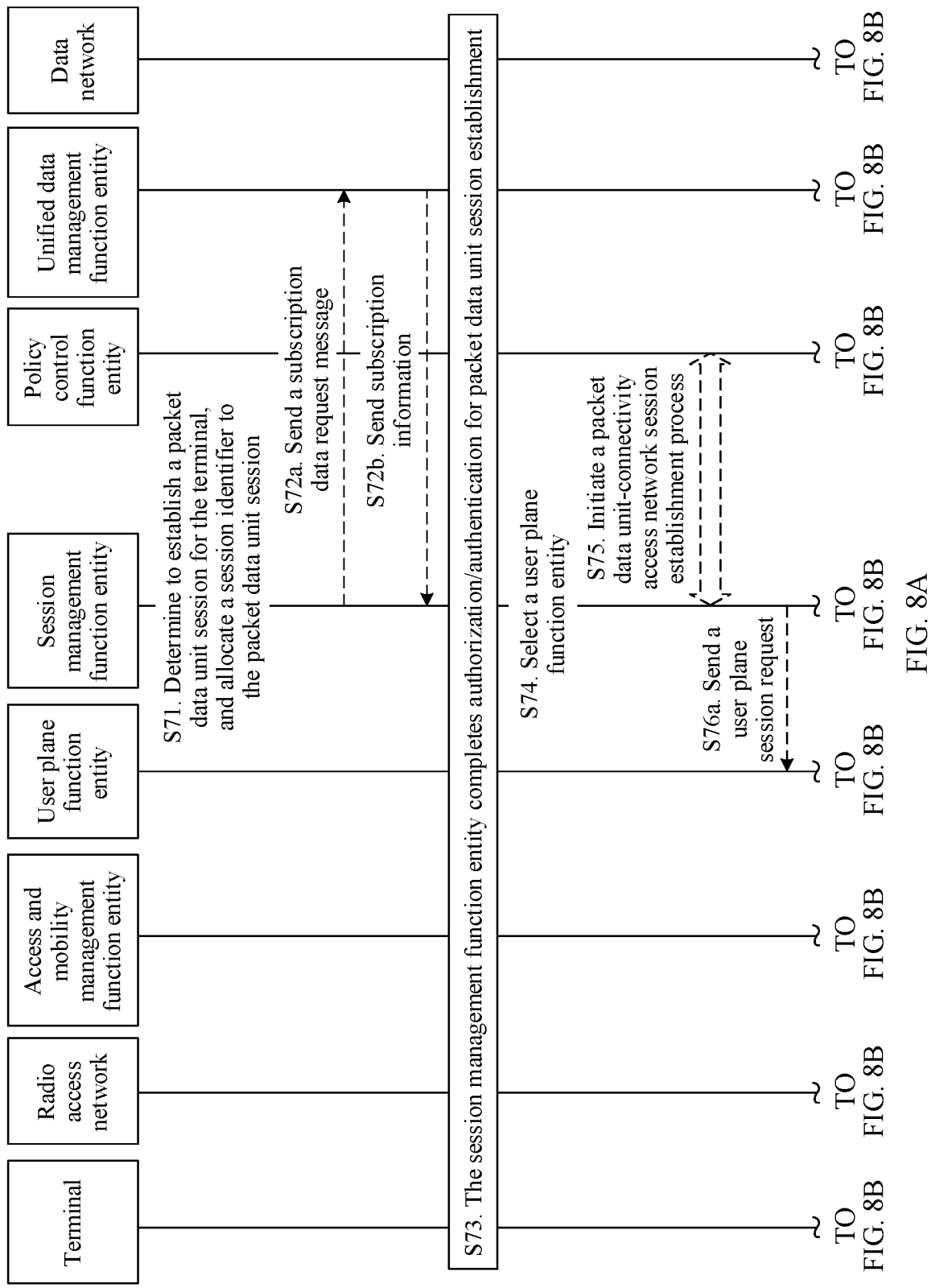

FIG. 8A and FIG. 8B are a signaling diagram of yet another session establishment method according to an embodiment of this application. As shown in FIG. 8A and FIG. 8B, this embodiment of this application provides yet another session establishment method. The method is described as follows:

S71. An SMF entity determines to establish a PDU session for a terminal, and the SMF entity allocates a session identifier PDU session ID to the PDU session.

In an example, for this step, refer to step 101 in FIG. 5.

S72*a*. Optionally, the SMF entity sends a subscription data request message to a UDM entity.

In an example, for this step, refer to step 101 in FIG. 5.

S72*b*. Optionally, the UDM entity sends subscription information to the SMF entity.

In an example, for this step, refer to step 101 in FIG. 5.

S73. The SMF entity completes authorization/authentication for PDU session establishment.

In an example, for this step, refer to step 101 in FIG. 5.

S74. The SMF entity selects a UPF entity.

In an optional implementation, the SMF entity selects, based on a broadcast session identifier, a user plane function UPF entity corresponding to a broadcast session, or the SMF entity selects, based on a group identifier, a UPF entity corresponding to the group identifier.

In an example, for this step, refer to step 101 in FIG. 5.

S75. Optionally, the SMF entity initiates a PDU-CAN session establishment procedure.

In an example, for this step, refer to step 101 in FIG. 5.

S76*a*. Optionally, the SMF entity sends a user plane session request to the selected UPF entity, where the user plane session request includes user plane forwarding rule information of the PDU session.

In an example, for this step, refer to step 101 in FIG. 5.

S76*b*. Optionally, the UPF entity sends CN tunnel information to the SMF entity.

In an example, for this step, refer to step 101 in FIG. 5.

S77. The SMF entity sends a PDU session establishment request message to an AMF entity.

In this step, the PDU session establishment request message includes the session identifier PDU session ID of the PDU session, or the SMF entity sends the PDU session establishment request message and the session identifier PDU session ID of the PDU session to the AMF entity.

In an optional implementation, the PDU session establishment request message includes session establishment assistance information of the PDU session. Alternatively, the method provided in this embodiment further includes: sending, by the SMF entity, session establishment assistance information of the PDU session to the terminal.

The session establishment assistance information of the PDU session includes one or more of a broadcast session identifier and a group identifier, the broadcast session identifier is used to represent a broadcast session in which the terminal participates, and the group identifier is used to represent a group including the terminal.

In an example, for this step, refer to step 101 in FIG. 5.

S78. The AMF entity sends the PDU session establishment request message to a RAN entity.

In this step, the PDU session establishment request message includes the session identifier PDU session ID of the PDU session, or the AMF entity sends the PDU session establishment request message and the session identifier PDU session ID of the PDU session to the RAN entity.

In an example, for this step, refer to step 101 in FIG. 5.

S79. The RAN entity sends the PDU session establishment request message to the terminal.

In this step, the PDU session establishment request message includes the session identifier PDU session ID of the PDU session, or the RAN entity sends the PDU session establishment request message and the session identifier PDU session ID of the PDU session to the terminal.

In an example, for this step, refer to step 101 in FIG. 5.

S710a. The terminal sends a PDU session establishment response message to the RAN entity.

In this step, the PDU session establishment response message includes the session identifier PDU session ID of the PDU session, or the terminal sends the PDU session establishment response message and the session identifier PDU session ID of the PDU session to the RAN entity. In this case, the session identifier PDU session ID of the PDU session is the session identifier allocated by the SMF entity. In other words, the terminal determines to use the session identifier allocated by the SMF entity.

S710b. The RAN entity sends the PDU session establishment response message to the AMF entity.

In this step, the PDU session establishment response message includes the session identifier PDU session ID of the PDU session, or the RAN entity sends the PDU session establishment response message and the session identifier PDU session ID of the PDU session to the AMF entity. In this case, the session identifier PDU session ID of the PDU session is the session identifier allocated by the SMF entity.

In an example, for this step, refer to step 102 in FIG. 5.

S711. The AMF entity sends the PDU session establishment response message to the SMF entity.

In this step, the PDU session establishment response message includes the session identifier PDU session ID of the PDU session, or the AMF entity sends the PDU session establishment response message and the session identifier PDU session ID of the PDU session to the SMF entity. In this case, the session identifier PDU session ID of the PDU session is the session identifier allocated by the SMF entity.

In an example, for this step, refer to step 102 in FIG. 5.

S712a. The SMF entity initiates an N4 session establishment procedure.

In an example, for this step, refer to step 102 in FIG. 5.

S712b. The SMF entity sends an SM response message to the AMF entity.

In an example, for this step, refer to step 102 in FIG. 5.

S713. Optionally, the SMF entity sends an IPv6 router advertisement message to the UPF entity.

In an example, for this step, refer to step 102 in FIG. 5.

By now, the PDU session establishment procedure is completed, and then the UPF entity can send downlink data to the terminal by using the newly established PDU session. In this embodiment, the SMF entity allocates the session identifier of the PDU session. After the terminal receives the session identifier, of the PDU session, that is allocated by the SMF entity, the terminal uses the session identifier, of the PDU session, that is allocated by the SMF entity.

Figure 9A:
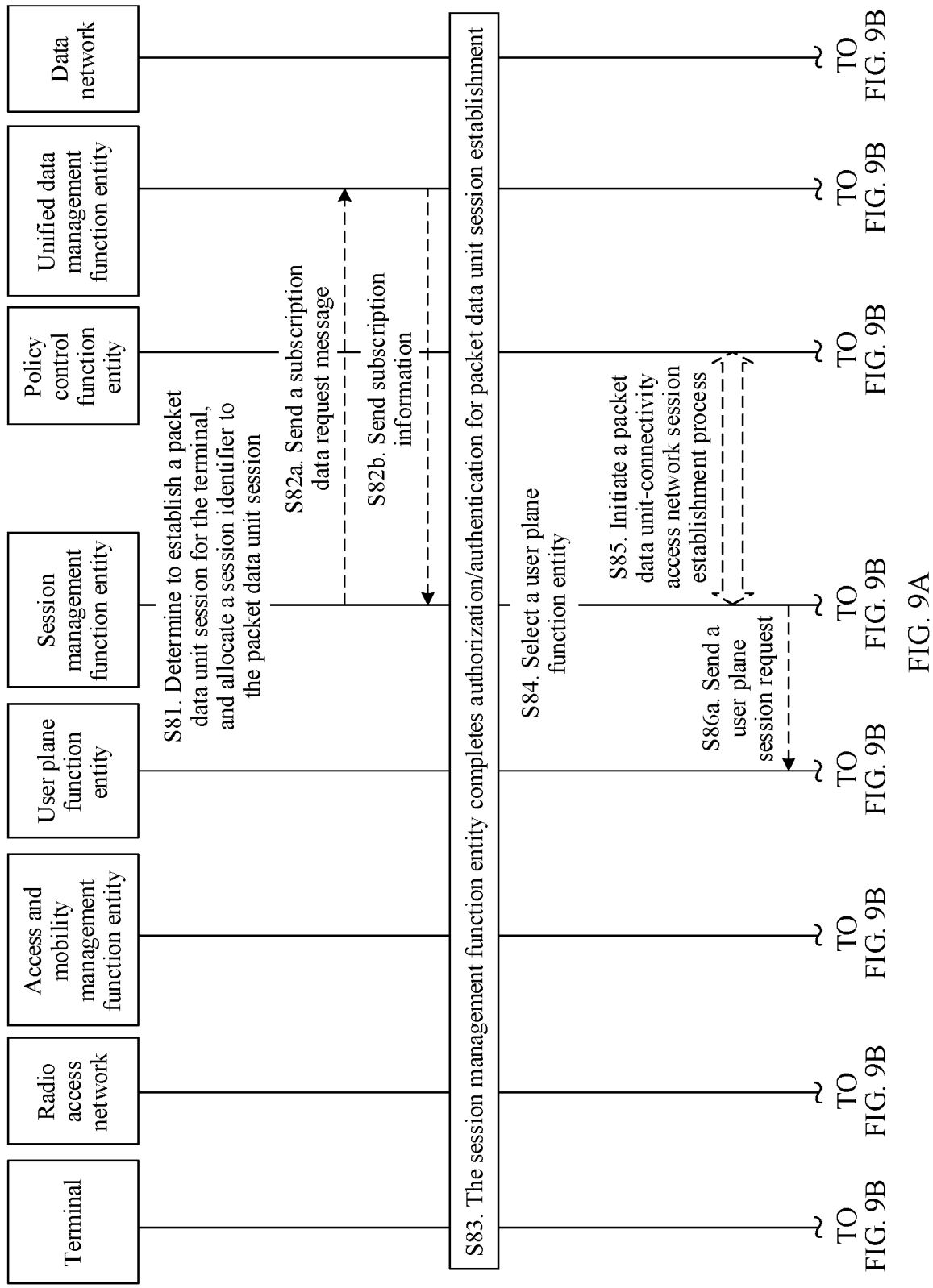
FIG. 9A and FIG. 9B are a signaling diagram of still yet another session establishment method according to an embodiment of this application.
Figure 9B:
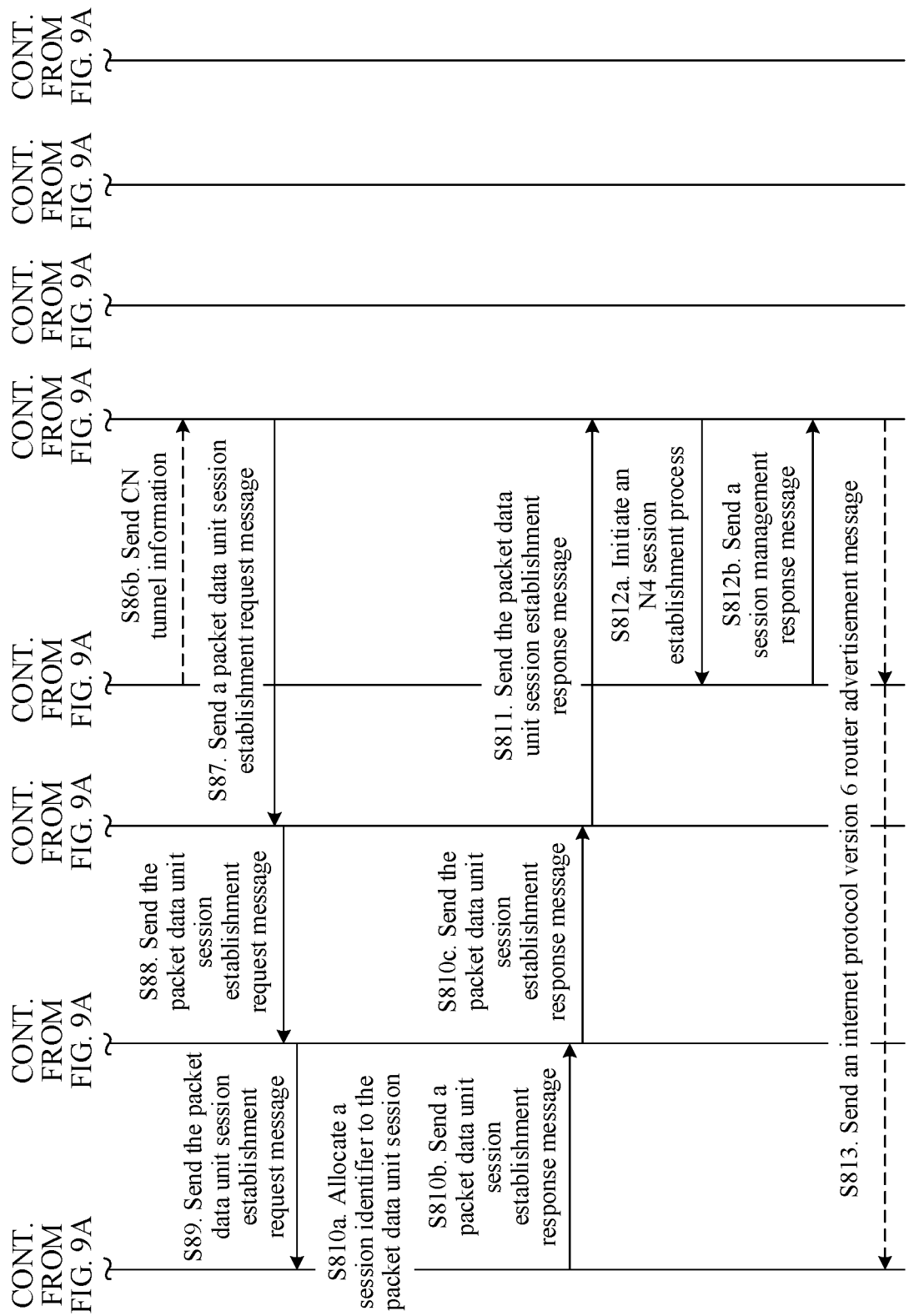

FIG. 9A and FIG. 9B are a signaling diagram of still yet another session establishment method according to an embodiment of this application. As shown in FIG. 9A and FIG. 9B, this embodiment of this application provides still yet another session establishment method. The method is described as follows:

S81. An SMF entity determines to establish a PDU session for a terminal, and the SMF entity allocates a session identifier PDU session ID to the PDU session.

In an example, for this step, refer to step 101 in FIG. 5.

S82a. Optionally, the SMF entity sends a subscription data request message to a UDM entity.

In an example, for this step, refer to step 101 in FIG. 5.

S82b. Optionally, the UDM entity sends subscription information to the SMF entity.

In an example, for this step, refer to step 101 in FIG. 5.

S83. The SMF entity completes authorization/authentication for PDU session establishment.

In an example, for this step, refer to step 101 in FIG. 5.

S84. The SMF entity selects a UPF entity.

In an optional implementation, the SMF entity selects, based on a broadcast session identifier, a user plane function UPF entity corresponding to a broadcast session, or the SMF entity selects, based on a group identifier, a UPF entity corresponding to the group identifier.

In an example, for this step, refer to step 101 in FIG. 5.

S85. Optionally, the SMF entity initiates a PDU-CAN session establishment procedure.

In an example, for this step, refer to step 101 in FIG. 5.

S86a. Optionally, the SMF entity sends a user plane session request to the selected UPF entity, where the user plane session request includes user plane forwarding rule information of the PDU session.

In an example, for this step, refer to step 101 in FIG. 5.

S86b. Optionally, the UPF entity sends CN tunnel information to the SMF entity.

In an example, for this step, refer to step 101 in FIG. 5.

S87. The SMF entity sends a PDU session establishment request message to an AMF entity.

In this step, the PDU session establishment request message includes the session identifier PDU session ID of the PDU session, or the SMF entity sends the PDU session establishment request message and the session identifier PDU session ID of the PDU session to the AMF entity.

In an optional implementation, the PDU session establishment request message includes session establishment assistance information of the PDU session. Alternatively, the method provided in this embodiment further includes: sending, by the SMF entity, session establishment assistance information of the PDU session to the terminal.

The session establishment assistance information of the PDU session includes one or more of a broadcast session identifier and a group identifier, the broadcast session identifier is used to represent a broadcast session in which the terminal participates, and the group identifier is used to represent a group including the terminal.

In an example, for this step, refer to step 101 in FIG. 5.

S88. The AMF entity sends the PDU session establishment request message to a RAN entity.

In this step, the PDU session establishment request message includes the session identifier PDU session ID of the PDU session, or the AMF entity sends the PDU session establishment request message and the session identifier PDU session ID of the PDU session to the RAN entity.

In an example, for this step, refer to step 101 in FIG. 5.

S89. The RAN entity sends the PDU session establishment request message to the terminal.

In this step, the PDU session establishment request message includes the session identifier PDU session ID of the PDU session, or the RAN entity sends the PDU session establishment request message and the session identifier PDU session ID of the PDU session to the terminal.

In an example, for this step, refer to step 101 in FIG. 5.

S810a. The terminal allocates a session identifier to the PDU session.

In this step, the terminal receives the session identifier PDU session ID allocated by the SMF entity to the PDU session, but the terminal refuses to use the session identifier PDU session ID allocated by the SMF entity to the PDU session. Then, the terminal allocates the session identifier PDU session ID' to the PDU session.

S810b. The terminal sends a PDU session establishment response message to the RAN entity.

In this step, the PDU session establishment response message includes the session identifier PDU session ID' allocated by the terminal to the PDU session, or the terminal sends, to the RAN entity, the session identifier PDU session ID' allocated by the terminal to the PDU session.

S810c. The RAN entity sends the PDU session establishment response message to the AMF entity.

In this step, the PDU session establishment response message includes the PDU session ID', or the RAN entity sends the PDU session establishment response message and the PDU session ID' to the AMF entity.

In an example, for this step, refer to step 102 in FIG. 5.

S811. The AMF entity sends the PDU session establishment response message to the SMF entity.

In this step, the PDU session establishment response message includes the PDU session ID', or the AMF entity sends the PDU session establishment response message and the PDU session ID' to the SMF entity.

In an example, for this step, refer to step 102 in FIG. 5.

S812a. The SMF entity initiates an N4 session establishment procedure.

In an example, for this step, refer to step 102 in FIG. 5.

S812b. The SMF entity sends an SM response message to the AMF entity.

In an example, for this step, refer to step 102 in FIG. 5.

S813. Optionally, the SMF entity sends an IPv6 router advertisement message to the UPF entity.

In an example, for this step, refer to step 102 in FIG. 5.

By now, the PDU session establishment procedure is completed, and then the UPF entity can send downlink data to the terminal by using the newly established PDU session. In this embodiment, the SMF entity allocates the session identifier of the PDU session. After the terminal receives the session identifier, of the PDU session, that is allocated by the SMF entity, the terminal determines not to use the session identifier, of the PDU session, that is allocated by the SMF entity, but allocates the session identifier of the PDU session.

Figure 10A:
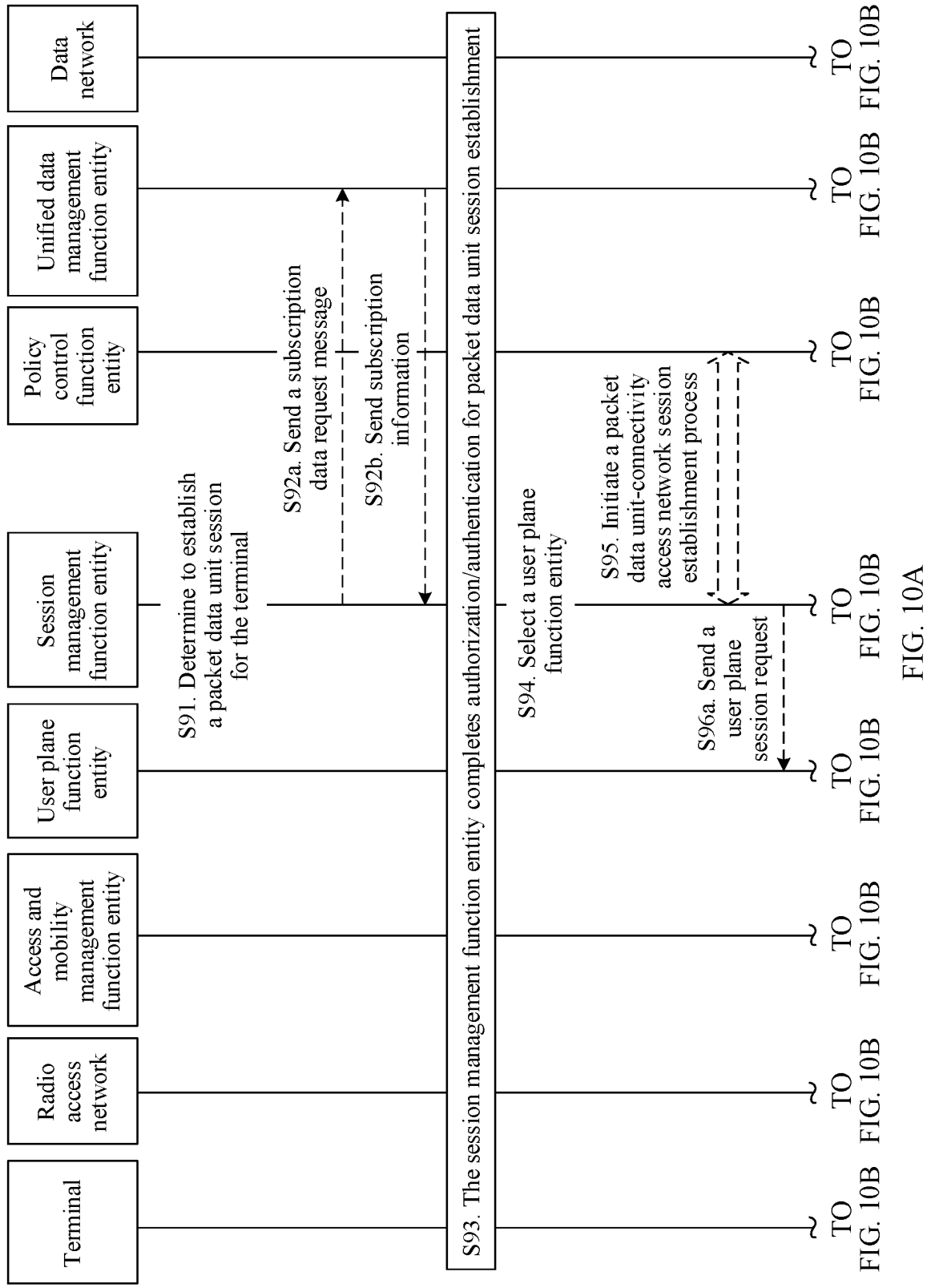
FIG. 10A and FIG. 10B are a signaling diagram of a further session establishment method according to an embodiment of this application.
Figure 10B:
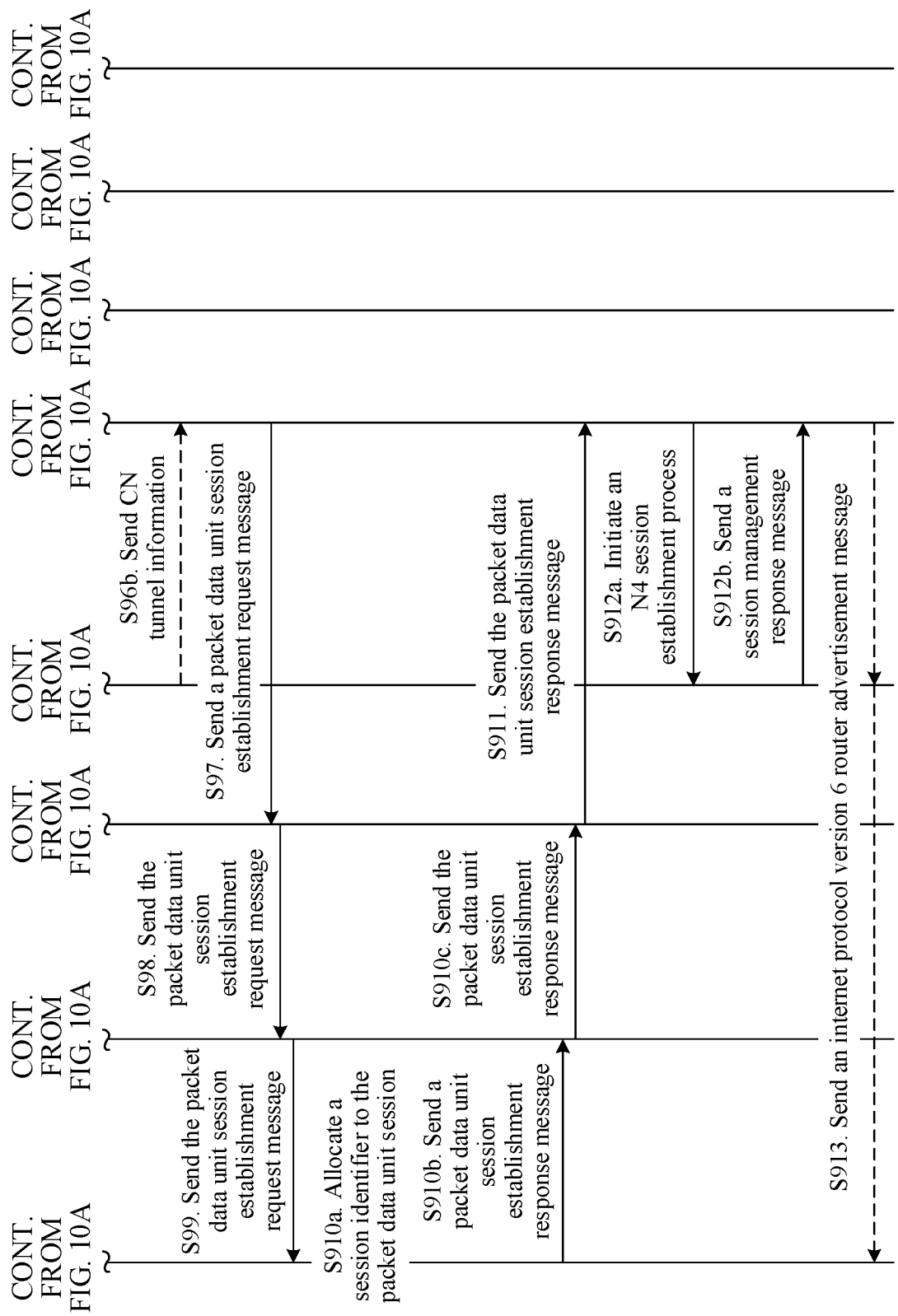

FIG. 10A and FIG. 10B are a signaling diagram of a further session establishment method according to an embodiment of this application. As shown in FIG. 10A and FIG. 10B, this embodiment of this application provides a further session establishment method. The method is described as follows:

S91. An SMF entity determines to establish a PDU session for a terminal.

In an example, for this step, refer to step 101 in FIG. 5.

S92a. Optionally, the SMF entity sends a subscription data request message to a UDM entity.

In an example, for this step, refer to step 101 in FIG. 5.

S92b. Optionally, the UDM entity sends subscription information to the SMF entity.

In an example, for this step, refer to step 101 in FIG. 5.

S93. The SMF entity completes authorization/authentication for PDU session establishment.

In an example, for this step, refer to step 101 in FIG. 5.

S94. The SMF entity selects a UPF entity.

In an optional implementation, the SMF entity selects, based on a broadcast session identifier, a user plane function UPF entity corresponding to a broadcast session, or the SMF entity selects, based on a group identifier, a UPF entity corresponding to the group identifier.

In an example, for this step, refer to step 101 in FIG. 5.

S95. Optionally, the SMF entity initiates a PDU-CAN session establishment procedure.

In an example, for this step, refer to step 101 in FIG. 5.

S96a. Optionally, the SMF entity sends a user plane session request to the selected UPF entity, where the user plane session request includes user plane forwarding rule information of the PDU session.

In an example, for this step, refer to step 101 in FIG. 5.

S96b. Optionally, the UPF entity sends CN tunnel information to the SMF entity.

In an example, for this step, refer to step 101 in FIG. 5.

S97. The SMF entity sends a PDU session establishment request message to an AMF entity.

In an optional implementation, the PDU session establishment request message includes session establishment assistance information of the PDU session. Alternatively, the method provided in this embodiment further includes: sending, by the SMF entity, session establishment assistance information of the PDU session to the terminal.

The session establishment assistance information of the PDU session includes one or more of a broadcast session identifier and a group identifier, the broadcast session identifier is used to represent a broadcast session in which the terminal participates, and the group identifier is used to represent a group including the terminal.

In an example, for this step, refer to step 101 in FIG. 5.

S98. The AMF entity sends the PDU session establishment request message to a RAN entity.

In an example, for this step, refer to step 101 in FIG. 5.

S99. The RAN entity sends the PDU session establishment request message to the terminal.

In an example, for this step, refer to step 101 in FIG. 5.

S910a. The terminal allocates a session identifier to the PDU session.

In this step, the terminal does not receive a session identifier PDU session ID allocated by the SMF entity to the PDU session, and then the terminal allocates the session identifier PDU session ID' to the PDU session.

S910b. The terminal sends a PDU session establishment response message to the RAN entity.

In this step, the PDU session establishment response message includes the session identifier PDU session ID' allocated by the terminal to the PDU session, or the terminal sends, to the RAN entity, the session identifier PDU session ID' allocated by the terminal to the PDU session.

S910c. The RAN entity sends the PDU session establishment response message to the AMF entity.

In this step, the PDU session establishment response message includes the PDU session ID', or the RAN entity sends the PDU session establishment response message and the PDU session ID' to the AMF entity.

In an example, for this step, refer to step 102 in FIG. 5.

S911. The AMF entity sends the PDU session establishment response message to the SMF entity.

In this step, the PDU session establishment response message includes the PDU session ID', or the AMF entity sends the PDU session establishment response message and the PDU session ID' to the SMF entity.

In an example, for this step, refer to step 102 in FIG. 5.

S912a. The SMF entity initiates an N4 session establishment procedure.

In an example, for this step, refer to step 102 in FIG. 5.

S912b. The SMF entity sends an SM response message to the AMF entity.

In an example, for this step, refer to step 102 in FIG. 5.

S913. Optionally, the SMF entity sends an IPv6 router advertisement message to the UPF entity.

In an example, for this step, refer to step 102 in FIG. 5.

By now, the PDU session establishment procedure is completed, and then the UPF entity can send downlink data to the terminal by using the newly established PDU session. In this embodiment, the SMF entity does not allocate the session identifier of the PDU session. After the terminal determines that the terminal does not receive the session identifier, of the PDU session, that is sent by the SMF entity, the terminal allocates the session identifier of the PDU session.

This application further provides a method and a device for triggering a PDU session establishment procedure by reporting a broadcast quality report message by a terminal.

The related art further provides a method for triggering PDU session establishment. The method is described as follows: A terminal sends a broadcast quality report message to an SMF entity through an AMF entity, and then the SMF entity sends a broadcast quality report receive response message to the terminal through the AMF entity. Then, the steps shown in FIG. 3A to FIG. 3C are performed.

Figure 11:
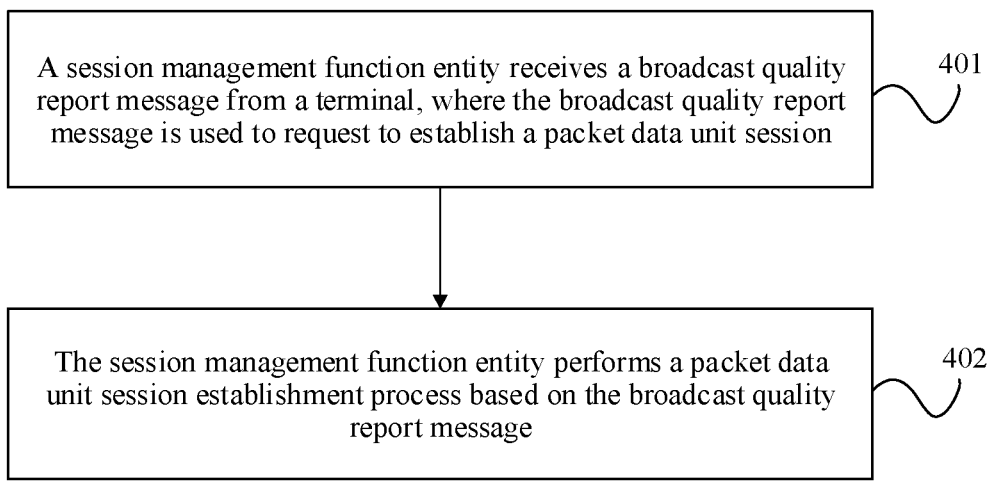
FIG. 11 is a flowchart of a still further session establishment method according to an embodiment of this application.

FIG. 11 is a flowchart of a still further session establishment method according to an embodiment of this application. As shown in FIG. 11, this embodiment of this application provides a still further session establishment method. The method is performed by an SMF entity. The method is described as follows:

401. The SMF entity receives a broadcast quality report message from a terminal, where the broadcast quality report message is used to request to establish a PDU session.

In an optional implementation, the broadcast quality report message includes one or more of the following information: an identifier of the broadcast quality report message, a PDU session establishment request message, indication information, and a session identifier. The indication information is used to request to establish the PDU session, the session identifier is used to identify the PDU session, and the PDU session establishment request message is used to request to establish the PDU session.

Optionally, the identifier of the broadcast quality report message is used to indicate a type of the broadcast quality report message.

For example, when the terminal does not establish a PDU session, or when a current PDU session of the terminal is not allowed for sharing, or when the terminal needs to be switched from a broadcast path to a unicast path, steps in this embodiment may be performed.

First, when the terminal determines that the terminal fails to receive broadcast data, the terminal sends the broadcast quality report message to an AMF entity. The broadcast quality report message is used to request to establish the PDU session. Optionally, the broadcast quality report message carries broadcast received quality information. For example, when the terminal determines that received quality of a broadcast channel signal of the terminal is less than a preset quality value, the terminal sends the broadcast quality report message to the SMF entity. The broadcast received quality information is used to indicate that the terminal cannot receive data on a broadcast path, or the broadcast received quality information is used to indicate that the terminal fails to receive data on a broadcast path, or the broadcast received quality information is used to indicate that the terminal listens (e.g., listening) to or no longer listens (not listening) to data on a broadcast path. The broadcast received quality information may be "good" or "bad", or may be "listening" or "not listening". For another example, the broadcast received quality information may alternatively be a specific measurement value of received quality of a broadcast channel. The identifier of the broadcast quality report message in the broadcast quality report message represents a request for establishing the PDU session, or the PDU session establishment request message in the broadcast quality report message represents a request for establishing the PDU session, or the indication information in the broadcast quality report message represents a request for establishing the PDU session, or the session identifier of the PDU session in the broadcast quality report message represents a request for establishing the PDU session. Alternatively, a combination of at least two of the identifier of the broadcast quality report message, the PDU session establishment request message, the indication information, and the session identifier in the broadcast quality report message represents a request for establishing the PDU session. The indication information in the broadcast quality report message may be implicit indication information, or may be explicit indication information. For example, a flag or a parameter in the broadcast quality report message represents the request for establishing the PDU session.

Optionally, the identifier of the broadcast quality report message may be used to indicate a type of the broadcast quality report message. For example, a plurality of bits are used as the identifier of the broadcast quality report message during message encoding. For example, "000" may be used as the identifier of the broadcast quality report message, and "000" may be used to indicate that a type of the message is a broadcast quality report message.

Then, the AMF entity sends the broadcast quality report message to the SMF entity.

402. The SMF entity performs a PDU session establishment procedure based on the broadcast quality report message.

In an optional implementation, step 402 specifically includes: performing, by the SMF entity, the PDU session establishment procedure when the SMF entity determines, based on the broadcast received quality information in the broadcast quality report message, that the terminal fails to receive data.

In an optional implementation, if the broadcast quality report message includes the PDU session establishment request message, the method provided in this embodiment further includes: sending, by the SMF entity, a PDU session establishment response message to the terminal.

In an optional implementation, the PDU session establishment response message includes information about a QoS flow corresponding to the PDU session. Alternatively, the method provided in this embodiment further includes: sending, by the SMF entity to the terminal based on the broadcast quality report message, information about a QoS flow corresponding to the PDU session. The information about the QoS flow is the same as that described in the foregoing embodiment.

For example, after the SMF entity receives the broadcast quality report message, the SMF entity may obtain the broadcast received quality information in the broadcast quality report message. Then, the SMF entity determines, based on the broadcast received quality information in the broadcast quality report message, whether the terminal can receive data. For example, the SMF entity determines whether the broadcast received quality information indicates that the terminal fails to receive data, or the SMF entity determines whether the broadcast received quality information indicates that signal received quality of the terminal is less than a preset quality value. When the SMF entity determines, based on the broadcast received quality information in the broadcast quality report message, that the terminal fails to receive the data, for example, when the SMF entity determines that the broadcast received quality information indicates that the terminal fails to receive data, or when the SMF entity determines that the broadcast received quality information indicates that signal received quality of the terminal is less than the preset quality value, the SMF entity may perform the PDU session establishment procedure.

Optionally, the PDU session establishment procedure performed by the SMF entity may include the following steps: The SMF entity sends a subscription data request message to a UDM entity. The UDM entity sends subscription information to the SMF entity. The SMF entity completes authorization/authentication for PDU session establishment. The SMF entity selects a PCF entity according to a rule. The SMF entity obtains a PCC rule. The SMF entity selects a UPF entity. The SMF entity initiates a PDU-CAN session establishment procedure. The SMF entity initiates an N4 session establishment/modification procedure to the UPF entity. The UPF entity sends CN tunnel information to the SMF entity. The SMF entity sends an SM response message to the AMF entity. The AMF entity sends an N2 PDU session request message to a RAN entity. The RAN entity sends an RRC connection reconfiguration message to the terminal. The RAN entity sends an N2 PDU session establishment response message to the AMF entity. The AMF entity sends an SM request message to the SMF entity. The SMF entity initiates an N4 session establishment procedure. The SMF entity sends an SM response message to the AMF entity. The SMF entity sends an IPv6 router advertisement message to the UPF entity. The SMF entity releases a user plane resource. By now, the PDU session establishment procedure is completed. For the foregoing steps, refer to the steps in FIG. 3A to FIG. 3C.

Optionally, the SMF entity may send, to the terminal, the information about the QoS flow corresponding to the PDU session. The SMF entity may send, to the terminal, the information about the QoS flow corresponding to the PDU session in the following manners: Manner 1: If the broadcast quality report message received by the SMF entity includes the PDU session establishment request message, the SMF entity may send a PDU session establishment response message to the AMF entity, and the PDU session establishment response message carries the information about the QoS flow corresponding to the PDU session. Then, the AMF entity may send, to the terminal, the PDU session establishment response message that carries the information about the QoS flow corresponding to the PDU session. Manner 2: After the SMF entity receives the broadcast quality report message, the SMF entity directly sends, to the AMF entity, the information about the QoS flow corresponding to the PDU session, and then the AMF entity may send, to the terminal, the information about the QoS flow corresponding to the PDU session.

The QoS flow is a finest granularity for data forwarding and processing in 5G. All data mapped to a same QoS flow uses a same forwarding and processing policy. The forwarding and processing policy includes, for example, a schedule policy, a queue management policy, a data shaping policy, and an RLC configuration policy. Different QoS flows use different QoS forwarding rules, and different QoS flows may be identified by using QoS flow identifiers.

According to the method provided in the foregoing embodiment, the SMF entity receives the broadcast quality report message from the terminal, and the broadcast quality report message is used to request to establish the PDU session. The SMF entity performs the PDU session establishment procedure based on the broadcast quality report message. The broadcast quality report message reported by the terminal is used to request to establish the PDU session, and then the SMF entity may directly perform the PDU session establishment procedure. In this way, a process in which the terminal reports the broadcast quality report message to the SMF entity, the SMF entity sends a PDU session establishment request message to the terminal, and then the terminal performs a PDU session establishment procedure is not required, or a process in which an application server sends a device trigger message to the terminal, and then the terminal actively initiates a PDU session establishment procedure is not required. These complex signaling interaction procedures are not required. Therefore, signaling interaction between the terminal and a network side can be reduced, a delay of switching from the broadcast path to the unicast path can be reduced, and the PDU session can be quickly established.

Figure 12:
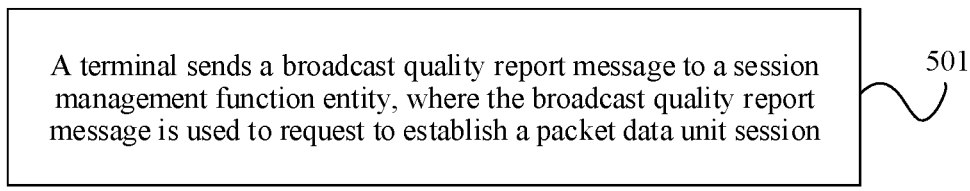
FIG. 12 is a flowchart of a yet further session establishment method according to an embodiment of this application.

FIG. 12 is a flowchart of a yet further session establishment method according to an embodiment of this application. As shown in FIG. 12, this embodiment of this application provides a yet further session establishment method. The method is performed by a terminal. The method is specifically described as follows:

501. The terminal sends a broadcast quality report message to an SMF entity, where the broadcast quality report message is used to request to establish a PDU session.

In an optional implementation, step 501 specifically includes: sending the broadcast quality report message to the SMF entity when the terminal fails to receive data.

Optionally, the broadcast quality report message includes broadcast received quality information.

In an optional implementation, the broadcast quality report message includes one or more of the following information: an identifier of the broadcast quality report message, a PDU session establishment request message, indication information, and a PDU session identifier. The indication information is used to request to establish the PDU session, the session identifier is used to identify the PDU session, and the PDU session establishment request message is used to request to establish the PDU session.

In an optional implementation, the method provided in this embodiment further includes step 502: The terminal receives, from the SMF entity, information about a QoS flow corresponding to the PDU session. Alternatively, the broadcast quality report message includes the PDU session establishment request message, and the method provided in this embodiment further includes step 503: The terminal receives a PDU session establishment response message from the SMF entity.

Optionally, the PDU session establishment response message includes the information about the QoS flow corresponding to the PDU session.

According to the method provided in the foregoing embodiment, the terminal sends the broadcast quality report message to the SMF entity, and the broadcast quality report message is used to request to establish the PDU session. The SMF entity performs a PDU session establishment procedure based on the broadcast quality report message. The broadcast quality report message reported by the terminal is used to request to establish the PDU session, and then the SMF entity may directly perform the PDU session establishment procedure. In this way, a process in which the terminal reports the broadcast quality report message to the SMF entity, the SMF entity sends a PDU session establishment request message to the terminal, and then the terminal performs a PDU session establishment procedure is not required, or a process in which an application server sends a device trigger message to the terminal, and then the terminal actively initiates a PDU session establishment procedure is not required. These complex signaling interaction procedures are not required. Therefore, signaling interaction between the terminal and a network side can be reduced, a delay of switching from the broadcast path to the unicast path can be reduced, and the PDU session can be quickly established.

Figure 13:
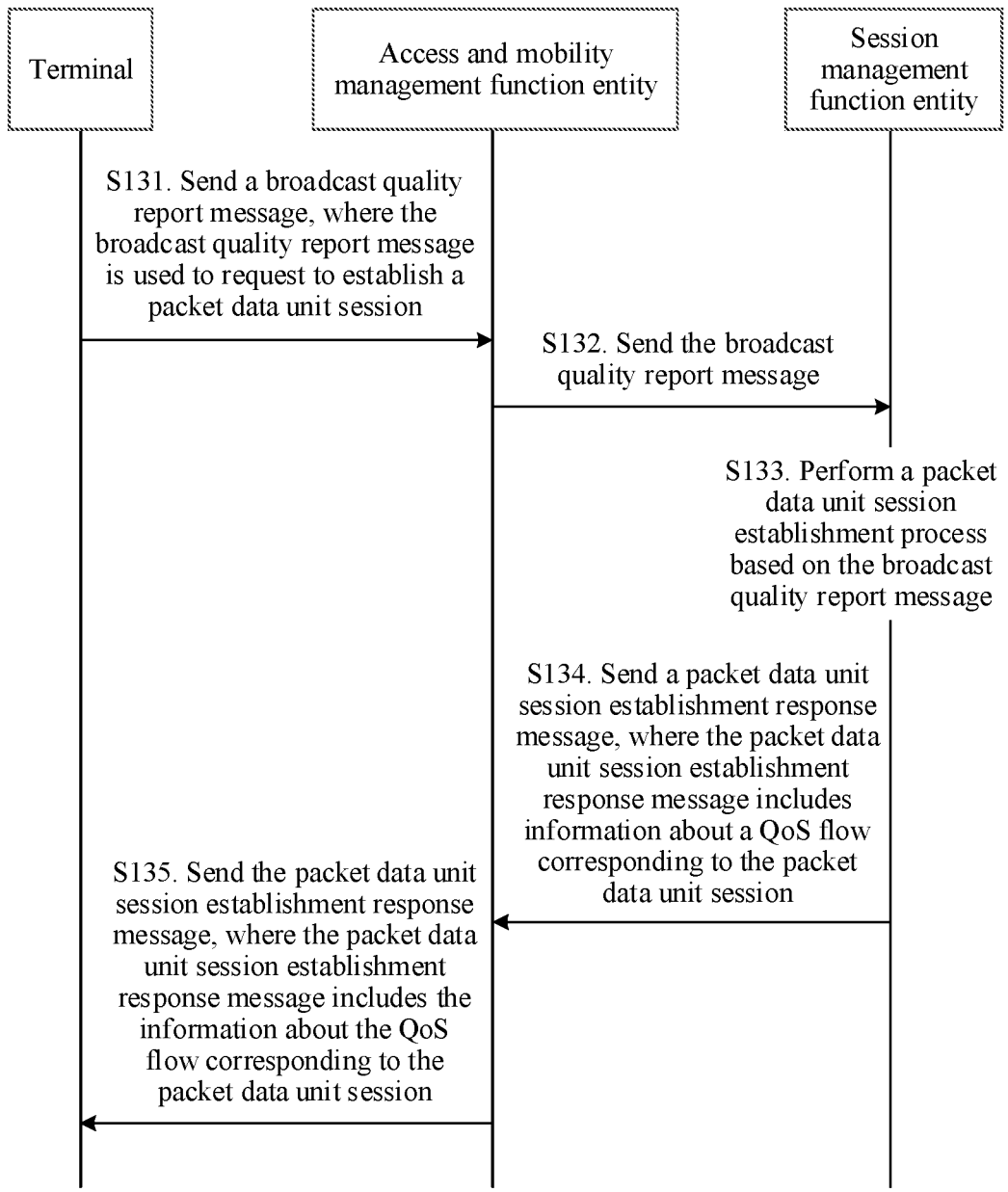
FIG. 13 is a signaling diagram of a still yet further session establishment method according to an embodiment of this application.

FIG. 13 is a signaling diagram of a still yet further session establishment method according to an embodiment of this application. As shown in FIG. 13, this embodiment of this application provides a still yet further session establishment method. The method is described as follows:

S131. A terminal sends a broadcast quality report message to an AMF entity, where the broadcast quality report message is used to request to establish a PDU session.

In an optional implementation, the broadcast quality report message includes one or more of the following information: an identifier of the broadcast quality report message, a PDU session establishment request message, indication information, and a PDU session identifier. The indication information is used to request to establish the PDU session, the session identifier is used to identify the PDU session, and the PDU session establishment request message is used to request to establish the PDU session.

Optionally, the broadcast quality report message includes broadcast received quality information.

In an example, for this step, refer to step 401 in FIG. 11.

S132. The AMF entity sends the broadcast quality report message to an SMF entity.

In an example, for this step, refer to step 401 in FIG. 11.

S133. The SMF entity performs a PDU session establishment procedure based on the broadcast quality report message.

In an example, for this step, refer to step 402 in FIG. 11.

S134. If the broadcast quality report message includes the PDU session establishment request message, the SMF entity sends a PDU session establishment response message to the AMF entity, where the PDU session establishment response message includes information about a QoS flow corresponding to the PDU session.

In an example, for this step, refer to step 402 in FIG. 11.

S135. The AMF entity sends the PDU session establishment response message to the terminal, where the PDU session establishment response message includes the information about the QoS flow corresponding to the PDU session.

In an example, for this step, refer to step 402 in FIG. 11.

Figure 14:
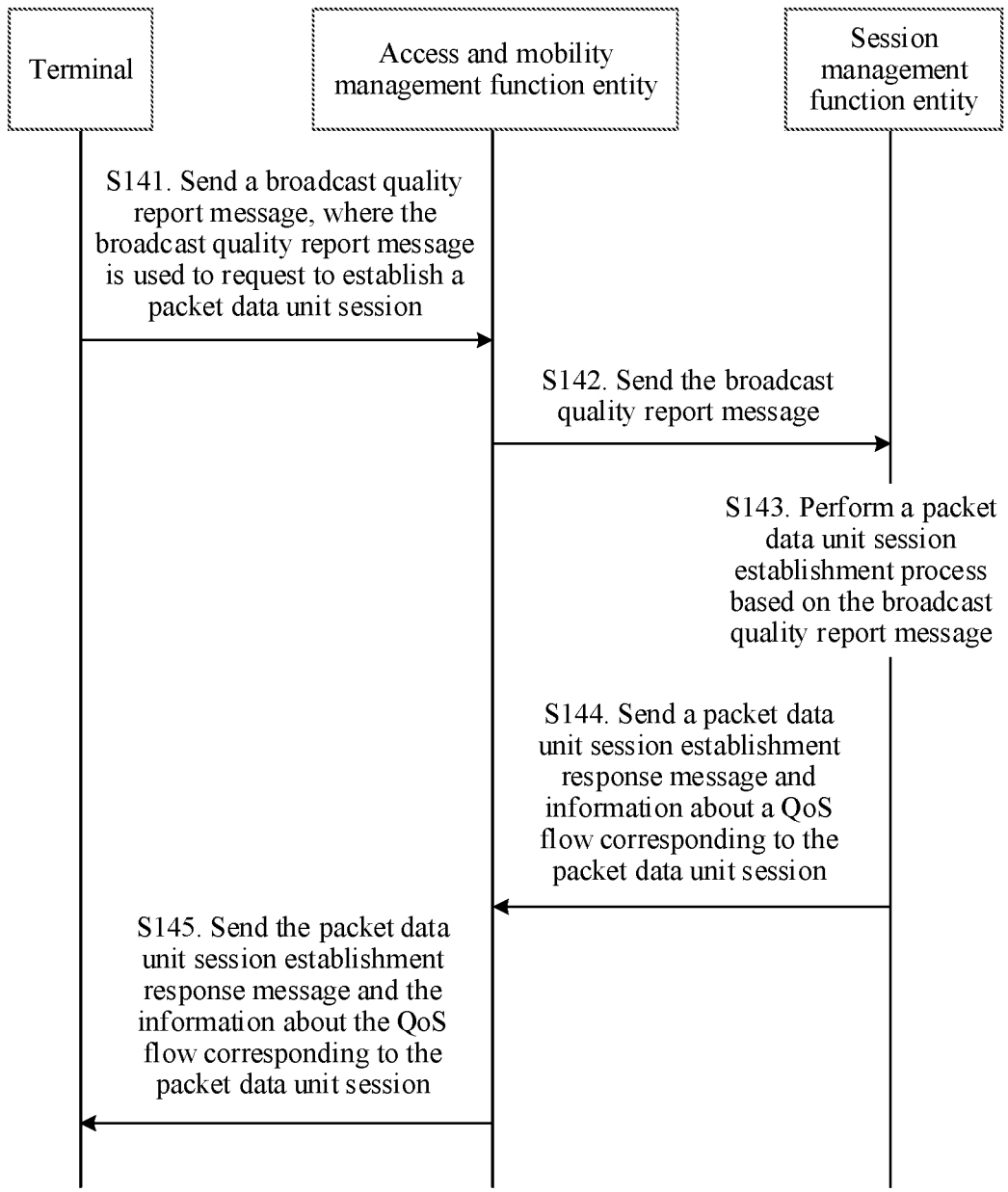
FIG. 14 is a signaling diagram of even yet another session establishment method according to an embodiment of this application.

FIG. 14 is a signaling diagram of even yet another session establishment method according to an embodiment of this application. As shown in FIG. 14, this embodiment of this application provides even yet another session establishment method. The method is described as follows:

S141. A terminal sends a broadcast quality report message to an AMF entity, where the broadcast quality report message is used to request to establish a PDU session.

In an optional implementation, the broadcast quality report message includes one or more of the following information: an identifier of the broadcast quality report message, a PDU session establishment request message, indication information, and a PDU session identifier. The indication information is used to request to establish the PDU session, the session identifier is used to identify the PDU session, and the PDU session establishment request message is used to request to establish the PDU session.

Optionally, the broadcast quality report message includes broadcast received quality information.

In an example, for this step, refer to step 401 in FIG. 11.

S142. The AMF entity sends the broadcast quality report message to an SMF entity.

In an example, for this step, refer to step 401 in FIG. 11.

S143. The SMF entity performs a PDU session establishment procedure based on the broadcast quality report message.

In an example, for this step, refer to step 402 in FIG. 11.

S144. The broadcast quality report message includes the PDU session establishment request message, and the SMF entity sends, to the AMF entity, a PDU session establishment response message and information about a QoS flow corresponding to the PDU session.

In an example, for this step, refer to step 402 in FIG. 11.

S145. The AMF entity sends, to the terminal, the PDU session establishment response message and the information about the QoS flow corresponding to the PDU session.

In an example, for this step, refer to step 402 in FIG. 11.

Figure 15:
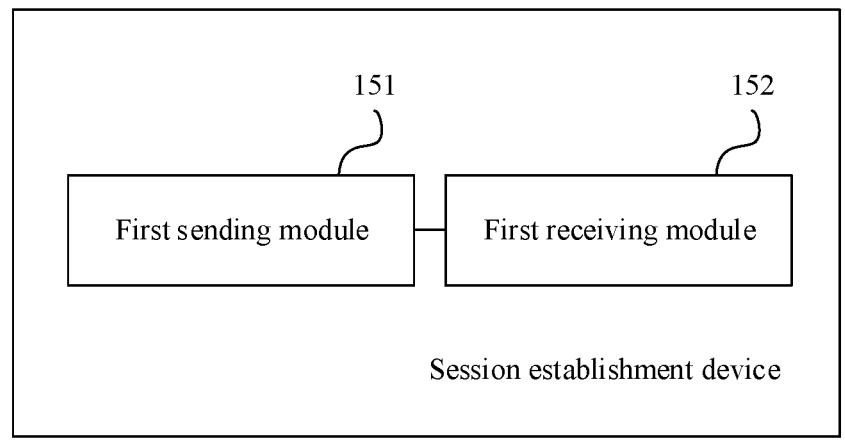
FIG. 15 is a schematic structural diagram of a session establishment device according to an embodiment of this application.

FIG. 15 is a schematic structural diagram of a session establishment device according to an embodiment of this application. As shown in FIG. 15, an embodiment of this application provides a session establishment device. The session establishment device may be an SMF entity, or the session establishment device may be one or more chips, or the session establishment device may be a system on chip, or the session establishment device may be another apparatus that can perform an action of the device. The session establishment device may be configured to perform an action or a step of the SMF entity in the embodiment shown in FIG. 5. The session establishment device may be further configured to perform an action or a step of the SMF entity in the embodiments shown in FIG. 8A to FIG. 10B. The session establishment device may include a first sending module 151 and a first receiving module 152.

The first sending module 151 is configured to send a PDU session establishment request message to a terminal, where the PDU session establishment request message is used to request to establish a PDU session. In this case, the first sending module 151 is configured to support the SMF entity in performing step 101 in FIG. 5.

The first receiving module 152 is configured to receive a PDU session establishment response message from the terminal. In this case, the first receiving module 152 is configured to support the SMF entity in performing step 102 in FIG. 5.

In an optional implementation, the PDU session establishment response message includes a session identifier of the PDU session. Alternatively, the device provided in this embodiment further includes: a second receiving module, configured to receive a session identifier of the PDU session from the terminal.

In an optional implementation, the PDU session establishment request message includes session establishment assistance information of the PDU session. Alternatively, the device provided in this embodiment further includes: a second sending module, configured to send session establishment assistance information of the PDU session to the terminal. The session establishment assistance information of the PDU session includes one or more of a broadcast session identifier and a group identifier, the broadcast session identifier is used to represent a broadcast session in which the terminal participates, and the group identifier is used to represent a group including the terminal.

In an optional implementation, the PDU session establishment request message includes the session identifier of the PDU session. The device provided in this embodiment further includes: an allocation module, configured to allocate the session identifier to the PDU session.

In addition, for principles of the modules in this embodiment, refer to the descriptions in FIG. 8A to FIG. 10B.

Figure 16:
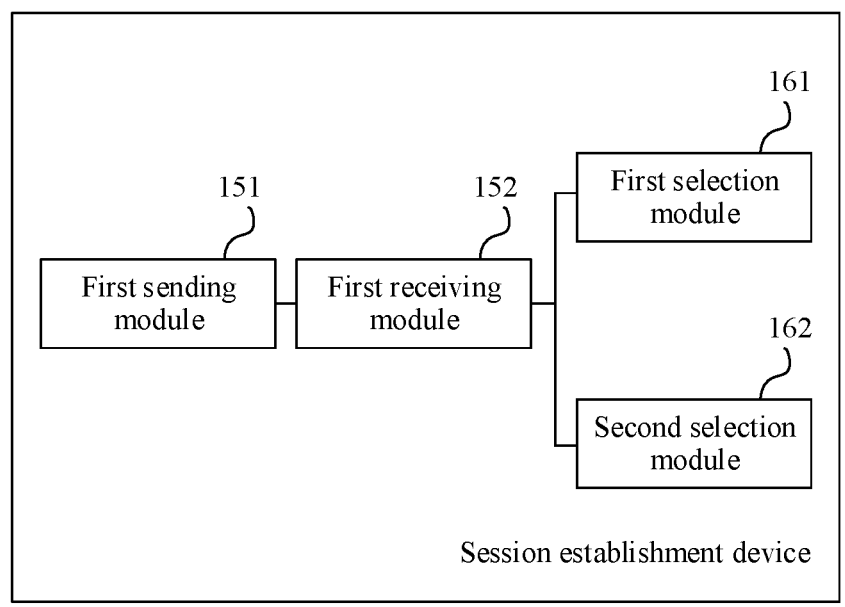
FIG. 16 is a schematic structural diagram of another session establishment device according to an embodiment of this application.

FIG. 16 is a schematic structural diagram of another session establishment device according to an embodiment of this application. As shown in FIG. 16, an embodiment of this application provides another session establishment device. The session establishment device may be an SMF entity, or the session establishment device may be one or more chips, or the session establishment device may be a system on chip, or the session establishment device may be another apparatus that can perform an action of the device. The session establishment device may be configured to perform an action or a step of the SMF entity in the embodiment shown in FIG. 5. The session establishment device may be further configured to perform an action or a step of the SMF entity in the embodiments shown in FIG. 8A to FIG. 10B. Based on the session establishment device shown in FIG. 15, the session establishment device provided in this embodiment may include:

a first selection module 161, configured to: select, based on the broadcast session identifier, a user plane function UPF entity corresponding to the broadcast session, and send a user plane session request to the UPF entity corresponding to the broadcast session; or a second selection module 162, configured to: select, based on the group identifier, a UPF entity corresponding to the group identifier, and send a user plane session request to the UPF entity corresponding to the group identifier.

The user plane session request includes user plane forwarding rule information of the PDU session.

The first selection module 161 or the second selection module 162 is configured to support the SMF entity in performing step S74 in FIG. 8A and FIG. 8B, or performing step S84 in FIG. 9A and FIG. 9B, or performing step S94 in FIG. 10A and FIG. 10B.

The first selection module 161 or the second selection module 162 may perform a corresponding step prior to or next to either of the first sending module 151 and the first receiving module 152. Further, the first selection module 161 or the second selection module 162 may be connected to either of the first sending module 151 and the first receiving module 152 in another connection manner, and a connection manner is not limited to the connection manner shown in FIG. 16.

According to the SMF entity provided in the foregoing embodiment, the SMF entity sends the PDU session establishment request message to the terminal, where the PDU session establishment request message is used to request to establish the PDU session. The SMF entity receives the PDU session establishment response message from the terminal. Optionally, the PDU session establishment response message includes the session identifier of the PDU session, or the SMF entity receives the session identifier of the PDU session from the terminal. Optionally, the SMF entity allocates the session identifier to the PDU session, and the PDU session establishment request message includes the session identifier of the PDU session. Therefore, a method for actively initiating the PDU session establishment procedure on a network side is provided. When the terminal needs to be switched from a broadcast path to a unicast path, the PDU session may be established for the terminal on the network side, to establish the unicast path. In addition, because it can be ensured that a same UPF entity is selected by a broadcast session for the broadcast path and is selected by a unicast session for the unicast path on the network side, it can be ensured that user plane data is consistent and synchronized on the broadcast path and the unicast path when the user plane data is switched from the broadcast path to the unicast path. Negotiation performed when user plane downlink data is switched from the broadcast path to the unicast path is avoided, so that a delay of switching from the broadcast session to the unicast session can be reduced, to ensure fast and continuous switching of data, and ensure fast switching that meets service continuity requirements of a broadcast mode and a unicast mode. In addition, the network side triggers the terminal to establish the PDU session, and this can reduce signaling interaction in a process in which the terminal establishes the PDU session with the network side, and further reduce a delay.

Figure 17:
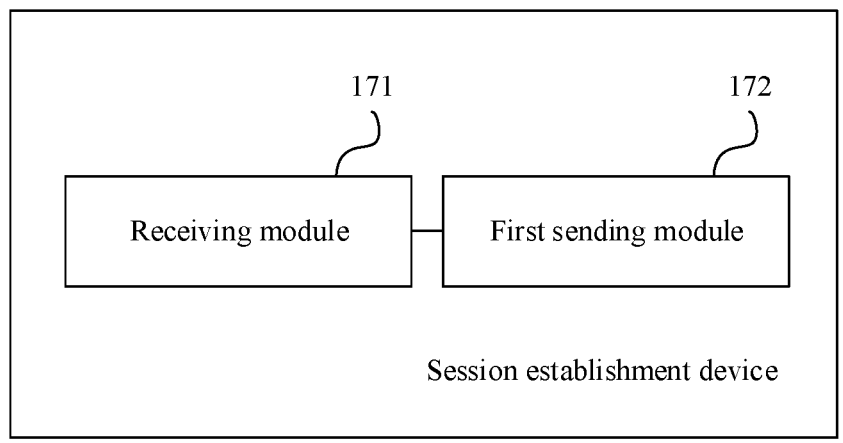
FIG. 17 is a schematic structural diagram of still another session establishment device according to an embodiment of this application.

FIG. 17 is a schematic structural diagram of still another session establishment device according to an embodiment of this application. As shown in FIG. 17, an embodiment of this application provides still another session establishment device. The session establishment device may be a terminal, or the session establishment device may be one or more chips, or the session establishment device may be a system on chip, or the session establishment device may be another apparatus that can perform an action of the device. The session establishment device may be configured to perform an action or a step of the terminal in the embodiment shown in FIG. 6. The session establishment device may be further configured to perform an action or a step of the terminal in the embodiments shown in FIG. 8A to FIG. 10B. The session establishment device may include a receiving module 171 and a first sending module 172.

The receiving module 171 is configured to receive a PDU session establishment request message from an SMF entity, where the PDU session establishment request message is used to request to establish a PDU session. In this case, the receiving module 171 is configured to support the terminal in performing step 201 in FIG. 6.

The first sending module 172 is configured to send a PDU session establishment response message to the SMF entity based on the PDU session establishment request message. In this case, the first sending module 172 is configured to support the terminal in performing step 202 in FIG. 6.

In an optional implementation, the PDU session establishment response message includes a session identifier of the PDU session. Alternatively, the device provided in this embodiment further includes: a second sending module, configured to send a session identifier of the PDU session to the SMF entity.

In an optional implementation, the PDU session establishment request message includes the session identifier of the PDU session.

In an optional implementation, the device provided in this embodiment further includes an allocation module, configured to allocate the session identifier to the PDU session based on the PDU session establishment request message. In this case, the allocation module is configured to support the terminal in performing step 203 in FIG. 6.

In addition, for principles of the modules in this embodiment, refer to the descriptions in FIG. 8A to FIG. 10B.

Figure 18:
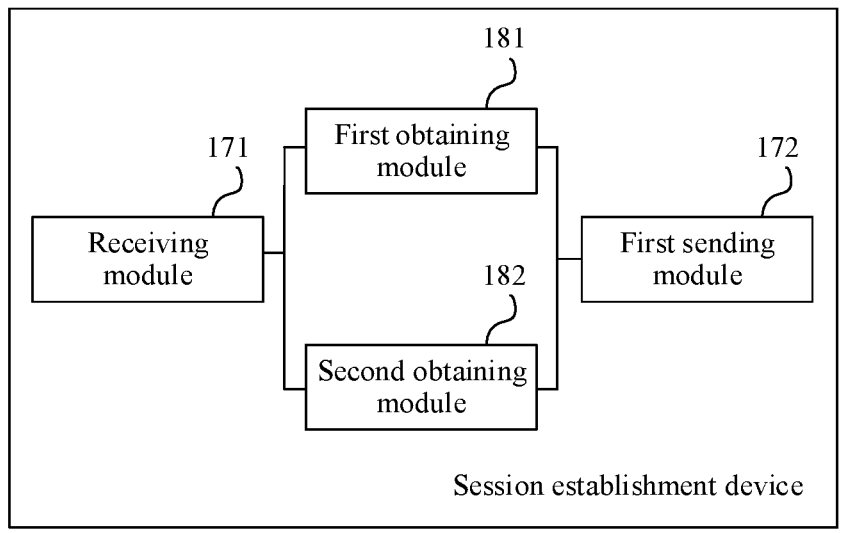
FIG. 18 is a schematic structural diagram of yet another session establishment device according to an embodiment of this application.

FIG. 18 is a schematic structural diagram of yet another session establishment device according to an embodiment of this application. As shown in FIG. 18, an embodiment of this application provides yet another session establishment device. The session establishment device may be a terminal, or the session establishment device may be one or more chips, or the session establishment device may be a system on chip, or the session establishment device may be another apparatus that can perform an action of the device. The session establishment device may be configured to perform an action or a step of the terminal in the embodiment shown in FIG. 6. The session establishment device may be further configured to perform an action or a step of the terminal in the embodiments shown in FIG. 8A to FIG. 10B. Based on the session establishment device shown in FIG. 17, in the session establishment device provided in this embodiment, the PDU session establishment request message includes session establishment assistance information of the PDU session, and the device provided in this embodiment further includes: a first obtaining module 181, configured to obtain, based on the session establishment assistance information of the PDU session, information about a QoS flow corresponding to the PDU session. In this case, the first obtaining module 181 needs to perform a corresponding step next to the receiving module 171.

Alternatively, the device provided in this embodiment further includes: a second obtaining module 182, configured to receive session establishment assistance information of the PDU session from the SMF entity, and obtain, based on the session establishment assistance information of the PDU session, information about a QoS flow corresponding to the PDU session. The second obtaining module 182 may perform a corresponding step prior to or next to either of the receiving module 171 and the first sending module 172.

The session establishment assistance information of the PDU session includes one or more of a broadcast session identifier and a group identifier, the broadcast session identifier is used to represent a broadcast session in which the terminal participates, and the group identifier is used to represent a group including the terminal.

In addition, for principles of the modules in this embodiment, refer to the descriptions in FIG. 6 and FIG. 8A to FIG. 10B.

According to the terminal provided in the foregoing embodiments, the terminal receives the PDU session establishment request message from the SMF entity, and the PDU session establishment request message is used to request to establish the PDU session. The terminal sends the PDU session establishment response message to the SMF entity. Optionally, the PDU session establishment response message includes the session identifier of the PDU session, or the SMF entity receives the session identifier of the PDU session from the terminal. Optionally, the SMF entity allocates the session identifier to the PDU session, and the PDU session establishment request message includes the session identifier of the PDU session. Therefore, a method for actively initiating the PDU session establishment procedure on a network side is provided. When the terminal needs to be switched from a broadcast path to the unicast path, the PDU session may be established for the terminal on the network side, to establish the unicast path. In addition, because it can be ensured that a same UPF entity is selected by the broadcast session for the broadcast path and is selected by the unicast session for the unicast path on the network side, it can be ensured that user plane data is consistent and synchronized on the broadcast path and the unicast path when the user plane data is switched from the broadcast path to the unicast path. Negotiation performed when user plane downlink data is switched from the broadcast path to the unicast path is avoided, so that a delay of switching from the broadcast path to the unicast path can be reduced, to ensure fast and continuous switching of data, and ensure fast switching that meets service continuity requirements of a broadcast mode and a unicast mode. In addition, the network side triggers the terminal to establish the PDU session, and this can reduce signaling interaction in a process in which the terminal establishes the PDU session with the network side, and further reduce a delay.

Figure 19:
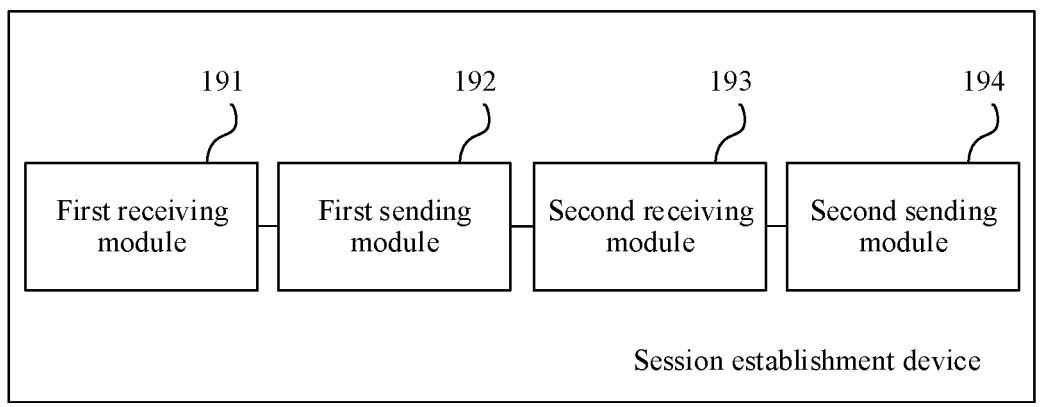
FIG. 19 is a schematic structural diagram of still yet another session establishment device according to an embodiment of this application.

FIG. 19 is a schematic structural diagram of still yet another session establishment device according to an embodiment of this application. As shown in FIG. 19, an embodiment of this application provides still yet another session establishment device. The session establishment device may be an AMF entity, or the session establishment device may be one or more chips, or the session establishment device may be a system on chip, or the session establishment device may be another apparatus that can perform an action of the device. The session establishment device may be configured to perform an action or a step of the AMF entity in the embodiment shown in FIG. 7. The session establishment device may be further configured to perform an action or a step of the AMF entity in the embodiments shown in FIG. 8A to FIG. 10B. The session establishment device may include a first receiving module 191, a first sending module 192, a second receiving module 193, and a second sending module 194.

The first receiving module 191 is configured to receive a PDU session request message from an SMF entity, where the PDU session establishment request message is used to request to establish a PDU session. In this case, the first receiving module 191 is configured to support the AMF entity in performing step 301 in FIG. 7.

The first sending module 192 is configured to send the PDU session request message to a terminal. In this case, the first sending module 192 is configured to support the AMF entity in performing step 302 in FIG. 7.

The second receiving module 193 is configured to receive a PDU session establishment response message from the terminal. In this case, the second receiving module 193 is configured to support the AMF entity in performing step 303 in FIG. 7.

The second sending module 194 is configured to send the PDU session establishment response message to the SMF entity. In this case, the second sending module 194 is configured to support the AMF entity in performing step 304 in FIG. 7.

In addition, for principles of the modules in this embodiment, refer to the descriptions in FIG. 8A to FIG. 10B.

Figure 20:
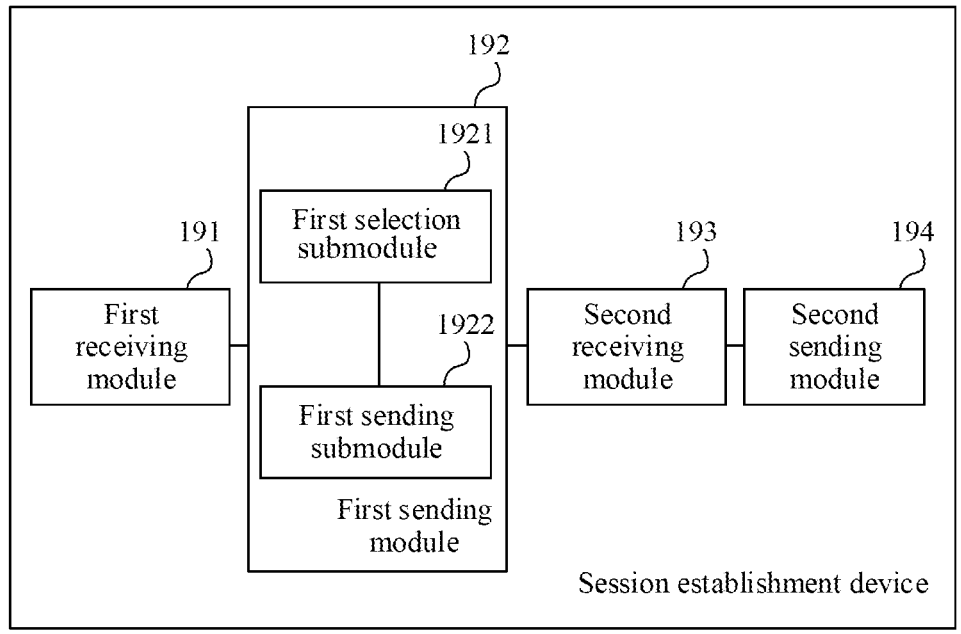
FIG. 20 is a schematic structural diagram of a further session establishment device according to an embodiment of this application.

FIG. 20 is a schematic structural diagram of a further session establishment device according to an embodiment of this application. As shown in FIG. 20, an embodiment of this application provides a further session establishment device. The session establishment device may be an AMF entity, or the session establishment device may be one or more chips, or the session establishment device may be a system on chip, or the session establishment device may be another apparatus that can perform an action of the device. The session establishment device may be configured to perform an action or a step of the AMF entity in the embodiment shown in FIG. 7. The session establishment device may be further configured to perform an action or a step of the AMF entity in the embodiments shown in FIG. 8A to FIG. 10B. Based on the session establishment device shown in FIG. 19, in the session establishment device provided in this embodiment, the PDU session establishment request message includes session establishment assistance information of the PDU session, or the device further includes a third receiving module, configured to receive session establishment assistance information of the PDU session from the SMF entity.

The session establishment assistance information of the PDU session includes one or more of a broadcast session identifier and a group identifier, the broadcast session identifier is used to represent a broadcast session in which the terminal participates, and the group identifier is used to represent a group including the terminal.

The first sending module 192 includes:

a first selection submodule 1921, configured to select a radio access network function RAN entity based on the session establishment assistance information of the PDU session; and a first sending submodule 1922, configured to send the PDU session request message to the terminal through the RAN entity.

In this case, the first sending module 192 is configured to support the AMF entity in performing the first implementation of step 302 in FIG. 7.

Figure 21:
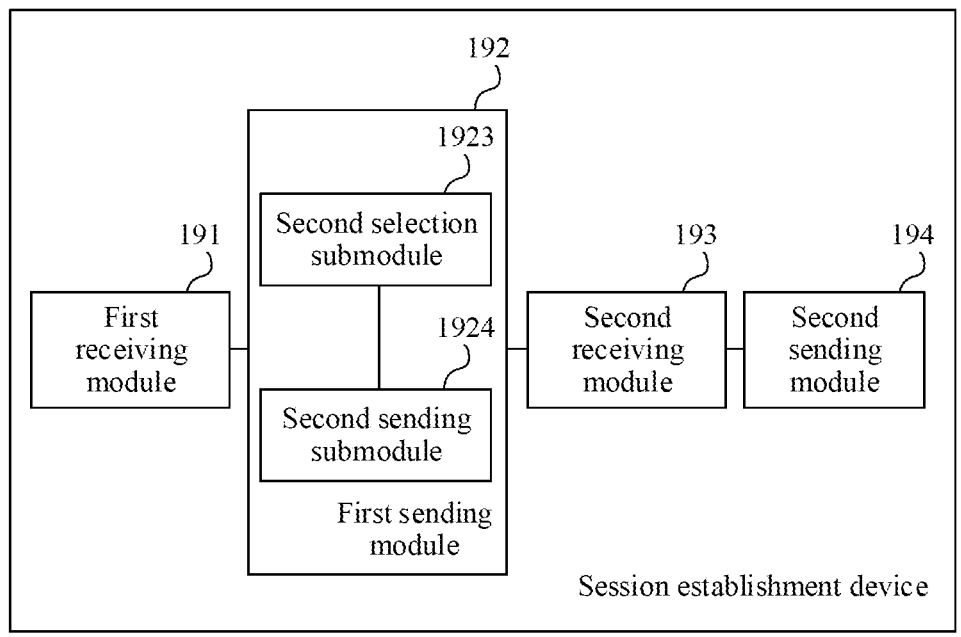
FIG. 21 is a schematic structural diagram of a still further session establishment device according to an embodiment of this application.

FIG. 21 is a schematic structural diagram of a still further session establishment device according to an embodiment of this application. As shown in FIG. 21, an embodiment of this application provides a still further session establishment device. The session establishment device may be an AMF entity, or the session establishment device may be one or more chips, or the session establishment device may be a system on chip, or the session establishment device may be another apparatus that can perform an action of the device. The session establishment device may be configured to perform an action or a step of the AMF entity in the embodiment shown in FIG. 7. The session establishment device may be further configured to perform an action or a step of the AMF entity in the embodiments shown in FIG. 8A to FIG. 10B. Based on the session establishment device shown in FIG. 19, in the session establishment device provided in this embodiment, the PDU session request message includes an identifier of the terminal, or the device further includes a fourth receiving module, configured to receive an identifier of the terminal from the SMF entity.

The first sending module 192 includes:

a second selection submodule 1923, configured to select a RAN entity based on the identifier of the terminal; and a second sending submodule 1924, configured to send the PDU session request message to the terminal through the RAN entity.

In this case, the first sending module 192 is configured to support the AMF entity in performing the second implementation of step 302 in FIG. 7.

According to the AMF entity provided in the foregoing embodiments, the AMF entity receives the PDU session request message from the SMF entity, where the PDU session establishment request message is used to request to establish the PDU session. The AMF entity sends the PDU session request message to the terminal. The AMF entity receives the PDU session establishment response message from the terminal, and sends the PDU session establishment response message to the SMF entity. Optionally, the PDU session establishment response message includes a session identifier of the PDU session, or the SMF entity receives a session identifier of the PDU session from the terminal. Optionally, the SMF entity allocates a session identifier to the PDU session, and the PDU session establishment request message includes the session identifier of the PDU session. Therefore, a method for actively initiating the PDU session establishment procedure on a network side is provided. When the terminal needs to be switched from a broadcast path to the unicast path, the PDU session may be established for the terminal on the network side, to establish the unicast path. In addition, because it can be ensured that a same UPF entity is selected by the broadcast session for the broadcast path and is selected by the unicast session for the unicast path on the network side, it can be ensured that user plane data is consistent and synchronized on the broadcast path and the unicast path when the user plane data is switched from the broadcast path to the unicast path. Negotiation performed when user plane downlink data is switched from the broadcast path to the unicast path is avoided, so that a delay of switching from the broadcast path to the unicast path can be reduced, to ensure fast and continuous switching of data, and ensure fast switching that meets service continuity requirements of a broadcast mode and a unicast mode. In addition, the network side triggers the terminal to establish the PDU session, and this can reduce signaling interaction in a process in which the terminal establishes the PDU session with the network side, and further reduce a delay.

Figure 22:
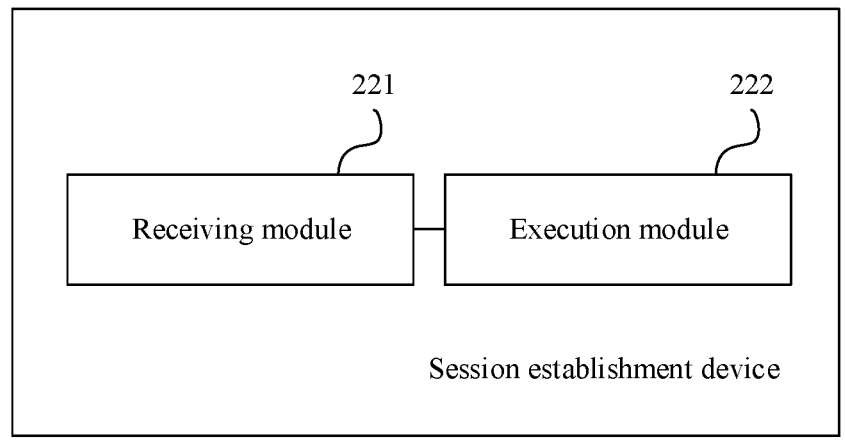
FIG. 22 is a schematic structural diagram of a yet further session establishment device according to an embodiment of this application.

FIG. 22 is a schematic structural diagram of a yet further session establishment device according to an embodiment of this application. As shown in FIG. 22, an embodiment of this application provides a yet further session establishment device. The session establishment device may be an SMF entity, or the session establishment device may be one or more chips, or the session establishment device may be a system on chip, or the session establishment device may be another apparatus that can perform an action of the device. The session establishment device may be configured to perform an action or a step of the SMF entity in the embodiment shown in FIG. 11. The session establishment device may be further configured to perform an action or a step of the SMF entity in the embodiments shown in FIG. 13 and FIG. 14. The session establishment device may include a receiving module 221 and an execution module 222.

The receiving module 221 is configured to receive a broadcast quality report message from a terminal, where the broadcast quality report message is used to request to establish a PDU session. In this case, the receiving module 221 is configured to support the SMF entity in performing step 401 in FIG. 11.

The execution module 222 is configured to perform a PDU session establishment procedure based on the broadcast quality report message. In this case, the execution module 222 is configured to support the SMF entity in performing step 402 in FIG. 11.

In an optional implementation, the broadcast quality report message includes one or more of the following information: an identifier of the broadcast quality report message, a PDU session establishment request message, indication information, and a session identifier. The indication information is used to request to establish the PDU session, the session identifier is used to identify the PDU session, and the PDU session establishment request message is used to request to establish the PDU session.

Optionally, the broadcast quality report message includes broadcast received quality information.

In an optional implementation, the execution module 222 is specifically configured to: perform the PDU session establishment procedure when it is determined, based on the broadcast received quality information in the broadcast quality report message, that the terminal fails to receive data.

In addition, for principles of the modules in this embodiment, refer to the descriptions in FIG. 13 and FIG. 14.

Figure 23:
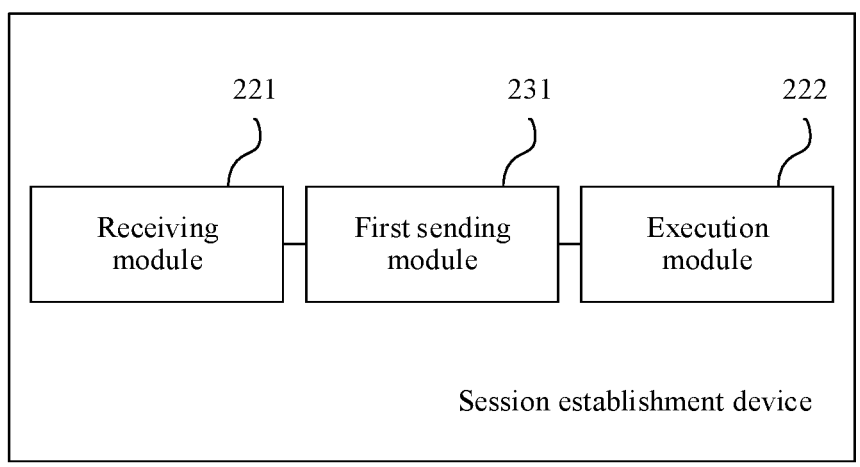
FIG. 23 is a schematic structural diagram of a still yet further session establishment device according to an embodiment of this application.

FIG. 23 is a schematic structural diagram of a still yet further session establishment device according to an embodiment of this application. As shown in FIG. 23, an embodiment of this application provides a still yet further session establishment device. The session establishment device may be an SMF entity, or the session establishment device may be one or more chips, or the session establishment device may be a system on chip, or the session establishment device may be another apparatus that can perform an action of the device. The session establishment device may be configured to perform an action or a step of the SMF entity in the embodiment shown in FIG. 11. The session establishment device may be further configured to perform an action or a step of the SMF entity in the embodiments shown in FIG. 13 and FIG. 14. Based on the session establishment device shown in FIG. 22, in the session establishment device provided in this embodiment, the broadcast quality report message includes the PDU session establishment request message, and the device further includes a first sending module 231, configured to send a PDU session establishment response message to the terminal. The first sending module 231 may perform a corresponding step next to the receiving module 221.

In an optional implementation, the PDU session establishment response message includes information about a QoS flow corresponding to the PDU session. Alternatively, the device provided in this embodiment further includes: a second sending module, configured to: send, to the terminal based on the broadcast quality report message, information about a QoS flow corresponding to the PDU session.

In addition, for principles of the modules in this embodiment, refer to the descriptions in FIG. 13 and FIG. 14.

According to the SMF entity provided in the foregoing embodiments, the SMF entity receives the broadcast quality report message from the terminal, and the broadcast quality report message is used to request to establish the PDU session. The SMF entity performs the PDU session establishment procedure based on the broadcast quality report message. The broadcast quality report message reported by the terminal is used to request to establish the PDU session, and then the SMF entity may directly perform the PDU session establishment procedure. In this way, a process in which the terminal reports the broadcast quality report message to the SMF entity, the SMF entity sends a PDU session establishment request message to the terminal, and then the terminal performs the PDU session establishment procedure is not required, or a process in which an application server triggers a device trigger message to the terminal, and then the terminal actively initiates the PDU session establishment procedure is not required. These complex signaling interaction procedures are not required. Therefore, signaling interaction between the terminal and a network side can be reduced, a delay of switching from the broadcast path to the unicast path can be reduced, and the PDU session can be quickly established.

Figure 24:
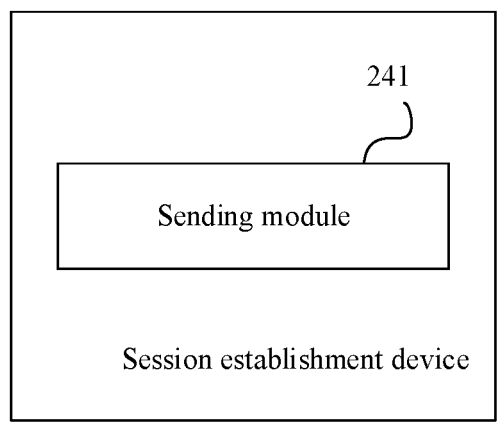
FIG. 24 is a schematic structural diagram of even yet another session establishment device according to an embodiment of this application.

FIG. 24 is a schematic structural diagram of even yet another session establishment device according to an embodiment of this application. As shown in FIG. 24, an embodiment of this application provides even yet another session establishment device. The session establishment device may be a terminal, or the session establishment device may be one or more chips, or the session establishment device may be a system on chip, or the session establishment device may be another apparatus that can perform an action of the device. The session establishment device may be configured to perform an action or a step of the terminal in the embodiment shown in FIG. 12. The session establishment device may be further configured to perform an action or a step of the terminal in the embodiments shown in FIG. 13 and FIG. 14. The session establishment device may include:

a sending module 241, configured to send a broadcast quality report message to an SMF entity, where the broadcast quality report message is used to request to establish a PDU session. In this case, the sending module 241 is configured to support the terminal in performing step 501 in FIG. 12.

In an optional implementation, the sending module 241 is specifically configured to send the broadcast quality report message to the SMF entity when it is determined that data fails to be received.

In an optional implementation, the broadcast quality report message includes one or more of the following information: an identifier of the broadcast quality report message, a PDU session establishment request message, indication information, and a PDU session identifier. The indication information is used to request to establish the PDU session, the session identifier is used to identify the PDU session, and the PDU session establishment request message is used to request to establish the PDU session.

Optionally, the broadcast quality report message includes broadcast received quality information.

In addition, for principles of the modules in this embodiment, refer to the descriptions in FIG. 13 and FIG. 14.

Figure 25:
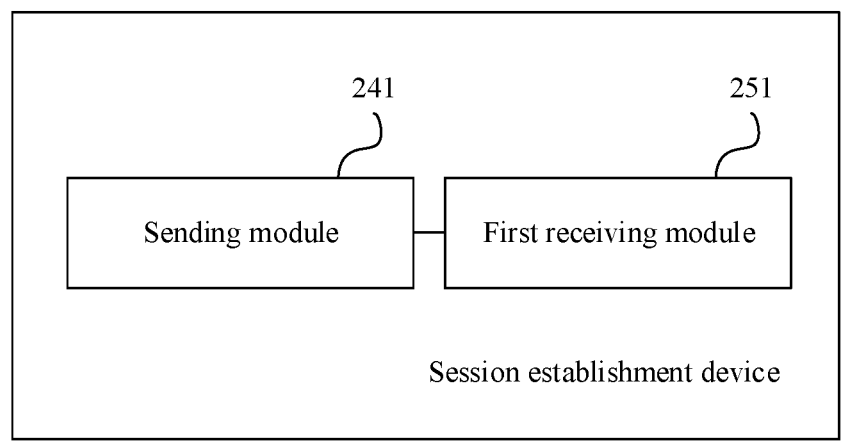
FIG. 25 is a schematic structural diagram of even yet another session establishment device according to an embodiment of this application.

FIG. 25 is a schematic structural diagram of even yet another session establishment device according to an embodiment of this application. As shown in FIG. 25, an embodiment of this application provides even yet another session establishment device. The session establishment device may be a terminal, or the session establishment device may be one or more chips, or the session establishment device may be a system on chip, or the session establishment device may be another apparatus that can perform an action of the device. The session establishment device may be configured to perform an action or a step of the terminal in the embodiment shown in FIG. 12. The session establishment device may be further configured to perform an action or a step of the terminal in the embodiments shown in FIG. 13 and FIG. 14. Based on the session establishment device shown in FIG. 24, the session establishment device provided in this embodiment further includes:

a first receiving module 251, configured to receive, from the SMF entity, information about a QoS flow corresponding to the PDU session. The first receiving module 251 may perform a corresponding step next to the sending module 241. The first receiving module 251 is configured to support the terminal in performing step 502 in the embodiment provided in FIG. 12.

Figure 26:
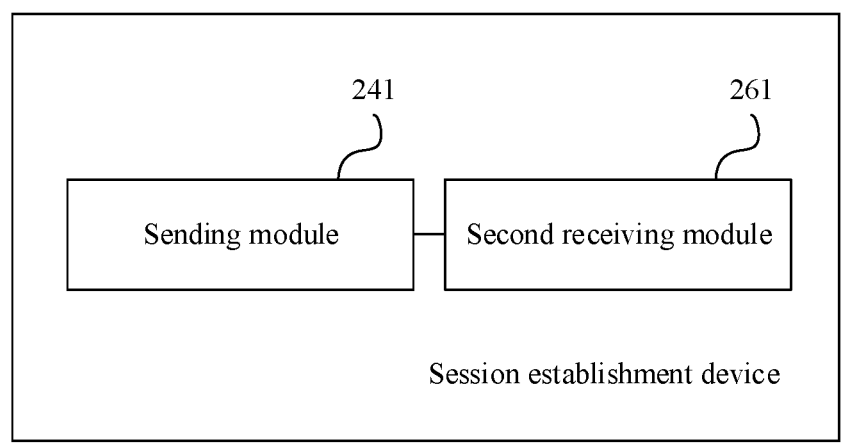
FIG. 26 is a schematic structural diagram of even yet another session establishment device according to an embodiment of this application.

FIG. 26 is a schematic structural diagram of even yet another session establishment device according to an embodiment of this application. As shown in FIG. 26, an embodiment of this application provides even yet another session establishment device. The session establishment device may be a terminal, or the session establishment device may be one or more chips, or the session establishment device may be a system on chip, or the session establishment device may be another apparatus that can perform an action of the device. The session establishment device may be configured to perform an action or a step of the terminal in the embodiment shown in FIG. 12. The session establishment device may be further configured to perform an action or a step of the terminal in the embodiments shown in FIG. 13 and FIG. 14. Based on the session establishment device provided in FIG. 24, in the session establishment device provided in this embodiment, the broadcast quality report message includes the PDU session establishment request message.

The device provided in this embodiment further includes a second receiving module 261, configured to receive a PDU session establishment response message from the SMF entity. Optionally, the PDU session establishment response message includes information about a QoS flow corresponding to the PDU session. The second receiving module 261 may perform a corresponding step next to the sending module 241. The second receiving module 261 is configured to support the terminal in performing step 503 in the embodiment provided in FIG. 12.

According to the terminal provided in the foregoing embodiments, the terminal sends the broadcast quality report message to the SMF entity, and the broadcast quality report message is used to request to establish the PDU session. The SMF entity performs a PDU session establishment procedure based on the broadcast quality report message. The broadcast quality report message reported by the terminal is used to request to establish the PDU session, and then the SMF entity may directly perform the PDU session establishment procedure. In this way, a process in which the terminal reports the broadcast quality report message to the SMF entity, the SMF entity sends a PDU session establishment request message to the terminal, and then the terminal performs the PDU session establishment procedure is not required, or a process in which an application server triggers a device trigger message to the terminal, and then the terminal actively initiates the PDU session establishment procedure is not required. These complex signaling interaction procedures are not required. Therefore, signaling interaction between the terminal and a network side can be reduced, a delay of switching from the broadcast path to the unicast path can be reduced, and the PDU session can be quickly established.

Figure 27:
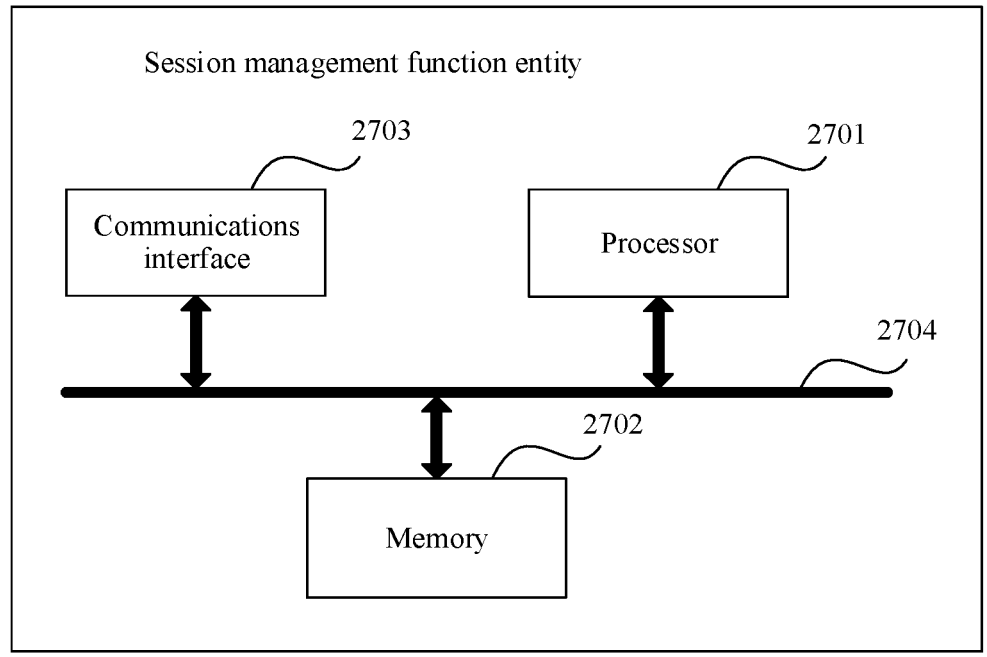
FIG. 27 is a schematic structural diagram of an SMF entity according to an embodiment of this application.

FIG. 27 is a schematic structural diagram of an SMF entity according to an embodiment of this application. As shown in FIG. 27, an embodiment of this application provides an SMF entity. The SMF entity may be configured to perform an action or a step of the SMF entity in the embodiment shown in FIG. 5, or may be configured to perform an action or a step of the SMF entity in the embodiments shown in FIG. 8A to FIG. 10B, or may be configured to perform an action or a step of the modules in the device in the embodiments shown in FIG. 15 and FIG. 16, and specifically includes a processor 2701, a memory 2702, and a communications interface 2703.

The memory 2702 is configured to store a computer program.

The processor 2701 is configured to execute the computer program stored in the memory 2702, to implement an action of the SMF entity in the embodiment shown in FIG. 5, an action of the SMF entity in the embodiments shown in FIG. 8A to FIG. 10B, or an action of the modules of the device in the embodiments shown in FIG. 15 and FIG. 16.

Optionally, the SMF entity may further include a bus 2704. For example, the processor 2701, the memory 2702, and the communications interface 2703 may be connected to each other by using the bus 2704. The bus 2704 may be a peripheral component interconnect (PCI) bus, an extended industry standard architecture (EISA) bus, or the like. The bus 2704 may be classified into an address bus, a data bus, a control bus, and the like. For ease of representation, only one thick line is used to represent the bus in FIG. 27, but this does not mean that there is only one bus or only one type of bus.

In the embodiments of this application, reference may be made to each other for the foregoing embodiments. Same or similar steps and nouns are not described one by one again.

Alternatively, some or all of the foregoing modules may be implemented in a form of an integrated circuit that is embedded in a chip of the SMF entity. In addition, the modules may be separately implemented, or may be integrated together. The foregoing modules may be configured as one or more integrated circuits for implementing the foregoing methods, for example, one or more application-specific integrated circuits (ASIC), one or more microprocessors (DSP), or one or more field programmable gate arrays (FPGA).

Figure 28:
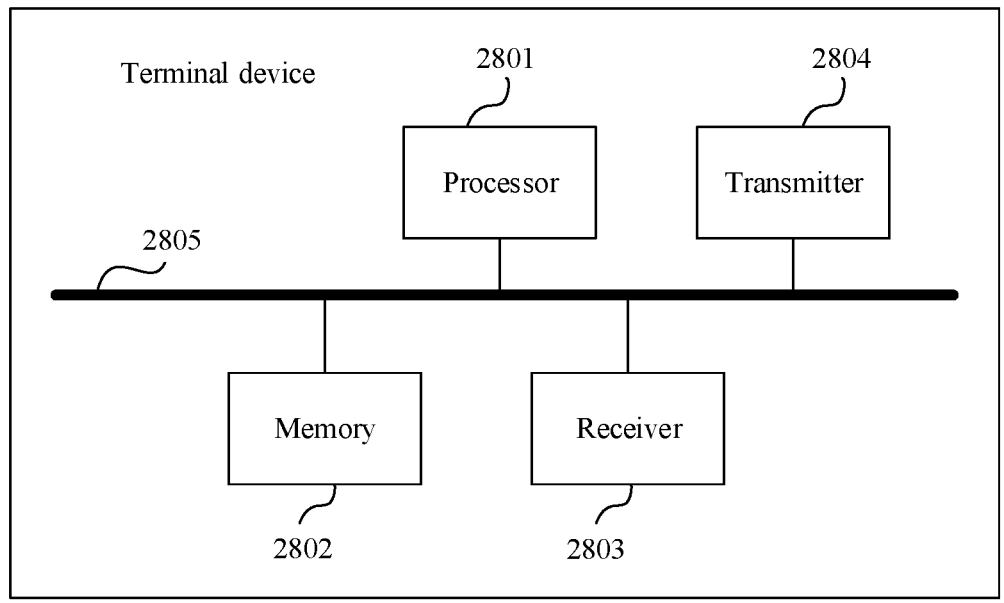
FIG. 28 is a schematic structural diagram of a terminal device according to an embodiment of this application.

FIG. 28 is a schematic structural diagram of a terminal device according to an embodiment of this application. As shown in FIG. 28, an embodiment of this application provides a terminal device. The terminal device may be configured to perform an action or a step of the terminal device in the embodiment shown in FIG. 6, or may be configured to perform an action or a step of the terminal device in the embodiments shown in FIG. 8A to FIG. 10B, or may be configured to perform an action or a step of the modules in the device in the embodiments shown in FIG. 17 and FIG. 18, and specifically includes a processor 2801, a memory 2802, a receiver 2803, and a transmitter 2804. The receiver 2803 and the transmitter 2804 may be connected to an antenna. In a downlink direction, the receiver 2803 receives, through the antenna, information sent by a network device, and the transmitter 2804 sends the information to the processor 2801 for processing. In an uplink direction, the processor 2801 processes information from the terminal, and transmits the information to the network device through the transmitter 2804.

The memory 2802 is configured to store a computer program.

The processor 2801 is configured to execute the computer program stored in the memory 2802, to implement an action of the terminal in the embodiment shown in FIG. 6, an action of the terminal in the embodiments shown in FIG. 8A to FIG. 10B, or an action of the modules of the device in the embodiments shown in FIG. 17 and FIG. 18.

Optionally, the terminal device may further include a bus 2805. The processor 2801, the memory 2802, the receiver 2803, and the transmitter 2804 may be connected to each other through the bus 2805. The bus 2805 may be a PCI bus, an EISA bus, or the like. The bus 2805 may be classified into an address bus, a data bus, a control bus, and the like. For ease of representation, only one thick line is used to represent the bus 2805 in FIG. 28, but this does not mean that there is only one bus or only one type of bus.

In the embodiments of this application, reference may be made to each other for the foregoing embodiments. Same or similar steps and nouns are not described one by one again.

Alternatively, some or all of the foregoing modules may be implemented in a form of an integrated circuit that is embedded in a chip of the terminal device. In addition, the modules may be separately implemented, or may be integrated together. To be specific, the foregoing modules may be one or more integrated circuits, for example, one or more ASICs, one or more DSPs, or one or more FPGAs, configured to implement the foregoing methods.

Figure 29:
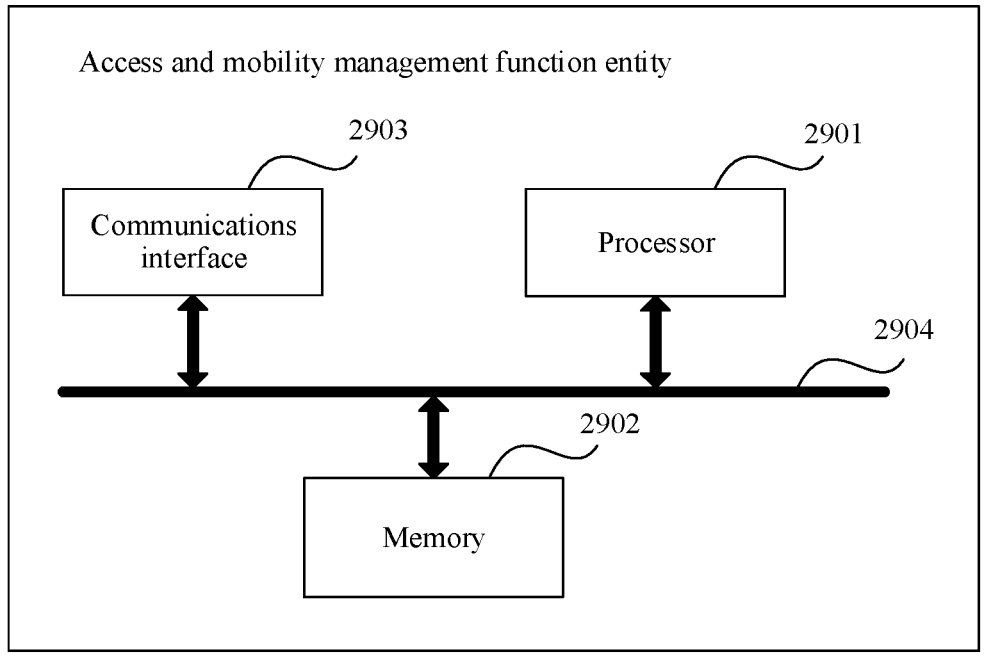
FIG. 29 is a schematic structural diagram of an AMF entity according to an embodiment of this application.

FIG. 29 is a schematic structural diagram of an AMF entity according to an embodiment of this application. As shown in FIG. 29, an embodiment of this application provides an AMF entity. The AMF entity may be configured to perform an action or a step of the AMF entity in the embodiment shown in FIG. 7, or may be configured to perform an action or a step of the AMF entity in the embodiments shown in FIG. 8A to FIG. 10B, or may be configured to perform an action or a step of the modules in the device in the embodiments shown in FIG. 19 to FIG. 21, and specifically includes a processor 2901, a memory 2902, and a communications interface 2903.

The memory 2902 is configured to store a computer program.

The processor 2901 is configured to execute the computer program stored in the memory 2902, to implement an action of the AMF entity in the embodiment shown in FIG. 7, an action of the AMF entity in the embodiments shown in FIG. 8A to FIG. 10B, or an action of the modules of the device in the embodiments shown in FIG. 19 to FIG. 21.

Optionally, the AMF entity may further include a bus 2904. The processor 2901, the memory 2902, and the communications interface 2903 may be connected to each other through the bus 2904. The bus 2904 may be a PCI bus, an EISA bus, or the like. The bus 2904 may be classified into an address bus, a data bus, a control bus, and the like. For ease of representation, only one thick line is used to represent the bus in FIG. 29, but this does not mean that there is only one bus or only one type of bus.

In the embodiments of this application, reference may be made to each other for the foregoing embodiments. Same or similar steps and nouns are not described one by one again.

Alternatively, some or all of the foregoing modules may be implemented in a form of an integrated circuit that is embedded in a chip of the AMF entity. In addition, the modules may be separately implemented, or may be integrated together. To be specific, the foregoing modules may be one or more integrated circuits, for example, one or more ASICs, one or more DSPs, or one or more FPGAs, configured to implement the foregoing methods.

Figure 30:
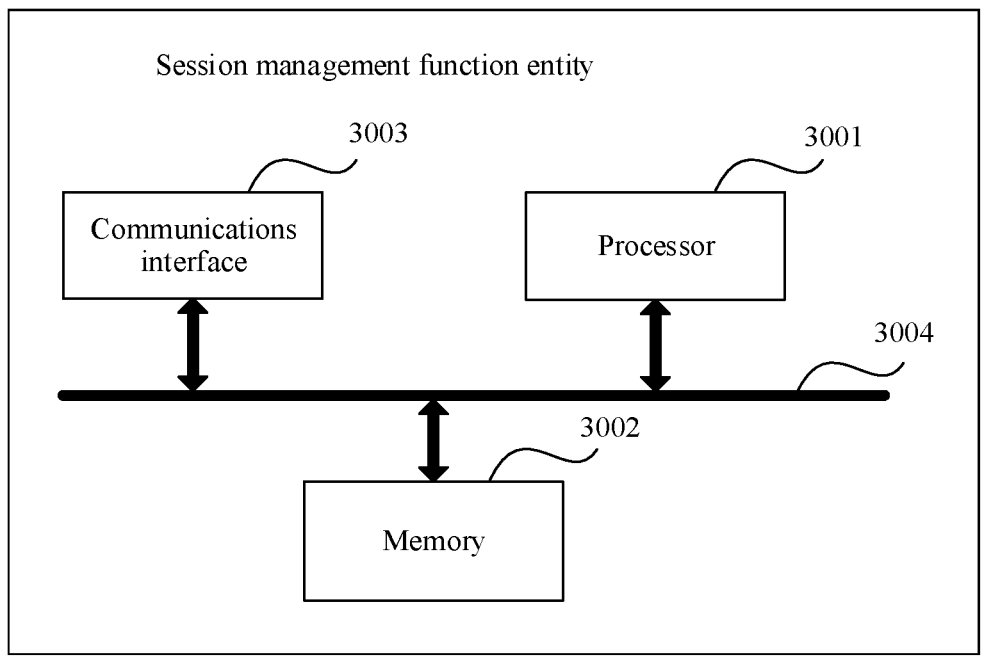
FIG. 30 is a schematic structural diagram of another SMF entity according to an embodiment of this application.

FIG. 30 is a schematic structural diagram of another SMF entity according to an embodiment of this application. As shown in FIG. 30, an embodiment of this application provides another SMF entity. The SMF entity may be configured to perform an action or a step of the SMF entity in the embodiment shown in FIG. 11, or may be configured to perform an action or a step of the SMF entity in the embodiments shown in FIG. 13 and FIG. 14, or may be configured to perform an action or a step of the modules in the device in the embodiments shown in FIG. 22 and FIG. 23, and specifically includes a processor 3001, a memory 3002, and a communications interface 3003.

The memory 3002 is configured to store a computer program.

The processor 3001 is configured to execute the computer program stored in the memory 3002, to implement an action of the SMF entity in the embodiment shown in FIG. 11, an action of the SMF entity in the embodiments shown in FIG. 13 and FIG. 14, or an action of the modules of the device in the embodiments shown in FIG. 22 and FIG. 23.

Optionally, the SMF entity may further include a bus 3004. The processor 3001, the memory 3002, and the communications interface 3003 may be connected to each other through the bus 3004. The bus 3004 may be a PCI bus, an EISA bus, or the like. The bus 3004 may be classified into an address bus, a data bus, a control bus, and the like. For ease of representation, only one thick line is used to represent the bus in FIG. 30, but this does not mean that there is only one bus or only one type of bus.

In the embodiments of this application, reference may be made to each other for the foregoing embodiments. Same or similar steps and nouns are not described one by one again.

Alternatively, some or all of the foregoing modules may be implemented in a form of an integrated circuit that is embedded in a chip of the SMF entity. In addition, the modules may be separately implemented, or may be integrated together. To be specific, the foregoing modules may be one or more integrated circuits, for example, one or more ASICs, one or more DSPs, or one or more FPGAs, configured to implement the foregoing methods.

Figure 31:
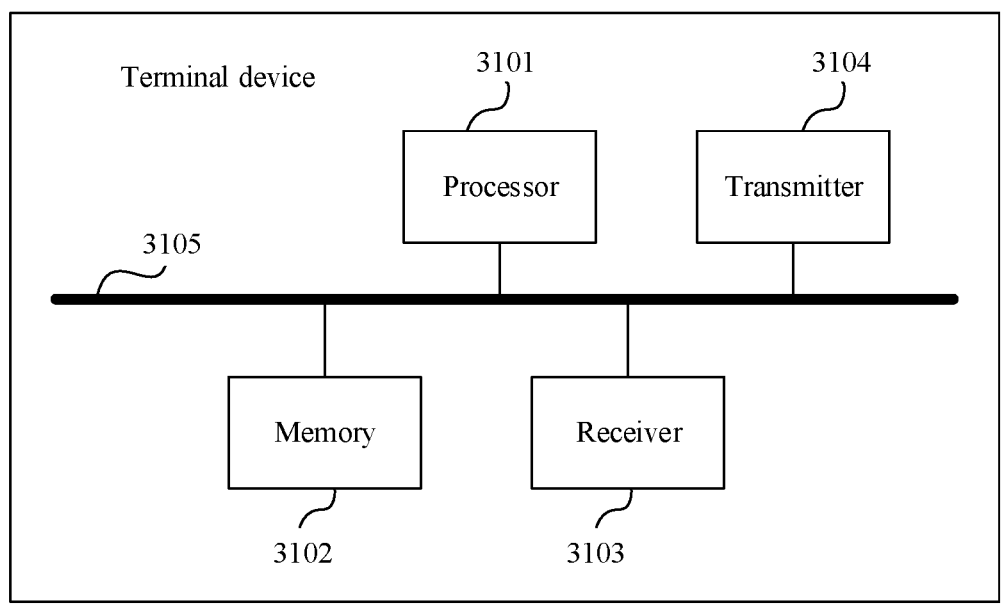
FIG. 31 is a schematic structural diagram of another terminal device according to an embodiment of this application.

FIG. 31 is a schematic structural diagram of another terminal device according to an embodiment of this application. As shown in FIG. 31, an embodiment of this application provides another terminal device. The terminal device may be configured to perform an action or a step of the terminal device in the embodiment shown in FIG. 12, or may be configured to perform an action or a step of the terminal device in the embodiments shown in FIG. 13 and FIG. 14, or may be configured to perform an action or a step of the modules in the device in the embodiments shown in FIG. 24 to FIG. 26, and specifically includes a processor 3101, a memory 3102, a receiver 3103, and a transmitter 3104. The receiver 3103 and the transmitter 3104 may be connected to an antenna. In a downlink direction, the receiver 3103 receives, through the antenna, information sent by a network device, and the transmitter 3104 sends the information to the processor 3101 for processing. In an uplink direction, the processor 3101 processes information from the terminal, and transmits the information to the network device through the transmitter 3104.

The memory 3102 is configured to store a computer program.

The processor 3101 is configured to execute the computer program stored in the memory 3102, to implement an action of the terminal in the embodiment shown in FIG. 12, an action of the terminal in the embodiments shown in FIG. 13 and FIG. 14, or an action of the modules of the device in the embodiments shown in FIG. 24 to FIG. 26.

Optionally, the terminal device may further include a bus 3105. The processor 3101, the memory 3102, the receiver 3103, and the transmitter 3104 may be connected to each other through the bus 3105. The bus 3105 may be a PCI bus, an EISA bus, or the like. The bus 3105 may be classified into an address bus, a data bus, a control bus, and the like. For ease of representation, only one thick line is used to represent the bus 3105 in FIG. 31, but this does not mean that there is only one bus or only one type of bus.

In the embodiments of this application, reference may be made to each other for the foregoing embodiments. Same or similar steps and nouns are not described one by one again.

Alternatively, some or all of the foregoing modules may be implemented in a form of an integrated circuit that is embedded in a chip of the terminal device. In addition, the modules may be separately implemented, or may be integrated together. To be specific, the foregoing modules may be one or more integrated circuits, for example, one or more ASICs, one or more DSPs, or one or more FPGAs, configured to implement the foregoing methods.

An embodiment of this application provides a communications system. The communications system includes the session establishment device provided in FIG. 15 and FIG. 16, the session establishment device provided in FIG. 17 and FIG. 18, and the session establishment device provided in FIG. 19 to FIG. 21.

An embodiment of this application provides another communications system. The communications system includes the session establishment device provided in FIG. 22 to FIG. 23 and the session establishment device provided in FIG. 24 to FIG. 26.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (solid state disk, SSD)), or the like.

A person skilled in the art should be aware that in the foregoing one or more examples, functions described in the embodiments of this application may be implemented by hardware, software, firmware, or any combination thereof. When the present technology is implemented by software, the foregoing functions may be stored in a computer readable medium or transmitted as one or more instructions or code in the computer readable medium. The computer readable medium includes a computer storage medium and a communications medium, and the communications medium includes any medium that enables a computer program to be transmitted from one place to another. The storage medium may be any available medium accessible to a general-purpose or dedicated computer.

What is claimed is:

1. A session establishment method implemented via a terminal, the method comprising:
    determining, by the terminal, that the terminal fails to receive broadcast data on a broadcast path;
    sending, by the terminal, a broadcast quality report message, that includes a packet data unit (PDU) session establishment request message, to a session management function entity based on determining that the terminal fails to receive the broadcast data on the broadcast path, wherein
        the PDU session establishment request message requests to establish a PDU session for the terminal,
        the PDU session uses a unicast path, and
        the broadcast quality report message carries broadcast received quality information indicating that the terminal fails to receive the broadcast data on the broadcast path;
    receiving, by the terminal from the session management function entity, a response to the broadcast report quality message including information about a quality of service (QoS) flow corresponding to the PDU session and an identifier associated with the broadcast session; and
    establishing, by the terminal, the PDU session with the session management function entity based on the information about the QoS flow and the identifier associated with the broadcast session included in the response, wherein
    the response is used to ensure that a user data plane is consistent on the broadcast path and the unicast path when using the broadcast path and the unicast path, and
    the terminal receives broadcast data transmitted via the PDU session.

2. The method according to claim 1, wherein determining that the terminal fails to receive the broadcast data on the broadcast path comprises:
    determining that a received quality of a broadcast channel signal of the terminal is less than a specified quality value.

3. The method according to claim 1, further comprising:
    determining that the terminal requires switching from the broadcast path to a unicast path, wherein
    the PDU session establishment request message is sent based on determining that the terminal requires switching from the broadcast path to the unicast path.

4. The method according to claim 1, wherein the session management function entity directly establishes the PDU session with the terminal based on the broadcast quality report message.

5. The method according to claim 1, wherein the broadcast quality report message is sent to an access and mobility management function entity, and the access and mobility management function entity sends the broadcast quality report message to the session management function entity.

6. The method according to claim 1, wherein the QoS flow is associated with a forwarding and processing policy.

7. The method according to claim 6, wherein the forwarding and processing policy includes any one of: a schedule policy, a queue management policy, a data shaping policy, and a radio link control (RLC) configuration policy.

8. A session establishment method implemented via a session management function entity, the method comprising:
receiving, by the session management function entity, a broadcast quality report message, that includes a packet data unit (PDU) session establishment request message, from a terminal in association with a determination that the terminal fails to receive broadcast data on a broadcast path, wherein
the PDU session establishment request message requests to establish a PDU session for the terminal,
the PDU session uses a unicast path,
the broadcast quality report message carries broadcast received quality information indicating that the terminal fails to receive the broadcast data on the broadcast path;
sending, by the session management function entity to the terminal, a response to the broadcast report quality message including information about a quality of service (QoS) flow corresponding to the PDU session and an identifier associated with the broadcast session; and
establishing, by the session management function entity, the PDU session with the terminal based on the information about the QoS flow and the identifier associated with the broadcast session included in the response, wherein
the response is used to ensure that a user data plane is consistent on the broadcast path and the unicast path when using the broadcast path and the unicast path, and
the terminal receives broadcast data transmitted via the PDU session.

9. The method according to claim 8, further comprising:
sending a PDU session establishment response message to the terminal.

10. An apparatus, comprising:
a processor; and
a memory configured to store computer readable instructions that, when executed by the processor, cause the apparatus to:
determine that a terminal fails to receive broadcast data on a broadcast path;
send a broadcast quality report message, that includes a packet data unit (PDU) session establishment request message, to a session management function entity based on determining that the terminal fails to receive the broadcast data on the broadcast path, wherein
the PDU session establishment request message requests to establish a PDU session for the terminal,
the PDU session uses a unicast path, and
the broadcast quality report message carries broadcast received quality information indicating that the terminal fails to receive the broadcast data on the broadcast path;
receive, from the session management function entity, a response to the broadcast report quality message including information about a quality of service (QoS) flow corresponding to the PDU session and an identifier associated with the broadcast session; and
establish the PDU session with the session management function entity based on the information about the QoS flow and the identifier associated with the broadcast session included in the response, wherein
the response is used to ensure that a user data plane is consistent on the broadcast path and the unicast path when using the broadcast path and the unicast path, and
the terminal receives broadcast data transmitted via the PDU session.

11. The apparatus according to claim 10, wherein the apparatus is further caused to:
determine that a received quality of a broadcast channel signal of the terminal is less than a specified quality value.

12. The apparatus according to claim 10, wherein the apparatus is further caused to:
determine that the terminal requires switching from the broadcast path to a unicast path, wherein
the PDU session establishment request message is sent based on determining that the terminal requires switching from the broadcast path to the unicast path.

13. An apparatus, comprising:
a processor; and
a memory configured to store computer readable instructions that, when executed by the processor, cause the apparatus to:
receive a broadcast quality report message, that includes a packet data unit (PDU) session establishment request message, from a terminal in association with a determination that the terminal fails to receive broadcast data on a broadcast path, wherein
the PDU session establishment request message requests to establish a PDU session for the terminal,
the PDU session uses a unicast path, and
the broadcast quality report message carries broadcast received quality information indicating that the terminal fails to receive the broadcast data on the broadcast path;
send, to the terminal, a response to the broadcast report quality message including information about a quality of service (QoS) flow corresponding to the PDU session and an identifier associated with the broadcast session; and
establish the PDU session with the terminal based on the information about the QoS flow and the identifier associated with the broadcast session included in the response, wherein
the response is used to ensure that a user data plane is consistent on the broadcast path and the unicast path when using the broadcast path and the unicast path, and
the terminal receives broadcast data transmitted via the PDU session.

14. The apparatus according to claim 13, wherein the apparatus is further caused to:
send a PDU session establishment response message to the terminal.

* * * * *